(12) United States Patent
Katirai et al.

(10) Patent No.: US 12,705,997 B1
(45) Date of Patent: Aug. 11, 2026

(54) COMPUTER SYSTEM AND METHOD FOR AUTOMATED GENERATION OF INSTRUCTIONAL SEQUENCES

(71) Applicant: PharmAchieve Corporation Ltd., Toronto (CA)

(72) Inventors: Hooman Katirai, Toronto (CA); Hai Quoc Ly, Toronto (CA); Si Chao Chen, Toronto (CA); Ziyang Guo, Toronto (CA); Naissan Vahman, Toronto (CA)

(73) Assignee: PharmAchieve Corporation Ltd., Toronto (CA)

( * ) Notice: Subject to any disclaimer, the term of this patent is extended or adjusted under 35 U.S.C. 154(b) by 0 days.

(21) Appl. No.: 19/319,264

(22) Filed: Sep. 4, 2025

(51) Int. Cl.

| | |
|---|---|
| ***G09B 7/02*** | (2006.01) |
| ***G06F 40/166*** | (2020.01) |
| ***G06Q 50/20*** | (2012.01) |
| ***G06V 20/40*** | (2022.01) |
| ***G06V 30/19*** | (2022.01) |

(52) U.S. Cl.
CPC ............. *G09B 7/02* (2013.01); *G06F 40/166* (2020.01); *G06Q 50/20* (2013.01); *G06V 20/47* (2022.01); *G06V 30/19* (2022.01)

(58) Field of Classification Search
CPC ......... G09B 7/02; G06F 40/16; G06F 40/166; G06V 30/19; G06V 20/47; G06Q 50/20
See application file for complete search history.

(56) References Cited

U.S. PATENT DOCUMENTS

| | | | | |
|---|---|---|---|---|
| 10,467,919 | B2 | 11/2019 | Fuka | |
| 2013/0143184 | A1* | 6/2013 | Neikrug | G09B 19/08 434/169 |
| 2015/0026184 | A1* | 1/2015 | Ossikine | G06F 16/35 707/738 |
| 2015/0120593 | A1* | 4/2015 | Madhavan | G06Q 50/2057 705/321 |
| 2015/0228197 | A1* | 8/2015 | McKinney | G09B 7/00 434/365 |
| 2016/0098937 | A1* | 4/2016 | Boyer | G06F 16/345 434/350 |
| 2022/0309091 | A1* | 9/2022 | Bansal | G06V 20/635 |
| 2023/0177632 | A1* | 6/2023 | Bishop | G06Q 50/2057 434/118 |

(Continued)

FOREIGN PATENT DOCUMENTS

| | | |
|---|---|---|
| WO | 2025114798 A1 | 6/2025 |

*Primary Examiner* — Timothy A Musselman

(57) ABSTRACT

Methods, devices, and processor-readable media for automated generation of instructional sequences. Instructional source materials are received and parsed to extract content segments. Constrained prompts are constructed by inserting pre-approved summaries and topic-specific metadata with applied tag constraints. Responsive to the constrained prompts, remediation outputs including summaries and candidate question-and-answer (Q&A) records are generated under the tag constraints. The summaries and candidate Q&A records are presented for approval. Upon approval, a remediation plan is generated based on the tag constraints that bind a question step to a nearest preceding summary, the remediation plan comprising step metadata referencing the approved Q&A records. The remediation plan and associated content are transmitted to a user device.

16 Claims, 15 Drawing Sheets

(56) References Cited

U.S. PATENT DOCUMENTS

| | | | |
|---|---|---|---|
| 2025/0077237 | A1 | 3/2025 | Sachindran |
| 2025/0156644 | A1 | 5/2025 | Neerukonda |
| 2025/0182639 | A1 | 6/2025 | Fu |
| 2025/0190459 | A1 | 6/2025 | Conway |
| 2025/0218307 | A1 | 7/2025 | Askour |
| 2025/0252320 | A1 | 8/2025 | Mayande |

* cited by examiner

FIG. 4B

Nurse

Angina › Overview

Q&A SECTION

404

406

408

410

412

414

416

418

COMPUTER SYSTEM AND METHOD FOR AUTOMATED GENERATION OF INSTRUCTIONAL SEQUENCES

RELATED APPLICATION DATA

This is the first-filed application for this disclosure.

FIELD

The present application generally relates to the use of computer systems for adaptive learning management and content delivery, and more particularly to improvements in computing efficiency and performance of systems that generate, manage, and deliver AI-assisted tutoring and remediation workflows.

BACKGROUND

The use of computer systems, and in particular computer systems that are enabled with large language models (LLMs), to support adaptive learning and remediation in educational settings has been receiving extensive attention. LLMs can be applied to generate instructional summaries, question-and-answer pairs, flashcards, and other forms of educational content across a wide range of subjects and difficulty levels. These systems can further be used to evaluate student responses, provide stepwise hints, and dynamically adapt lesson plans.

However, the use of LLM-enabled computer systems for tutoring and remediation can come with several potential challenges and problems, including:

(1) Inefficient Token Consumption: LLM-based systems often process large portions of raw instructional material directly, leading to excessive token usage. This results in higher inference costs, slower response times, and limited scalability when many concurrent users are served.

(2) Uncontrolled Content Drift: Without structured context boundaries, an LLM may generate responses that introduce unverified or irrelevant information. This can cause hallucinations, misalignment with curriculum objectives, and inconsistency across different tutoring sessions or inconsistencies between what was taught to the student in the automated tutoring session as compared to what was taught elsewhere in the student's curriculum.

(3) Excessive Data Transmission: Conventional systems often transmit full documents, videos, or redundant content payloads to the inference engine, increasing bandwidth usage and latency during runtime. This inefficiency creates bottlenecks in large-scale deployments, particularly when serving multi-institutional environments.

(4) Lack of Standardized Tagging and Validation: Generated instructional units, such as summaries or Q&A pairs, may not consistently map to institutional taxonomies or standardized exam blueprints. This reduces their pedagogical reliability and complicates alignment with faculty-driven curricula.

(5) Overreliance on Free-Form Generation: Many existing systems rely heavily on unconstrained model outputs, which can produce inconsistent quality in instructional content. Without schema-based validation or controlled chaining of prompts, content may lack depth, coherence, or instructional precision.

(6) Redundant Reprocessing: In conventional workflows, identical content is often parsed and reprocessed multiple times across tutoring and remediation sessions, resulting in unnecessary compute load and increased inference cost.

(7) Insufficient Efficiency in Adaptive Logic: While adaptive learning requires tailoring steps to student performance, prior approaches often recalculate full plans or retrieve large volumes of irrelevant data. This creates delays in response, higher database query overhead, and wasted compute resources.

(8) Unpredictable Outputs: If an LLM is simply asked to tutor one or more topics or sub-topics without constraints, it is unpredictable what the LLM will say, even if context and constraints are provided. This is particularly problematic in subject matters where accuracy is paramount, such as medicine, where different authoritative references may provide slightly different answers to the same query. This lack of control and predictability can undermine the pedagogical integrity of the tutoring system.

LLM-enabled computing systems can therefore require extensive computing resources, consuming high amounts of processing power and bandwidth. Inefficient and ineffective use of these systems to generate unvalidated, redundant, or overly large payloads inherently results in inefficient use of computing resources. Accordingly, there is a need for improving the efficiency and performance of automated systems for generating, validating, and delivering AI-assisted tutoring and remediation workflows.

SUMMARY

According to one example aspect, a computer-implemented method is disclosed for generation of instructional sequences. The method includes receiving instructional source materials; parsing the instructional source materials to extract content segments; constructing constrained prompts comprising pre-approved summaries and topic-specific metadata based on the content segments and applying tag constraints; obtaining, responsive to the constrained prompts, remediation outputs comprising at least summaries and candidate question-and-answer (Q&A) records generated under the tag constraints; presenting the summaries and candidate Q&A records for approval; generating, upon approval and based on the tag constraints that bind a question step to a nearest preceding summary, a remediation plan having step metadata referencing the approved Q&A records; and transmitting the remediation plan and associated content to a user device.

According to a further example aspect, a system is disclosed that includes or more processors, and one or more memories storing machine-executable instructions thereon which, when executed by the one or more processors, cause the system to perform the method of any one of the disclosed methods.

According to a further example aspect, a non-transitory processor-readable medium is disclosed having machine-executable instructions stored thereon which, when executed by one or more processors, cause the one or more processors to perform the method of any one of the disclosed methods.

According to a further example aspect, computer program is disclosed that configures a computer system to perform the method of any one of the disclosed methods.

BRIEF DESCRIPTION OF THE DRAWINGS

According Reference will now be made, by way of example, to the accompanying drawings which show example embodiments of the present disclosure, and in which:

FIG. 4B illustrates an embodiment of a user interface for creation and management of question-and-answer pairs as part of a plan.

Similar reference numerals may have been used in different figures to denote similar components.

DESCRIPTION OF EXAMPLE EMBODIMENTS

Figure 1:
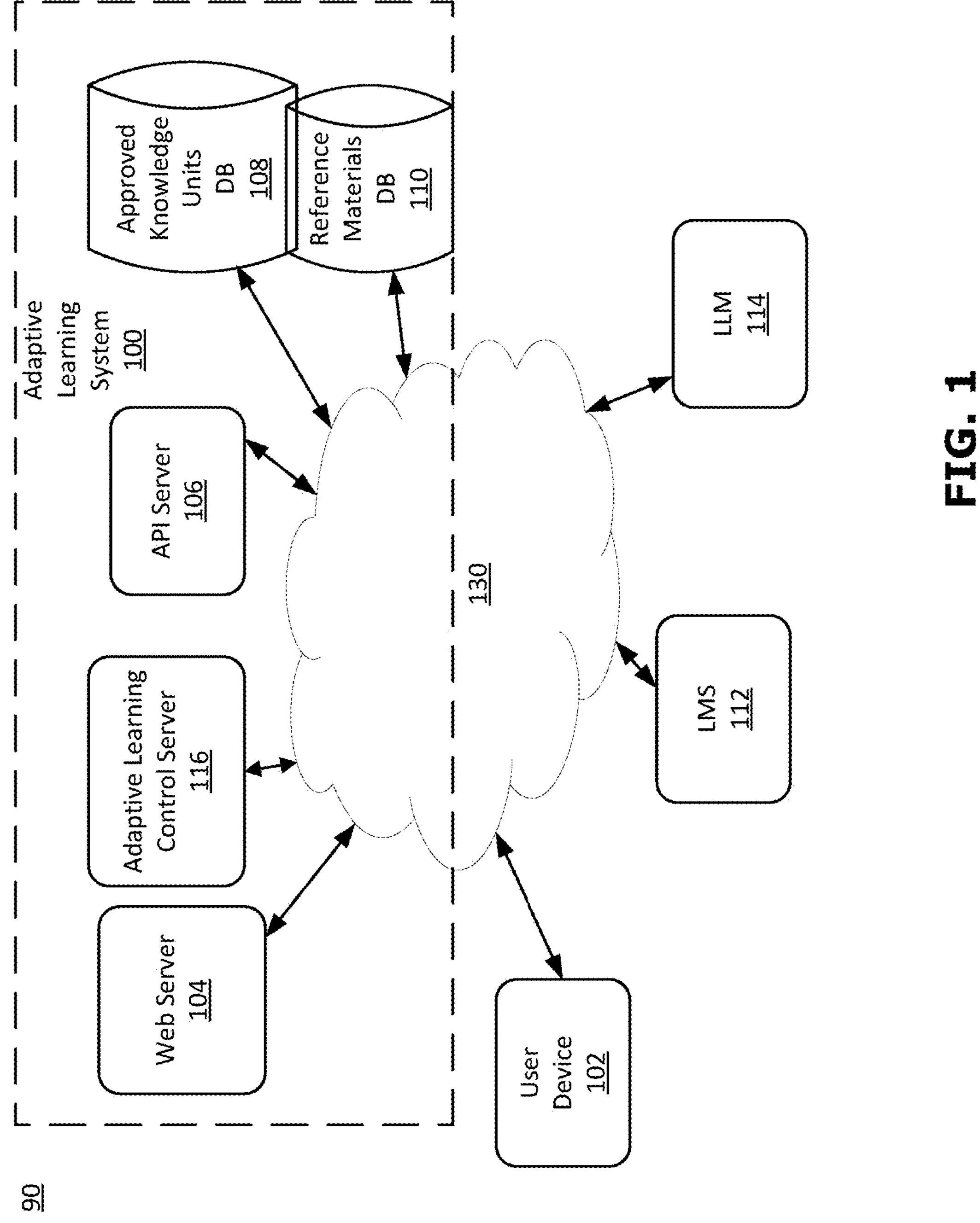
FIG. 1 is a block diagram showing an environment that includes an automated generation of instructional sequences according to example embodiments.

The present disclosure relates to a system and method for generating and delivering structured instructional sequences using constrained natural language generation, content gating, and performance-linked flow control. The system integrates content generation with a deterministic prompt structure configured to implement contextual constraints on language model inputs. Instructional artifacts, including non-repetitive question formats and feedback messages, are generated from serialized context blocks composed of institutionally approved summaries and reference answer units. A generated item is stored in a versioned schema and may undergo approval workflows prior to deployment. Instructional sequences are compiled into ordered or partially navigable flows. The flows support both baseline tutorial use and performance-based remediation use, depending on entry criteria and user profile state. Execution of these flows includes real-time correctness evaluation, hint generation, and logging of interaction events for subsequent performance analysis.

The present disclosure further relates to a system and method that implements configurable decision logic or triggers to determine when remediation is needed and what instructional flow should be executed. Evaluation logic is applied over timestamped performance records, including graded tasks and freeform input data across configurable domains of graded items (e.g. course, cohort, group, institution, etc.) and configurable types of graded items (e.g. computer adaptive tests, self-generated quizzes, pre-generated quizzes) and individual item inclusion/exclusion (e.g. "include final exam, exclude midterm" or "include assignments", exclude "practice quizzes"), using tag-aligned thresholds and configurable lookback intervals. Upon trigger activation, a personalized instructional sequence is generated and linked to a persistent session. Generated content is tied to structured taxonomy identifiers that enable topic-specific and subtopic-specific tracking. Correctness evaluation during content execution is performed through lightweight prompt submissions using reference answer context and a user's response as input, returning binary or scalar outcomes along with constrained feedback. The described system architecture improves computing efficiency by minimizing token usage through prompt modularization, reducing redundant model calls, and isolating high-cost operations to batch execution phases. The system further provides alignment with validated content boundaries, reduces hallucination risks, and supports scalable adaptation of instructional flows without requiring manual authoring of the variant.

The present disclosure may further provide configurable referral logic for initiating personalized instructional sequences based on performance analytics and predefined criteria. The system and method may further provide for automatic or manual activation of instructional flows using tag-based identifiers mapped to topic hierarchies, including system-level, concern-level, and sub-concern-level tags. Trigger conditions are defined through configurable thresholds applied over time-segmented performance data. The trigger conditions enable detection of deficiencies within rolling intervals such as 30 or 60 days. Instructors may enable or disable specific referral parameters, including thresholds for absence of responses, low aggregate scores, or repeated incorrect attempts. The system may also provide configurable logic to both define and to limit the domains (e.g. based on course, course group or cohort) or types (e.g. self-generated quizzes, computer adaptive tests, pre-defined quizzes) of graded tasks that will result in a referral. Manual referral or self-referral actions are stored as session events, while automatic referrals are evaluated through deterministic rule logic applied to time-aligned data streams. Referral records are linked to persistent user sessions and used to dynamically route learners into appropriate instructional flows without requiring repeated rule evaluation during execution.

The present disclosure may further provide for the controlled generation of instructional content using large language models constrained to faculty-approved materials. The system and method may further provide a pipeline that ingests external content sources, including uploaded documents, web resources, and video transcripts, and applies extraction routines to segment topic hierarchies and generate page-referenced summaries. The summaries, along with pre-approved question-and-answer pairs, are stored in structured schemas and indexed to remediation steps and topic tags. When constructing prompts for content generation, the system serializes the approved summaries and validated Q&A units into the prompt payload, thereby providing contextual boundaries. Candidate outputs returned from the language model are retained in draft state and routed for instructor approval through an editing interface. Approved artifacts are stored for reuse and linked to future instructional sequences for consistent alignment to institutional standards while reducing hallucination risk and token overhead during model execution.

The present disclosure may further provide adaptive instructional flow design through configurable sequences of content steps linked to performance metadata. The system and method may further provide an interface for constructing instructional plans composed of step types, including summaries, videos, flashcards, quizzes, and open-ended question formats. A step is assignable to one or more tagged topic identifiers at varying levels of granularity, and may include conditional execution logic based on historical or real-time performance data aligned to those tags. The system supports fixed-sequence and free-navigation modes, with navigation behavior controlled by configuration parameters applied during plan assembly. Instructors may insert, reorder, or remove steps, assign gating logic based on grade thresholds or event triggers, and define navigation constraints through a structured plan generation utility. Instructional plans are stored in a reusable format for consistent execution logic across tutorial and remediation contexts while supporting personalized adaptation based on tagged learner state.

The present disclosure may further provide automated question generation through structured prompts executed by a large language model, with output constrained to institutionally approved instructional context. The system and method may further provide configurable prompt templates that incorporate serialized context blocks derived from validated summaries, instructor annotations, and previously approved question sets. A prompt is programmatically structured to include fields such as difficulty targets, topic tags, and exclusion lists to avoid repetition. Difficulty stratification is supported through tagged prompt types corresponding to easy, medium, or hard levels, with sampling distributions optionally defined by instructors. Context boundaries within the prompt are provided by extracting relevant segments of the approved summaries and embedding them in a locked payload prior to model execution. The resulting questions are parsed, validated for alignment against source material, and stored in association with topic-level metadata, enabling reusable, quality-controlled content generation aligned to faculty-defined instructional standards.

The present disclosure may further provide for adaptive, context-aware feedback generation using language model inference constrained to validated instructional context. The system and method may further provide for construction of feedback prompts incorporating the learner's submitted response, the corresponding pre-approved reference answer, and a trace of prior attempts. Identified misconceptions are embedded as input features to guide hint specificity and sequencing. The prompt payload excludes the correct answer string to minimize premature disclosure, providing feedback generation strictly within the boundaries of the approved content. Feedback messages are returned as structured outputs, optionally ranked or versioned, and conditionally surfaced based on the number of previous attempts or time-on-task metrics. The architecture supports iterative feedback progression, allowing for increasingly specific hints while preserving answer withholding.

In at least one embodiment, the adaptive learning system 100 shown in FIG. 1 is implemented as a distributed, network-based computing architecture deployed over a communication network 130. The network 130 comprises a public or private IP-based network, such as the Internet or a secured institutional intranet, that enables data transmission between distributed components of the system, including a user device 102, a web server 104, an API server 106, an adaptive learning control server 116, an approved knowledge units database 108, a reference materials database 110, a learning management system (LMS) 112, and a large language model (LLM) system 114.

In at least one embodiment, the Adaptive Learning Control Server 116 coordinates generation and execution of instructional sequences configured for tutoring and remediation use cases. Instructional sequences are composed of steps that include summaries, multimedia content, flashcards, and open-ended Q&A elements. The Adaptive Learning Control Server 116 retrieves source materials from the Reference Materials DB 110 and previously approved instructional units from the Approved Knowledge Units DB 108. Summaries and Q&A content are selected based on topic hierarchy tags and serialized into structured payloads. When operating in tutoring mode, the Adaptive Learning Control Server 116 generates default instructional flows. When operating in remediation mode, the Adaptive Learning Control Server 116 applies referral logic based on performance records transmitted from the LMS 112, student session logs, or manual referral actions by faculty. The system supports linear or free navigation through the instructional steps, controlled by flow parameters assigned at the plan configuration stage.

In at least one embodiment, the Adaptive Learning Control Server 116 constructs prompt templates to interface with the LLM 114 under strict contextual constraints. Plan-generation prompts include pre-approved summaries, reference questions, and metadata such as difficulty levels, subtopic tags, and instructional sequencing. The LLM 114 returns candidate instructional items, including diverse question formats and step-ordered plans. The control server parses the LLM response and stores generated outputs in staging schemas for faculty review. For student interaction, the control server 116 issues lightweight evaluation prompts comprising the student's response, a corresponding approved answer, and optionally a summary reference. The LLM 114 evaluates correctness and returns a binary or scalar result, along with a feedback message generated strictly from the constrained context. The Adaptive Learning Control Server 116 may control the number of permitted attempts, appends progressively specific hint prompts, and records performance telemetry. The architecture enables token-efficient model usage, provides alignment to approved content, and improves throughput by maintaining deterministic prompt structure across tutoring and remediation sessions.

In at least one embodiment, the network 130 comprises a communication medium that enables data exchange between the components of the adaptive learning system 100. The network 130 may include a public packet-switched network such as the Internet, and support standard protocols including TCP/IP, HTTPS, and WebSockets. The network 130 can provide real-time and asynchronous communication between the user device 102 and server-side components including the web server 104, API server 106, adaptive learning control server 116, and external systems such as the LMS 112 and LLM 114. The network 130 can support secure data transmission using encryption protocols such as TLS. The network 130 can implement load-balancing or content delivery network (CDN) services to optimize delivery latency and bandwidth usage during high-volume operations.

In at least one embodiment, the network 130 may include private institutional networks, virtual private networks (VPNs), or hybrid architectures combining on-premise infrastructure with cloud-hosted components. In a cloud-deployed embodiment, elements such as the web server 104 and API server 106 may reside in containerized environments orchestrated by a platform-as-a-service (PaaS) provider. In secure deployments, such as for compliance-driven academic institutions, the network 130 can exclude Internet connectivity and instead operate over closed-loop intranet systems with restricted access to external LLM endpoints. In such secure configurations, the LLM 114 may be hosted locally or accessed through proxy nodes configured within the institutional firewall.

In at least one embodiment, the user device 102 comprises a client device such as a web browser-enabled computing terminal, a tablet, or a smartphone, configured to render the adaptive learning interface served by the web server 104 over the network 130. The user device 102 may be operated by different user roles such as students, faculty, or administrative personnel. A user role may relate to distinct interface elements and functionality based on authenticated credentials. The user device 102 may be a general-purpose computing device or a dedicated terminal provisioned by an institution.

In at least one embodiment, the user device 102 operates as the execution endpoint for the adaptive remediation interface delivered by the web server 104 over the network 130. The user device 102 can comprise a computing terminal with a display subsystem, input subsystem, local memory, and network interface controller. The device 102 can execute a browser or equivalent runtime environment to render HTML, CSS, and JavaScript resources provided by the web server 104. Rendering can include adaptive remediation flows, summaries, multimedia resources, flashcards, and interactive Q&A activities. Navigation can be managed locally at the device 102 level through asynchronous requests to the web server 104. Thus, device 102 can allow both linear and free navigation flows depending on configurations defined by the adaptive learning control server 116.

In at least one embodiment, the user device 102 receives open-ended response input from a student user via keyboard, touchscreen, or voice-to-text capture. The response data can be packaged into structured payloads, including metadata such as session identifiers and step identifiers. The data package can be transmitted to the API server 106. The API server 106 can then relays the payload to the adaptive learning control server 116 for semantic evaluation against faculty-approved answers stored in the approved knowledge units database 108. The evaluated result can be returned to the user device 102 and rendered as feedback through the adaptive remediation interface.

In at least one embodiment, the user device 102 presents iterative, context-sensitive feedback based on responses generated by the LLM 114 under constraints applied by the adaptive learning control server 116. The device 102 can render hint messages or explanatory notes without disclosing final answers. Progressive guidance can be displayed through incremental interface updates, reducing the need for full page reloads and conserving network bandwidth. Chat transcripts and Q&A histories can be locally cached on the device 102 for resumption of remediation sessions from an interrupted state.

In at least one embodiment, the user device 102 executes visualization routines to present analytics of flagged weaknesses for student self-tracking. The analytics data can be transmitted from the adaptive learning control server 116, which aggregates tagged performance records across remediation sessions. The device 102 renders hierarchical views of weaknesses at system-level, concern-level, and sub-sub-topic-level resolution. Graphical rendering can utilize vector-based charts and DOM (Document Object Model)-based tree structures to reduce bandwidth and computation costs while providing clarity in visualizing complex performance hierarchies.

In at least one embodiment, the user device 102 supports faculty-facing dashboards. Faculty dashboards display remediation outcomes, completion rates, and persistent deficiencies across multiple students. Data for the faculty dashboard can be transmitted from the adaptive learning control server 116 through the API server 106, then rendered as interactive components on the device 102. Faculty users can issue referral overrides directly from the user interface, such as, manual referral initiation or bypass of designated remediation steps. The override instructions can be transmitted back to the adaptive learning control server 116 for execution.

In at least one embodiment, the user device 102 supports a content approval workflow accessible to faculty. Draft summaries and Q&A pairs generated by the LLM 114 and processed by the adaptive learning control server 116 can be transmitted to the user device 102 for review. Faculty users can interact with editable forms, modifying or approving content prior to deployment to student-facing remediation plans. Changes can be submitted from the device 102 through the API server 106 and stored in the approved knowledge units database 108. The changes can be provided to ensure that validated instructional units are used in subsequent student interactions.

In at least one embodiment, the user device 102 interfaces with the LMS 112 to synchronize completion records, grades, or credit reporting. The LMS 112 can provide initial authentication tokens and course enrollment data. The tokens and data can be stored at the user device 102 to maintain session continuity. Upon completion of remediation plans, the device 102 can transmit confirmation signals to the LMS 112 via the web server 104 for synchronization of institutional records.

In at least one embodiment, the user device 102 implements client-side caching of static resources and previously retrieved summaries to reduce redundant data requests from the web server 104. Cached elements can include remediation flow templates, instructional metadata, and non-sensitive session data. Local caching can reduce repeated network transmissions and lowers computational overhead at the backend servers, contributing to system-level efficiency and cost reduction in LLM token consumption.

In at least one embodiment, the user device 102 operates under role-specific execution modes. A student role can execute adaptive remediation interfaces and self-tracking dashboards. A faculty role can execute dashboards, override controls, and content approval workflows. An administrator role can execute system configuration dashboards and global analytics views. The role separation can be implemented through session metadata verified at the API server 106. The device 102 can render distinct interface modules based on received role instructions.

In at least one embodiment, the user device 102 implements persistence of remediation progress through local storage of session identifiers and checkpoint markers. The persistence allows a student to exit a remediation session and later resume at the step previously reached. Transcript storage can be provide to include timestamped interaction records for reducing server-side storage requirements and distributing state management across user devices.

In at least one embodiment, the web server 104 interfaces with the API server 106 over the network 130. The web server 104 can operate as a presentation and transport layer for the adaptive learning system 100. The web server 104 can manage authenticated connections with the user device 102. The web server 104 can deliver user interface or browser-rendered content. The web server 104 can transmit interface definitions and display-ready data generated by the adaptive learning control server 116, such as, instructional sequences, dashboards, and progress records. The web server 104 can execute session management, caching of static resources, and secure data transport.

In at least one embodiment, the web server 104 operates as the delivery layer for rendering the adaptive learning interface to the user device 102 over the network 130. The web server 104 can host interface pages implemented in HTML, CSS, and JavaScript that provide structured presentation of remediation flows, dashboards, and instructional resources. The web server 104 can handle authenticated logins for students, faculty, and administrative users, to provide role-based access through session tokens and encrypted communication protocols. Authentication requests are verified against role metadata provided by the LMS 112 and validated by the API server 106.

In at least one embodiment, the web server 104 manages the upload of instructional resources from faculty. Resources can include PDFs, video files, and URLs. Upon upload, the web server 104 performs preprocessing such as file type validation, metadata tagging, and conversion into normalized content blocks for storage into the reference materials database 110. The uploads can be packaged as structured objects comprising identifiers, source metadata, and content hashes.

In at least one embodiment, the web server 104 manages the delivery of sequenced remediation flows and dashboards. Lesson plans assembled at the adaptive learning control server 116 can be transmitted to the web server 104 as payloads. The payloads can then be rendered as stepwise interface components on the user device 102. Similarly, remediation steps can be transmitted to the web server 104 as payloads. The remediation steps can include summaries, linked videos, flashcards, and Q&A activities. For dashboards, the web server 104 receives aggregated analytics generated by the adaptive learning control server 116. The web server 104 can translate the data into visual components such as charts and tabular displays to reduce client-side computation at the user device 102.

In at least one embodiment, the web server 104 implements caching to optimize delivery efficiency and reduce redundant processing. Frequently accessed summaries and metadata objects can be stored temporarily in a cache layer associated with the web server 104. The cached objects can be referenced by hash identifiers for integrity and version control. The caching reduces repeated retrievals from the reference materials database 110 and lowers token consumption during repeated LLM 114 queries.

In at least one embodiment, the web server 104 coordinates user-facing requests to the API server 106. Requests may include retrieval of remediation flows, submission of student responses, retrieval of updated dashboards, and initiation of faculty approval workflows. The web server 104 can packages request as JSON payloads, applies validation checks for completeness, and transmits them to the API server 106 for orchestration. Responses returned from the API server 106 are parsed and presented in the appropriate web interface modules.

In at least one embodiment, the web server 104 operates as a stateless presentation node where the adaptive learning and remediation logic is delegated to the adaptive learning control server 116.

In at least one embodiment, the API server 106 functions as a routing and coordination layer between the web server 104 and the backend services. The API server 106 can receive requests from the web server 104, validate payloads, and forward them to the adaptive learning control server 116 for processing. The API server 106 can further provide transport integrity, access control, and schema compliance. File uploads received through the web server 104 can be passed through the API server 106 to the reference materials database 110 for storage and indexing. Similarly, prompts for constrained LLM execution can be packaged and transmitted by the API server 106 to the adaptive learning control server 116. In at least one embodiment, the web server 104 and API server 106 provide technical interfaces, and support the execution of remediation logic and orchestration by adaptive learning control server 116.

In at least one embodiment, the API server 106 provides a stateless middleware layer for communication integrity between the web server 104 and backend components of the adaptive learning system 100. The API server 106 can validate request formats, provide authentication tokens, and normalize data payloads before transmitting them to the adaptive learning control server 116. The API server 106 can support RESTful endpoints and message queues to maintain concurrency across multiple user sessions.

In at least one embodiment, the API server 106 manages transport of faculty-uploaded instructional files, performance records, and query requests. The API server 106 can route requests to appropriate subsystems including the adaptive learning control server 116, the approved knowledge units database 108, and the reference materials database 110. When a faculty user initiates plan creation or modification, the API server 106 can trigger LLM-based operations by assembling prompt payloads that include validated instructional summaries and pre-approved content. The API server 106 can provide access control based on user role and session token metadata. For example, when a faculty user uploads a PDF or video file, the API server 106 can handle multipart transfer and metadata tagging before passing the data to the reference materials database 110 under the control of the adaptive learning control server 116. Similarly, when a student submits a response, the API server 106 can package the submission and relay the submission to the adaptive learning control server 116. The API server 106 can receive requests from the web server 104 and coordinate operations such as retrieval of reference summaries, validation of Q&A pairs, generation of constrained LLM prompts, application of referral logic, and updating of remediation progress data. The API server 106 can also relay status updates and grade records to the LMS 112 over LTI (Learning Tools Interoperability)-compliant protocols to operate as a pass-through transport layer. The API server 106 can provide technical scalability and data consistency.

In at least one embodiment, the API server 106 operates as an orchestration layer between the web server 104, the adaptive learning control server 116, the approved knowledge units database 108, the reference materials database 110, the LMS 112, and the LLM 114. In at least one embodiment, the API server 106 provides contextual integrity for requests involving the LLM 114. The API server 106 may provide that metadata identifiers, such as topic tags, summary identifiers, and Q&A unit references, are transmitted to the adaptive learning control server 116 for prompt assembly. The separation can minimize uncontrolled inputs from reaching the LLM 114.

In at least one embodiment, the API server 106 can process referral trigger events. Performance data received from the LMS 112 and session data collected at the user device 102 can be transmitted through the API server 106 to the adaptive learning control server 116. The API server 106 applies routing logic that categorizes requests by tag structures (S_, C_, C2_) and time thresholds, and can then forward the event packets to the adaptive learning control server 116 for execution of referral rules. By encapsulating referral events in structured packets, the API server 106 can reduce parsing overhead at the control layer.

In at least one embodiment, the API server 106 manages file and resource transfers between the web server 104 and backend storage systems. Faculty uploads, including PDFs, videos, or URLs, can be received at the web server 104 and passed to the API server 106. The API server 106 can segment the upload into metadata and content streams, apply hashing for version tracking, and transmit the packaged object to the reference materials database 110 under orchestration by the adaptive learning control server 116.

In at least one embodiment, the API server 106 handles prompt requests originating from student or faculty interactions. For student responses, the API server 106 can transmit a lightweight payload comprising the student's submission, a reference identifier to the approved answer in the approved knowledge units database 108, and an optional summary identifier from the reference materials database 110. The payload can be routed to the adaptive learning control server 116 which assembles the evaluation prompt for submission to the LLM 114. For faculty workflows, the API server 106 can transmit identifiers for draft summaries and draft Q&A pairs generated by the LLM 114 and rout them back to the faculty dashboard at the user device 102 for review and approval.

In at least one embodiment, the API server 106 coordinates bidirectional synchronization with the LMS 112. Performance outcomes such as completion status, grade values, and referral activations are transmitted from the adaptive learning control server 116 through the API server 106 to the LMS 112. Conversely, enrollment data, identity tokens, and performance histories are received from the LMS 112 and relayed by the API server 106 to the adaptive learning control server 116 for integration into remediation workflows. The design can maintain separation of institutional recordkeeping from adaptive remediation logic.

In at least one embodiment, the API server 106 operates as a secure gateway for all LLM 114 interactions. The API server 106 can apply input sanitization, payload filtering, and access logging before transmitting any request to the adaptive learning control server 116. The architecture may reduce uncontrolled or malformed prompts from being processed and provide that validated instructional context is supplied.

In at least one embodiment, the Approved Knowledge Units database 108 comprises a data storage subsystem configured to store validated instructional units such as question-and-answer (Q&A) pairs. The database 108 can be deployed within the adaptive learning system 100 shown in FIG. 1. The database 108 can be accessed over the network 130 by other system components, including the adaptive learning control server 116 and the API server 106. The database 108 supports concurrent read/write operations across multiple user sessions by implementing transaction-safe access protocols and index-based retrieval paths.

In at least one embodiment, the Q&A pair stored in the Approved Knowledge Units 108 comprises a question string, a reference answer string, one or more difficulty metadata fields, one or more topic identifiers, and one or more source reference fields. The topic identifiers can be structured hierarchically and prefixed with tag patterns corresponding to the system (S_), concern (C_), and subconcern (C2_) levels. For example, a pair tagged with S_Cardiovascular, C_Angina, and C2_Diagnosis can be retrieved during downstream inference or analytics. The tag schema can be implemented at the data schema level and validated during content ingestion.

In at least one embodiment, a Q&A pair is indexed using a compound key structure consisting of topic tag, difficulty level, and content identifier. The difficulty field is an ordinal value or enumerated type such as {easy, medium, hard}, enabling difficulty-based retrieval for adaptive delivery. The content identifier may be a cryptographic hash derived from the question string, ensuring referential integrity and avoiding duplicate entries.

In at least one embodiment, the Approved Knowledge Units 108 stores validated instructional summaries generated from source materials supplied by faculty users. The summaries can be initially produced by the LLM 114 under constrained prompting conditions and subsequently reviewed and approved through a faculty-facing interface rendered at the user device 102. Upon approval, the summaries can be inserted into the database 108 alongside Q&A pairs, indexed by topic and subtopic tags, and versioned for consistency tracking.

In at least one embodiment, approved summaries stored in database 108 are included in the context supplied to the LLM 114 during evaluation of student responses and generation of hints. The summaries can function as additional semantic constraints that define the valid knowledge boundary for the model. The adaptive learning control server 116 can retrieve the approved summary from database 108 using tag-based queries. The adaptive learning control server 116 can append the summary to the prompt payload alongside the reference answer to provide that the model inference remains within the bounds of institutionally validated content. The design provides for alignment with approved instructional scope and reduces the risk of output divergence.

In at least one embodiment, the database 108 is implemented using a columnar or hybrid row-columnar store to support high-speed retrieval of tagged records with minimal I/O latency. The storage engine supports in-memory caching for high-frequency Q&A pairs, reducing disk access and improving throughput under concurrent retrieval workloads. The caching mechanism can be managed by an internal eviction policy based on least recently used (LRU) or access frequency heuristics.

In at least one embodiment, the Approved Knowledge Units 108 provides input to the adaptive learning control server 116 for construction of constrained prompts supplied to the LLM 114. The summaries and Q&A records retrieved from database 108 can be serialized into prompt payloads using a JSON or protocol buffer format, filtered by context constraints, and injected into model calls issued by the control server 116. The system implements boundary conditions by minimizing inclusion of unapproved or mismatched Q&A content.

In at least one embodiment, the summary and Q&A records retrieved from Approved Knowledge Units 108 are used during real-time semantic evaluation of student responses. The reference answer string associated with a given question is transmitted as context to the LLM 114, along with the student submission and optionally a reference summary from the Reference Materials database 110. The semantic comparison occurs within the validated context defined by the Q&A record, reducing the risk of hallucination and providing alignment with approved instructional boundaries.

In at least one embodiment, Q&A records are linked to remediation steps through foreign key associations to step identifiers managed by the adaptive learning control server 116. A step in a remediation plan can reference one or more summary or Q&A identifiers stored in database 108.

In at least one embodiment, Q&A records stored in database 108 are version-controlled. A record includes a version token that is incremented when faculty users modify either the question or answer text during the approval workflow. The version token is appended to the content identifier and tracked by the adaptive learning control server 116 to provide consistency in downstream interactions. The mechanism supports faculty editing while preserving prior versions for audit or rollback purposes.

In at least one embodiment, the summary an Q&A records in the Approved Knowledge Units 108 are reusable across multiple tutoring and/or remediation sessions, plans, and users. The database 108 supports reference counting or usage metrics to track frequency of access and context reuse. Frequently used Q&A pairs can be cached in memory or pre-fetched based on plan scheduling to reduce retrieval latency and LLM prompt construction time.

In at least one embodiment, database 108 supports multimodal Q&A records. A record may include textual content, mathematical expressions rendered in MathML, MathJax, KaTex, Latex, or clinical diagrams represented as SVG or embedded images. When such media types are present, database 108 can store associated binary assets in content-addressable storage and maintains linkages via URI or hash reference in the Q&A record metadata.

In at least one embodiment, the Q&A records in database 108 are constrained in token length to provide prompt cost efficiency when used as context for the LLM 114. The adaptive learning control server 116 can perform preemptive token counting when assembling prompt payloads and select a subset of Q&A context based on configured budget thresholds. The feature can provide predictable model inference costs and limit token overruns during model execution.

In at least one embodiment, database 108 interfaces with analytics routines executed at the adaptive learning control server 116. The routines can compute mastery thresholds, failure patterns, and frequency of incorrect attempts at the granularity of the Q&A pair. Aggregated analytics can be stored in auxiliary tables linked to primary Q&A records to support dashboard visualizations rendered at the user device 102.

In at least one embodiment, the Approved Knowledge Units 108 distinguishes between system-defined and institution-defined Q&A content. Records originating from the system's default remediation corpus can be tagged with a system source marker, while those uploaded or authored by faculty can be tagged with an institution-specific identifier. The source marker can supports filtering and prioritization during remediation plan construction.

In at least one embodiment, the summary and Q&A content stored in database 108 is encrypted at rest and signed with digital hashes for tamper detection. Write operations to the database can be executed through access-controlled endpoints at the API server 106, with write permissions limited to authorized faculty roles. Integrity checks can be executed periodically to detect unauthorized modification. In at least one embodiment, the Approved Knowledge Units 108 supports delayed deployment of Q&A pairs pending faculty approval. Draft records generated by the LLM 114 can be initially stored in a staging table or alternate schema partition. Upon faculty approval via the user device 102, the record is migrated into the active database 108 with a new version token. The staging process provides that approved content is exposed to the remediation pipeline.

In at least one embodiment, the summary and Q&A records in the Approved Knowledge Units 108 are annotated with provenance metadata including timestamp of creation, faculty identifier, and content source. The fields support audit logging and traceability of instructional material origin. In at least one embodiment, Q&A retrieval queries can be executed by parameterized calls or stored procedures to reduce query planning overhead and defend against injection risks. The procedures can be implemented with precompiled query plans and leverage table-level indexes to maintain sub-second response times for latency-sensitive operations.

In at least one embodiment, the Approved Knowledge Units 108 anchors the evaluation logic of the system by serving as the exclusive source of truth for correctness determination. The semantic comparisons between student submissions and expected answers are performed with reference to the content stored in database 108. No alternative sources are used in runtime inference, providing fidelity to approved content and reducing variability due to unbounded model knowledge.

In at least one embodiment, the Reference Materials database 110 comprises a data repository configured to store instructional source materials, extracted summaries, and context metadata for use in downstream adaptive learning operations. The database 110 interfaces with the API Server 106 and the Adaptive Learning Control Server 116 over the network 130, and supports read/write access via transactional queries. In at least one embodiment, instructional resources are uploaded by faculty through a user interface rendered at the user device 102 and passed to the Web Server 104. The Web Server 104 packages the upload as a content object and transmits it to the API Server 106, which handles metadata extraction, hashing, and storage into the Reference Materials DB 110. Supported resource types can include PDFs, video files, HTML documents, plaintext notes, and hyperlinks to institutional or third-party instructional sources.

In at least one embodiment, uploaded instructional resources are stored in database 110 with associated metadata fields including file type, source identifier, page count, encoding format, and upload timestamp. Binary content can be stored in object storage or blob columns, and the metadata can be stored in structured tables indexed by resource ID and faculty account. The API Server 106 can apply validation filters to ensure supported formats and integrity before ingestion.

In at least one embodiment, instructional resources ingested into Reference Materials DB 110 are processed by the Adaptive Learning Control Server 116 to generate topic-level and subtopic-level summaries. The control server 116 can parse content into segments using structural markers such as headings, slide transitions, or timestamp intervals in video transcripts. Extracted segments can be tokenized and submitted to the LLM 114 under constrained prompting conditions to generate summary outputs. In at least one embodiment, the summaries generated from parsed source materials can be reviewed and optionally modified by faculty via approval workflows. Upon approval, the summaries can be stored in the Reference Materials DB 110 as structured entries, indexed by topic and subtopic identifiers. A summary can be tagged by a hierarchical schema that corresponds to the tagging used in the Approved Knowledge Units 108, such as S_, C_, and C2_prefixes.

In at least one embodiment, the Reference Materials DB 110 can distinguish between content types: "summary" and "text". Summary content can be used as a constrained input to the LLM 114 during prompt construction. Text content can be used for display to the student and is not supplied to the LLM during generation or evaluation. The database schema can include a type discriminator field to provide for the separation. Summary entries can be stored with additional metadata including token length, source page references, and version history.

In at least one embodiment, summaries stored in the Reference Materials DB 110 are associated with page-level references to the original instructional source. The references include page numbers for PDFs, timestamp offsets for videos, or section anchors for HTML documents. The linkage can enable back-referencing from remediation steps or Q&A items to the source material from which the summary was derived. In at least one embodiment, Reference Materials DB 110 can support storage and rendering of quantitative content embedded in summaries. Mathematical expressions extracted from uploaded materials can be converted into MathML format during preprocessing by the Adaptive Learning Control Server 116. The MathML expressions can be embedded within the summary content or stored in a linked table with reference pointers. The user device 102 is configured to render MathML natively or via script libraries to ensure proper formatting.

In at least one embodiment, Reference Materials DB 110 can implement a caching subsystem for frequently accessed summary content. Summaries that are repeatedly used as LLM context or included in high-frequency remediation flows can be loaded into memory caches managed by the database engine or by a dedicated caching layer. Cached summaries can be indexed by hash ID and tag metadata. The feature reduces retrieval latency and avoids redundant processing to improve computational efficiency and reduced token consumption during LLM interactions. In at least one embodiment, summary entries in database 110 are version-controlled. When a summary is re-generated or edited by faculty, a new version token is assigned. Previous versions are retained in an audit table for rollback or content traceability. The Adaptive Learning Control Server 116 can select the latest approved version for prompt construction unless otherwise specified in the plan configuration.

In at least one embodiment, the Reference Materials DB 110 stores additional attributes to support controlled usage of summaries in adaptive logic. Attributes include activation flags, usage frequency counters, faculty annotations, and exclusion markers. The Adaptive Learning Control Server 116 can reference the attributes during remediation plan generation to determine which summaries to include or omit based on content age, usage density, or override settings. In at least one embodiment, Reference Materials DB 110 is partitioned by institution or tenant in multi-institutional deployments. A partition can include isolated storage for source materials, summaries, and display-only text blocks, enabling compliance with data governance and content segregation requirements. Partitioning can be implemented using schema-based separation or logical namespaces provided at the database engine level.

In at least one embodiment, the Reference Materials DB 110 provides contextual inputs to LLM 114 for both plan-generation and response-evaluation prompts. During plan generation, a set of summaries and Q&A pairs associated with a topic hierarchy is assembled into a structured prompt payload. During response evaluation, a single summary may be included to provide additional grounding for answer checking. The summaries can be retrieved from database 110 via queries executed by the Adaptive Learning Control Server 116 and are constrained to previously approved content.

In at least one embodiment, Reference Materials DB 110 integrates with analytics pipelines for usage tracking. Access logs can include timestamped records of which summaries were retrieved, the requesting component, and the associated plan or student. In at least one embodiment, Reference Materials DB 110 supports retrieval through parameterized queries optimized for index-based execution. Retrieval paths can be constructed around compound keys comprising topic tag, content type, and version token. The structure supports low-latency selection of summaries during prompt construction, reducing CPU cycles and memory access overhead during peak operation periods.

In at least one embodiment, the Reference Materials DB 110 can anchor the scope of allowable outputs from LLM 114 by providing a bounded and validated context corpus. The constraint mechanism provides that generated questions, feedback, or evaluations remain consistent with institutional content and minimizes the introduction of external or unvetted knowledge during inference.

In at least one embodiment, the Learning Management System (LMS) 112 operates as an external integration point between the adaptive learning system 100 and an institution's course delivery infrastructure. The LMS 112 can accessed over the network 130 through communication channels and supports standard interoperability protocols such as Learning Tools Interoperability (LTI). The LMS 112 can provide access to institutional gradebooks, enrollment records, user identity attributes, and optionally, question item banks.

In at least one embodiment, the LMS 112 operates as the identity provider for student and faculty users accessing the adaptive learning system 100. Upon session initiation, authentication tokens and user metadata can be transmitted from the LMS 112 to the Web Server 104 or API Server 106. Identity federation can be implemented using OAuth2 tokens or SAML assertions implemented in LTI launch requests. Tokens can include user roles, course identifiers, and institutional context metadata, which are stored at the User Device 102 to support session continuity and access control.

In at least one embodiment, the LMS 112 can transmit historical performance data for the student into the adaptive learning system 100. The data can include item-level response logs, quiz scores, assessment timestamps, and question tags where available. The data can be transmitted via LTI Advantage Data Services or RESTful endpoints exposed by the LMS 112. The API Server 106 receives the data payloads, filters them by tag schema (S_, C_, C2_), and relays them to the Adaptive Learning Control Server 116 for further analysis. The data exchange supports the initialization of remediation workflows based on prior performance trends.

In at least one embodiment, the LMS 112 enables automatic referral of students to remediation based on grading logic or diagnostic assessments defined within the institutional system. Referral events can be triggered when performance thresholds are breached, such as average scores falling below configured values within a date range. The LMS 112 can transmit referral signals as LTI custom parameters or via webhook callbacks to the API Server 106. The Adaptive Learning Control Server 116 can receive the triggers, identify the applicable remediation flows, and schedule plan activation for the referred student.

In at least one embodiment, LMS 112 gradebooks are synchronized with the adaptive learning system 100 to show post-remediation outcomes. Completion signals, pass/fail statuses, and computed grades are generated by the Adaptive Learning Control Server 116 after plan execution and routed to the LMS 112 through the API Server 106. Grade transmission can be handled via LTI Gradebook Services or equivalent grade posting endpoints. In at least one embodiment, the LMS 112 supports the retrieval of institution-authored question items for integration into remediation plans. The items can be stored in internal item banks maintained by the LMS. Access can be performed programmatically through authenticated API calls issued by the API Server 106, subject to access controls defined by the institution. Retrieved items can be tagged, parsed, and linked to specific remediation steps by the Adaptive Learning Control Server 116. Item metadata such as question format, topic alignment, and usage restrictions can be stored with a retrieved entry.

In at least one embodiment, question items retrieved from LMS 112 can be inserted into remediation flows as assessment blocks. The blocks may include multiple-choice, fill-in-the-blank, or other supported formats. Item tagging can be aligned to the S_, C_, C2_schema used across the adaptive learning system 100. In at least one embodiment, the LMS 112 transmits course structure metadata such as course-to-topic mappings, content calendars, and curriculum dependencies to the Adaptive Learning Control Server 116. The data can guide the generation of topic hierarchies, tagging of Q&A content, and contextual alignment of summaries. The mapping data can be transmitted via LTI Resource Link Descriptors or via external configuration endpoints maintained by the institution.

In at least one embodiment, the LMS 112 is logically decoupled from the adaptive learning system 100 and interacts through authenticated interfaces exposed by the API Server 106. The LMS can operate as a trusted external data provider and record-keeping system, while all adaptive computation, plan generation, and evaluation are performed internally within the adaptive learning system components such as the Adaptive Learning Control Server 116. In at least one embodiment, LMS 112 integration supports hybrid operation modes. In at least one embodiment, the LMS 112 transmits optional attributes related to accessibility settings, learning accommodations, or localization preferences. The attributes can be passed through the API Server 106 to the Adaptive Learning Control Server 116 and may influence remediation plan sequencing, content selection, or language variant retrieval. Localization tags can be used in conjunction with multilingual content stored in Reference Materials DB 110 and Approved Knowledge Units 108.

In at least one embodiment, institutional administrators configure which LMS data streams are enabled for synchronization. The options can include gradebooks, assessment logs, item banks, course hierarchies, and calendar metadata. The adaptive learning system 100 can apply the institutional configurations and corresponding API throttling, endpoint selection, and data filtering. Configuration settings can be stored in internal control tables indexed by institution ID and transmitted periodically from the API Server 106 to the Adaptive Learning Control Server 116.

In at least one embodiment, the Large Language Model (LLM) 114 comprises a transformer-based neural inference engine configured to generate instructional content, evaluate student responses, and produce structured feedback. The LLM 114 receives constrained prompt payloads from the Adaptive Learning Control Server 116, with content context derived from the Reference Materials DB 110 and Approved Knowledge Units 108. The model interaction can occur over secure channels within the network 130.

In at least one embodiment, the LLM 114 operates in a dual-prompt architecture. The first prompt type is used during lesson plan generation and involves high-token payloads incorporating full-length instructional summaries, historical question sets, and related metadata. The prompts produce structured instructional artifacts such as topic summaries, candidate question-answer (Q&A) pairs, flashcards, and step-sequenced remediation flows. The second prompt type is used for real-time evaluation of student responses and is constructed as a lightweight input comprising the submitted response, the approved answer, and optionally, a targeted summary string. The prompt mode reduces token usage, lowers inference time, and enables scalable evaluation across concurrent student sessions.

In at least one embodiment, prompts supplied to the LLM 114 are constructed by the Adaptive Learning Control Server 116 and transmitted through the API Server 106 using JSON payloads containing serialized context blocks, model flags, and evaluation directives. The prompt construction can implement hard constraints such that no model call contains free-form natural language instructions or open-ended queries. The context supplied to the LLM 114 can be bounded by previously approved summaries and validated Q&A records. The design reduces hallucinated outputs and aligns all generated content with institutional sources.

In at least one embodiment, the LLM 114 executes inference within faculty-approved knowledge boundaries. Reference answers can be retrieved from Approved Knowledge Units 108 and concatenated into the prompt template. The resulting input token count is computed pre-inference. The token budget management reduces computational waste and contributes to operational cost efficiency. In at least one embodiment, the LLM 114 is accessed as a hosted foundation model maintained by a third-party provider. In an alternative embodiment, the LLM 114 comprises a fine-tuned instance hosted internally by the adaptive learning system 100 or deployed in a private cloud under institution-specific security policies. In the internal configuration, the model is optimized using domain-specific training examples, enabling performance improvements on semantic grading tasks while preserving contextual alignment. The hosted and self-hosted options are abstracted behind the API interface and selected via system configuration settings.

In at least one embodiment, the LLM 114 supports reference-aware semantic evaluation of student input. During remediation, the student submits an open-ended answer through the User Device 102. The Adaptive Learning Control Server 116 retrieves the matching reference answer from the Approved Knowledge Units 108 and constructs a prompt that embeds both the reference and the student submission. The LLM 114 returns a binary evaluation (correct/incorrect) or a gradated score, along with an explanation or hint derived from the reference context. The explanation generation can be performed without disclosing the correct answer to the student, following embedded instruction constraints supplied by the control server.

In at least one embodiment, the LLM 114 is instructed to detect conceptual misunderstandings, partial correctness, and proximity to valid answers. Student transcripts can be evaluated in sequence, and the LLM 114 is configured to identify latent misconceptions based on recurring error patterns. The diagnostic information can be returned to the Adaptive Learning Control Server 116, which aggregates the outputs into weakness vectors per subtopic. The data is stored in association with the student profile and visualized in the faculty-facing dashboard rendered at the User Device 102.

In at least one embodiment, the plan-generation prompt issued to LLM 114 includes pre-approved instructional elements such as flashcards, multiple-choice items, open-ended questions, and topical summaries. The elements can be assembled by the Adaptive Learning Control Server 116 into structured JSON payloads and ordered to preserve logical sequencing of concepts. The model response can be parsed post-inference and decomposed into separate steps which are then stored in the remediation plan metadata tables under faculty review workflows.

In at least one embodiment, the LLM 114 supports intermediate-step generation for calculation-based questions. When tagged question types indicate mathematical reasoning steps, the Adaptive Learning Control Server 116 appends a structured directive into the prompt, requesting multi-step derivation output. Returned steps are parsed and stored in association with the original question and can be activated as guided hints during tutoring interaction. This reduces the need for separate faculty-authored walkthroughs and enhances feedback precision.

In at least one embodiment, the model runtime environment of LLM 114 is optimized for cost control through token-level caching. When identical prompt templates are submitted across sessions, the system leverages model-side context caching features or performs result-level caching within the adaptive learning system 100. Cached outputs can be stored using hash-matching keys derived from prompt inputs. The feature reduces repeated inference on static prompts, improving throughput and reducing operating cost. In at least one embodiment, inference logs from the LLM 114 are transmitted to an internal monitoring subsystem via the API Server 106. The logs can include prompt hash, response time, token count, and model output. The logs can be analyzed to detect latency outliers, failure cases, and degraded performance, enabling administrators to tune prompt templates and optimize prompt-to-response efficiency across deployment cycles.

In at least one embodiment, the LLM 114 is restricted from accessing external corpora, search engines, or model-native pretrained knowledge outside of supplied prompts. The feature can be implemented by general-purpose fallback instructions and supplying bounded context under strict configuration. In local deployments, the LLM 114 is fine-tuned to suppress open-domain completions and accept domain-specific prompt types defined by the Adaptive Learning Control Server 116. In at least one embodiment, LLM 114 response generation supports format constraints to provide output structure. Output types can include JSON, XML, or plaintext blocks with demarcated tokens. The Adaptive Learning Control Server 116 can parse model output using schema validators or regular expression rules to extract structured components without ambiguity. The constraint mechanism supports deterministic output processing and reduces the need for post-hoc formatting. In at least one embodiment, evaluation prompts submitted to the LLM 114 include semantic tolerance parameters for equivalence scoring. The parameters define thresholds for accepting near-matches, rounding errors, synonym usage, or reordered clauses. When evaluating numeric responses, the prompt includes acceptable variance levels, allowing inputs such as "3.85" and "4" to be graded equivalently within defined bounds. These settings are specified per question by metadata stored in the Approved Knowledge Units 108.

In at least one embodiment, the LLM 114 supports progressive feedback logic where the incorrect response triggers increasingly specific hints. The Adaptive Learning Control Server 116 tracks the number of incorrect attempts and appends corresponding hint levels to the prompt context. The LLM 114 returns instructional feedback at increasing specificity levels without revealing the final answer. All feedback strings are generated from pre-approved summaries and reference answers, preserving context fidelity.

In at least one embodiment, the LLM 114 is called asynchronously through a message queue or inference task manager that batches model requests and distributes them to available compute nodes. The batching architecture can support concurrent sessions at scale and enables priority-based routing, where real-time evaluation prompts are prioritized over background plan-generation requests. The task manager can operate under the orchestration of the Adaptive Learning Control Server 116.

System Overview and Content Processing

In at least one embodiment, the Adaptive Learning Control Server 116 coordinates execution of tutoring and remediation workflows as part of a unified instructional framework. The system supports both tutoring sequences and remediation sessions using shared infrastructure components, including the Approved Knowledge Units database 108, the Reference Materials database 110, and the API Server 106. The Control Server 116 maintains plan metadata tables identifying step types, sequencing logic, and tagging constraints. Step types include display-only instructional materials such as video files or summaries, as well as interactive steps involving AI-assisted question-answer units generated under validated context constraints.

In at least one embodiment, the process begins when lecture slides, PDF files, or equivalent instructional source materials are received at the Control Server 116 through the API Server 106. These inputs are parsed to extract content segments using file-specific handlers. Optical character recognition may be applied to images or scanned documents. Extracted text content is converted into normalized blocks, which are then indexed by position and content type (e.g., heading, body text, bullet points). The parsing process generates a metadata layer that includes page numbers, section markers, and inferred topic boundaries. In at least one embodiment, the Control Server 116 routes the normalized content to the LLM 114 along with configuration prompts for generating summaries and identifying topic boundaries. The LLM 114 processes the input and returns outputs including condensed summaries and a proposed hierarchical topic-subtopic-sub-subtopic structure. These outputs are accompanied by confidence scores for topic boundary detection. The hierarchical structure is matched against pre-existing institutional curriculum taxonomies and national exam test plans stored in the reference materials database 110, enabling constraint-based validation and enhancement of the generated structure.

In at least one embodiment, the Control Server 116 reconciles the generated hierarchy with multiple reference sources. These sources may include (i) previously tagged question metadata based on national exam structures, (ii) curriculum sequencing data maintained by the institution and accessed via LMS 112 APIs, and (iii) proprietary taxonomic trees maintained by the backend database systems. A normalization layer maps conflicting topic nomenclature across sources using alias tables and synonym resolution modules. The resulting structure is written into the internal Structured Content Repository, maintaining consistency across remediation and tutoring subsystems.

In at least one embodiment, the Structured Content Repository is implemented as a set of relational data tables stored in an internal content database at the control server 116. A table entry corresponds to a topic or subtopic and contains fields for generated summaries, metadata tags, source mapping, approved question links, and contextual constraints for generation. Fields also include content usage flags, designating whether a summary is active for display, retained for LLM prompt context, or deprecated. Content is indexed using compound keys comprising the course ID, topic ID, and institution ID, allowing for scoped multi-tenant data access.

Instructional Resource Parsing and Plan Setup

In at least one embodiment, the Adaptive Learning Control Server 116 supports configuration of tutoring flows where the plan creator specifies a combination of instructional and evaluative components. Instructional components include links to videos, PDFs, or URLs processed by the Reference Materials database 110 and indexed by subtopic. Evaluative components include interactive question-answer steps validated through the Approved Knowledge Units database 108. Completion of these steps is tracked using session state variables and correctness evaluation records. Completion thresholds are configured per step or plan and used to determine mastery without requiring full coverage of all steps.

In at least one embodiment, the Adaptive Learning Control Server 116 receives input from a faculty member via the User Device 102 for configuring AI-assisted remediation content generation. Through an interactive configuration panel rendered by the UI Layer and served through the API Server 106, the faculty member uploads one or more instructional artifacts such as PDF files, video links, or web-based materials. Alongside the upload, the faculty user selects one or more content generation objectives, including question sets, summaries, flashcards, visual mindmaps, audio abstracts, or video modules. The input interface allows the user to optionally activate a screenshot extraction toggle, instructing the system to associate relevant visual frames from the source materials with the generated output.

In at least one embodiment, uploaded files are stored temporarily in the cloud file cache and parsed into content units by the Control Server 116. PDFs and word processor files are parsed into sections based on visual markers, heading hierarchies, and semantic cues. Video materials are ingested through URL scrapers or local file handlers and processed to extract transcriptions and keyframe screenshots. For the parsed segment, a content metadata object is created that includes source type, timestamp (for video), segment length, and anchor tags if available. These metadata records are indexed and forwarded to the LLM 114 with the associated content payload for processing.

Tutoring and Remediation Plan Construction

In at least one embodiment, the Adaptive Learning Control Server 116 initializes plan construction upon receipt of configuration parameters transmitted from the User Device 102. The parameters can include optional referral rules defined by a faculty user. The referral rules may specify threshold conditions applied to student performance data synchronized from the LMS 112. The control server 116 stores the rules in internal control tables indexed by tag schema and applies them as conditional triggers during execution of subsequent plan steps. The Adaptive Learning Control Server 116 receives structured step definitions from the User Device 102. The steps may reference resources such as PDFs, video files, or URLs uploaded to the Reference Materials DB 110, or Q&A records retrieved from the Approved Knowledge Units DB 108. The step is serialized into a metadata object containing type identifier, sequence index, and optional dependency fields. The metadata objects are written to a step-sequencing table maintained by the control server 116.

The Adaptive Learning Control Server 116 implements automated summary and Q&A pair generation. The server retrieves instructional resources from the Reference Materials DB 110 and applies a constrained prompt-chaining sequence to the LLM 114. A chain appends pre-approved summaries or topic-specific metadata to the input context, constraining model inference to a validated domain. The control server 116 parses the output into candidate Q&A records, hashes the entry for deduplication, and stores approved records in a staging schema until faculty approval is received.

In at least one embodiment, the Adaptive Learning Control Server 116 ingests two distinct classes of content associated with the subtopic: text elements and summary elements. A text element comprises arbitrary instructional material entered by faculty through the User Device 102 and transmitted to the Web Server 104. The text element may be plain text, HTML, or embedded diagrams. The content is stored in the Reference Materials DB 110 with a display-only flag providing that it is rendered to the student interface but excluded from context assembly during prompt construction for the LLM 114.

A summary element is generated by the Adaptive Learning Control Server 116 using uploaded reference resources retrieved from the Reference Materials DB 110. The server applies constrained prompt chaining to the LLM 114, producing a representation of the resource content. The generated summary is transmitted to the User Device 102 for human editing, enabling faculty to revise terminology, structure, or length prior to approval. Upon confirmation, the edited summary is written back to the Reference Materials DB 110 and flagged as context-eligible content.

In at least one embodiment, the system architecture provides differentiation between text and summary elements. The differentiation is implemented by schema markers within the Reference Materials DB 110. A text element is tagged with a display-only marker, while a summary element is tagged as dual-purpose, indicating both display to the user and inclusion in prompt payloads. The markers are referenced by the Adaptive Learning Control Server 116 when constructing JSON payloads for the LLM 114. This provides that summaries can be selectively retrieved as constrained model input, while text elements remain outside the computational pipeline.

In at least one embodiment, the Adaptive Learning Control Server 116 manages hierarchical association between summaries and downstream questions. By default, the nearest preceding summary in the step sequence is bound as context to all subsequent question steps. When multiple summaries are present, the control server 116 applies tag-matching logic, aligning question tags to summary tags at subtopic or sub-subtopic granularity. For example, multiple summaries can exist for distinct categories of calculation methods. The summary is displayed prior to the related question block, and the corresponding summary context is supplied to the LLM 114 during evaluation. In at least one embodiment, faculty may attach additional content links for the subtopic. The links may reference resources hosted externally or within the LMS 112. The links are packaged as metadata objects and stored in the Reference Materials DB 110 with a type marker identifying the content as external. The control server 116 transmits the links to the User Device 102 for rendering, while excluding them from prompt payloads unless explicitly tagged as context resources.

In at least one embodiment, the separation of content types improves computing efficiency. By excluding text and arbitrary links from model context, the system reduces token consumption and avoids unnecessary model calls. At the same time, summaries provide bounded, validated content to the LLM 114, constraining outputs and improving alignment with institutional material. The dual-role treatment of summaries, combined with efficient schema-based differentiation, enables the system to reduce bandwidth load, lower inference costs, and improve throughput across concurrent tutoring and remediation sessions.

In at least one embodiment, faculty text entries are transmitted through the API Server 106 and tagged as display-only content. The Adaptive Learning Control Server 116 differentiates text from summary content by maintaining separate schema flags. Text entries are stored for direct rendering to the User Device 102 without being used as contextual input to the LLM 114. Summaries, by contrast, are indexed as hierarchical context blocks. When multiple summaries exist, the control server 116 applies prompt-assembly logic that associates the downstream Q&A step with the nearest preceding summary or a set of summaries selected by tag correlation.

In at least one embodiment, the Adaptive Learning Control Server 116 permits faculty users to reorder steps or insert additional steps of varying type. The step sequence is managed in a dependency graph stored in memory. Updates are processed as graph mutations and persisted to a step-sequencing database. Supported step types include open-ended question blocks, multiple-choice items retrieved from LMS 112 item banks, or multimedia resources retrieved from the Reference Materials DB 110.

In at least one embodiment, the Adaptive Learning Control Server 116 applies conditional execution rules to the step defined in the plan. The rules are configured by faculty through the User Device 102 and specify whether a step is optional, required, or conditionally triggered. The conditions are based on sub-topic grade data transmitted from the LMS 112 and stored in association with student identifiers. The control server 116 evaluates the grade data against configured time windows, such as the last 30 days, 60 days, or across all available records. The outcome determines whether the step is included or omitted when the control server 116 assembles the runtime payload for delivery to the Web Server 104.

In at least one embodiment, the conditional rules are applied at a subtopic level. For example, when student records indicate consistently strong performance in questions tagged to the diagnosis of Diabetes, the associated remediation step can be skipped. Conversely, if grade records show deficiencies in the treatment of Diabetes over the same period, the corresponding step is activated. The Adaptive Learning Control Server 116 processes these rules using tag-matching logic against the Approved Knowledge Units DB 108 and ensures that the relevant steps are transmitted to the User Device 102. This selective activation reduces redundant processing and network transmission by limiting execution to targeted subtopics, improving computational efficiency and reducing data consumption during concurrent tutoring or remediation sessions.

In at least one embodiment, the Adaptive Learning Control Server 116 supports stepwise feedback logic for multi-part questions. When a question is tagged with a multi-step attribute in the Approved Knowledge Units DB 108, the control server 116 inserts directive flags into the prompt payload transmitted to the LLM 114. Returned inference includes intermediate solution steps. The control server 116 parses and stores the steps as structured hint levels, the associated with an incremental attempt count.

In at least one embodiment, the Adaptive Learning Control Server 116 enables faculty to configure whether evaluation feedback is returned as step-by-step guidance. The configuration is stored as metadata in the step-sequencing table and applied during prompt assembly for the LLM 114. When enabled, the control server 116 appends directive flags to the evaluation prompt that instruct the model to produce incremental feedback rather than a single pass/fail determination. The resulting output may include progressive hints or partial solution steps, which are transmitted to the User Device 102 for display. This implementation provides targeted correction while reducing redundant full-answer transmissions, thereby conserving bandwidth and token usage.

In at least one embodiment, the Adaptive Learning Control Server 116 executes semantic evaluation by retrieving the approved reference answer from the Approved Knowledge Units DB 108 and embedding it alongside the student's submission in the prompt payload. The LLM 114 evaluates equivalence and generates feedback aligned to institutional content boundaries. For example, when the correct numerical value is 3.85 and the student submits "4," the system may return the message "You are almost correct, but you rounded up." Similarly, if a student consistently omits an intermediate calculation step, the control server 116 can release a stored hint derived from pre-approved stepwise derivations. This structured feedback improves computational efficiency by leveraging constrained summaries and controlled prompt templates while providing adaptive, context-aware corrections.

In at least one embodiment, the Adaptive Learning Control Server 116 manages navigation mode for execution of steps. Faculty may configure the flow as linear, requiring sequential completion, or as free navigation, allowing access to any step regardless of order. The configuration is stored as navigation metadata in the plan object and provided during runtime. In linear mode, the control server 116 maintains prerequisite pointers within the sequencing table, ensuring that the step is released upon completion of the prior step. In free navigation mode, the control server 116 transmits the full step map to the User Device 102 without providing prerequisites. This implementation provides flexibility in execution models while optimizing resource usage by transmitting the necessary step payloads in accordance with the selected mode.

In at least one embodiment, the Adaptive Learning Control Server 116 applies plan-level completion rules. The faculty provided rules may specify binary pass/fail determination or graded outcome based on scores from a terminal assessment block. The control server 116 computes completion status by aggregating evaluation results returned from the LLM 114 or by parsing results of item bank questions retrieved from the LMS 112. Grade outcomes are relayed back to the LMS 112 via the API Server 106.

In at least one embodiment, the Adaptive Learning Control Server 116 enables multi-step walk-throughs for tagged mathematical problems. The control server 116 transmits directives to the LLM 114 to output stepwise derivations. Parsed derivations are stored in association with the original question record. During runtime, the steps are incrementally released to the User Device 102 as hints upon incorrect attempts, conserving bandwidth by transmitting incremental payloads rather than full walkthroughs.

In at least one embodiment, once all configuration parameters are received, the Adaptive Learning Control Server 116 compiles a complete step-sequencing object. The object is serialized in JSON format and written to internal metadata tables. The compiled plan is transmitted to the User Device 102 via the Web Server 104 for faculty review. Approval signals received from the User Device 102 trigger migration of staged summaries and Q&A pairs from provisional storage into the Approved Knowledge Units DB 108.

In at least one embodiment, the Adaptive Learning Control Server 116 maintains audit logs of all plan configuration changes. The logs include timestamped entries of step insertions, reordering operations, and conditional rule updates. The logs are stored in auxiliary tables linked to the plan metadata for compliance and rollback.

In at least one embodiment, the described architecture improves computing efficiency by reducing redundant data transmissions and minimizing token consumption at the LLM 114. Constrained prompt chaining reduces unnecessary context expansion, while incremental feedback delivery reduces bandwidth load. Internal caching of summaries and Q&A pairs lowers database retrieval latency. Together, these implementations provide reduced operational cost and improved throughput for concurrent tutoring and remediation sessions.

Prompt Assembly and Lesson Plan Generation

In at least one embodiment, the Control Server 116 initiates prompt construction for the LLM 114 using a template mapping engine. Based on user-selected output types, pre-built prompt templates are retrieved and populated with the parsed content, metadata, and generation directives. For example, if the user selects both "questions" and "mindmap," the Control Server 116 constructs separate prompts for each, inserting the relevant topic-level segmentation and aligning with tags such as _C2 to scope the generation. Prompt construction includes keyword boosting and concept preservation flags for medical terminologies such as "pathophysiology," "monitoring parameters," or "risk stratification," especially when the domain relates to medical use cases such as pharmacy or nursing.

In at least one embodiment, the Control Server 116 prepares a lesson plan generation request by constructing an LLM prompt that includes extracted slide content and supplemental instructional material. The prompt is configured to request multiple content types, including structured summaries, associated question-and-answer pairs, and links to external resources. Contextual augmentation is performed by querying the Approved Knowledge Units database 108 to retrieve pre-approved instructional assets. Retrieved assets are filtered by topic and subtopic alignment to the parsed content and include structured question sets, open-ended faculty-validated Q&A, and summary flashcards.

In at least one embodiment, the Control Server 116 integrates the newly extracted material with the retrieved validated content to generate a composite prompt. The composite prompt includes newly ingested content from uploaded slides, selected Q&A records from prior sessions, and previously approved summary content. The LLM 114 receives this prompt through a secure API call and returns structured outputs including (i) subtopic summaries, (ii) question-and-answer pairs with designated correct answers, and (iii) sequencing instructions for instructional steps. The Control Server 116 parses this output and stores the element in the Structured Content Repository.

In at least one embodiment, the question-and-answer pairs returned by the LLM 114 are cross-referenced against existing records in the Approved Knowledge Units database 108 to avoid redundancy. If the LLM output contains questions already present in the repository, the Control Server 116 links the existing identifiers rather than storing duplicates. This reference-based storage model reduces redundant write operations and minimizes database growth. The system applies tagging logic to associate the Q&A item with a topic, subtopic, and sub-subtopic. These tags are later used for filtering during remediation and performance analysis.

In at least one embodiment, summaries generated for subtopics are stored in the Reference Materials database 110 and linked to the appropriate topic hierarchy. Summaries are stored in dual formats: display-optimized HTML for user interface rendering and token-optimized text format for reuse in future LLM prompts. The HTML format supports embedded MathML for content involving calculations or scientific notation, such as pharmacokinetics equations. The Control Server 116 also stores metadata for the summary entry, including version ID, source material reference, and institution scope.

In at least one embodiment, the LLM 114 processes a constructed prompt asynchronously, returning structured outputs that may include rendered text, MathML, MathJax or Latex formulas, image references, or interactive component definitions. For screenshot-supported content, the Control Server 116 aligns generated items with associated visual frames extracted from the source documents or video streams. The alignment logic can use cosine similarity on captioned frames or timestamp-based anchoring. Matched images are referenced in the output package without embedding them directly in the prompt, improving token efficiency and reducing latency. In at least one embodiment, question content generated by the LLM 114 is scoped using the internal tagging system aligned with topic and subtopic levels. The Control Server 116 verifies whether generated questions overlap with existing items in the Approved Knowledge Units database 108 and de-duplicates based on semantic similarity and metadata match. For cases where faculty require integration with existing institutional question banks, the API Server 106 queries external question repositories to append validated items under the selected topic headings. This enables mix-and-match plans combining generated and pre-approved instructional artifacts.

In at least one embodiment, summative patient case scenarios are generated when the faculty selects the corresponding checkbox during setup. The LLM 114 is prompted with multi-topic segments and instructed to interlink the concepts into a coherent patient scenario, such as presenting a cardiovascular patient with embedded sub-questions on diagnosis, risk factors, and drug interactions. These cases are formatted in a cascading Q&A flow and annotated with logical branching metadata to enable adaptive rendering within the remediation plan. In at least one embodiment, for math-intensive domains such as pharmacokinetics or dosage calculations, the Control Server 116 appends a step-by-step flag to the prompt to the LLM 114. Upon receiving the request, the LLM generates solution steps using token-level reasoning chains and includes intermediate outputs for the computation stage. The generated output includes optional hint markers which, when triggered by incorrect student responses, reveal the next valid step or a guided hint. These flags are stored in the response object and enable the Tutoring Engine 118 to modulate the user experience based on real-time inputs.

In at least one embodiment, outputs are returned to the Control Server 116 in a structured package containing content elements, visual assets, media references, and interaction flags. The Control Server 116 then serializes this package into the remediation plan object stored in the Plan Builder Module. Content is segmented by topic and subtopic for future reuse, and stored in a cache layer to avoid regeneration on identical inputs, reducing compute load and network bandwidth consumption. Compression of MathML content and reuse of common screenshots further optimize payload size.

In at least one embodiment, faculty members may bypass granular setup by using a default configuration preset stored in their institution profile. Upon loading the default profile, the Control Server 116 applies pre-selected content generation types, default topic mappings, and preferred visual settings. Faculty may then selectively override individual fields before submitting the generation request. This two-tier design allows for rapid setup while supporting customization at the session level, enabling a scalable approach across diverse institutions and instructional contexts.

In at least one embodiment, the Control Server 116 integrates the generated content into both remediation and tutoring workflows. Depending on the user flow, the same generated outputs can be embedded into structured tutoring pathways or reactive remediation plans. Tag alignment ensures that generated content maps consistently across both workflows, enabling uniform diagnostic tracking and analytics integration. Centralized logging of prompt inputs and generated outputs facilitates audit trails, versioning, and future retraining datasets. The selective prompt generation reduces token consumption, screenshot alignment without in-prompt image embedding for lower LLM compute overhead, reuse of generated summaries and visuals for reduced recomputation. The system improves efficiency in dynamic plan creation while maintaining domain-specific accuracy and flexibility across user-configured settings.

In at least one embodiment, the Adaptive Learning Control Server 116 enables automated or manual configuration of remediation plans. Faculty users can construct a plan manually using the user interface rendered on User Device 102 or may trigger automated plan generation workflows. During automated generation, uploaded source materials such as PDFs or lecture slides are parsed by the Control Server 116, and subtopic extraction is performed based on structural markers. Subtopics such as diagnosis or treatment are identified and associated with summary outputs produced by the LLM 114 under constrained prompting. Summaries and extracted elements are stored in Reference Materials database 110 and linked to plan steps.

Question-and-Answer Pair Generation and Validation

In at least one embodiment, the Adaptive Learning Control Server 116 generates question-and-answer (Q&A) pairs as the canonical remediation units of the system. A Q&A pair encodes a faculty-approved concept or skill at topic, subtopic, and sub-subtopic granularity. The Approved Knowledge Units Database 108 stores these records with hierarchical tags (e.g., S_Cardiovascular, C_Angina, C2_Diagnosis). The structured tags provide deterministic mapping of Q&A items to specific domains, enabling indexing and retrieval during downstream execution. The granularity constrains runtime interactions to vetted content, reducing risks of cross-reference inconsistency or hallucination.

In at least one embodiment, Q&A pairs are generated during the setup phase following ingestion and summarization of instructional resources. The Reference Materials DB 110 stores uploaded faculty resources such as PDFs, slides, videos, or URLs. The Adaptive Learning Control Server 116 parses these resources into structured segments and constructs chained prompts for the LLM 114. A prompt incorporates pre-approved summaries, metadata identifiers, and previously validated Q&A items. The chaining ensures that new and diverse Q&A pairs are contextually bound to faculty-provided materials and cannot draw upon uncontrolled model knowledge. Draft pairs are returned from the LLM 114, hashed for integrity, and staged for faculty review.

In at least one embodiment, the Adaptive Learning Control Server 116 generates candidate question-and-answer pairs from authorized instructional sources stored in the Reference Materials DB 110. The server constructs constrained context prompts for the LLM 114, incorporating faculty-uploaded resources and previously validated records. This constrained input minimizes the model from introducing external or unverified knowledge during inference. The LLM 114 outputs draft Q&A pairs that are hashed for integrity and stored in a staging schema. The staging process isolates unapproved content from active runtime operations, ensuring that validated material is later deployed. In at least one embodiment, the system supports both automated and manual creation of Q&A pairs. Automated generation leverages LLM 114 inference under constrained context, significantly improving efficiency by reducing faculty workload during initial plan construction. Manual creation allows faculty members to author question-and-answer entries directly through the User Device 102 and submit them via the API Server 106 for storage in the Approved Knowledge Units DB 108. In both cases, deployment of Q&A pairs into active remediation flows requires faculty approval, ensuring validation before runtime usage.

In at least one embodiment, all draft Q&A pairs undergo approval before becoming active records. The Adaptive Learning Control Server 116 transmits the draft pairs to the User Device 102 through the Web Server 104, where faculty may edit or approve the content. Approved records are stored into the Approved Knowledge Units DB 108 with metadata including difficulty level, Bloom's taxonomy alignment, and provenance markers. Difficulty levels (easy, medium, hard) are encoded as ordinal fields, while Bloom's level indicators (recall, application, analysis) are stored as enumerated types. The schema supports selective retrieval during runtime, ensuring that evaluation complexity aligns with user performance.

In at least one embodiment, the Q&A pairs are used as the execution units for tutoring and remediation flows. During student sessions, the Adaptive Learning Control Server 116 retrieves the designated Q&A record, packages the question text and reference answer into a lightweight prompt payload, and submits it to the LLM 114 for semantic equivalence evaluation against the student's submission. Because evaluation is performed against a single approved answer, the payload size remains minimal, reducing token consumption and inference cost. Cached records further reduce repeated retrievals and improve compute efficiency during concurrent sessions.

In at least one embodiment, the remediation plan is expressed as a structured collection of pre-approved Q&A pairs rather than a generic list of topics. The pair is bound to a specific instructional domain such as diagnosis, treatment, pathophysiology, risk factors, or monitoring parameters. The granularity is encoded using hierarchical tags in the Approved Knowledge Units DB 108, enabling precise mapping of evaluation steps to validated content. The Adaptive Learning Control Server 116 retrieves the designated Q&A items and constructs runtime payloads that define the step sequence transmitted to the User Device 102.

In at least one embodiment, the Adaptive Learning Control Server 116 selectively activates remediation steps based on performance analytics. Data from the LMS 112, including past grades or missing assessments, is filtered by time thresholds such as 30, 60, or 90 days. The control server 116 applies conditional logic to determine whether a student requires engagement with specific Q&A pairs. For example, a deficiency in treatment-related Q&A items within the past 60 days can trigger activation of treatment-tagged steps, while strong performance in diagnosis may suppress those steps. This targeted application reduces unnecessary processing, lowers bandwidth requirements, and focuses compute resources on true areas of weakness. In at least one embodiment, Q&A pairs power adaptive flows tied to tagged weaknesses rather than generic topic lists. Performance data received from LMS 112 is filtered by hierarchical tags that may include multiple tiers, such as Tier-1, Tier-2, Tier-3, or additional levels as defined by institutional configuration. For example, Tier-1 may correspond to a subject domain, Tier-2 to a subdomain, and Tier-3 to a specific objective. The filtered data is correlated against stored Q&A identifiers to determine proficiency or deficiency at the appropriate level of granularity. If deficiencies are detected, the Adaptive Learning Control Server 116 conditionally includes the corresponding Q&A steps in the runtime plan. For example, if a student demonstrates proficiency in angina diagnosis but deficiencies in angina treatment, the treatment-tagged pairs are activated. This reduces time spent on non-deficient areas, improves system efficiency, and reduces redundant LLM interactions.

In at least one embodiment, approved Q&A pairs constrain both instructional content and feedback delivered during sessions. When students submit answers, the Adaptive Learning Control Server 116 constructs evaluation prompts containing the student response and the corresponding approved answer. The LLM 114 compares the two inputs and returns correctness or graded similarity, along with guided feedback constrained by the approved context. This ensures that all tutoring and remediation interactions remain consistent with validated institutional material, reducing reliance on uncontrolled model outputs. In at least one embodiment, Q&A pairs also enable iterative, context-aware hints without revealing answers. The record can include optional derivation steps or linked summaries retrieved from the Reference Materials DB 110. When a student provides an incorrect response, the Adaptive Learning Control Server 116 reuses the same Q&A context but appends incremental hint directives to the LLM 114 prompt. This produces guided feedback while conserving bandwidth and minimizing uncontrolled model output. In at least one embodiment, students are considered remediated when they demonstrate proficiency in answering the designated set of approved Q&A pairs. During execution, the Adaptive Learning Control Server 116 retrieves the reference answer associated with the active question and compares the student's submission through semantic evaluation performed by the LLM 114. The use of a single approved reference ensures that evaluation is bounded, consistent, and repeatable across sessions. Correctness is determined using semantic equivalence rather than keyword matching, reducing brittleness and improving accuracy for natural language responses.

In at least one embodiment, Q&A pair outcomes are aggregated for analytics. The Adaptive Learning Control Server 116 logs evaluation results per pair, storing correctness flags, attempt counts, and hint usage. The records are rolled up into analytics tables linked to the Approved Knowledge Units DB 108. Faculty dashboards rendered on User Device 102 display performance hierarchies across hierarchical tags that may include one or more levels. In one embodiment, the tags are designated as Tier-1, Tier-2, and Tier-3 levels, representing progressively granular subdivisions of a knowledge domain. In another embodiment, the hierarchy may be expressed as Domain, Subdomain, and Objective levels, or alternatively as Topic, Subtopic, and Concept levels. The system is configurable such that faculty may define the number of hierarchical layers and the naming convention applied. These hierarchies reveal weakness patterns at both individual and cohort scales. This structured analytics framework enhances monitoring without requiring unbounded free-text analysis.

In at least one embodiment, faculty are given the opportunity to pre-approve all Q&A answers used during remediation. When instructors upload resources such as PDFs, the control server 116 parses them and generates candidate Q&A pairs through constrained prompting of the LLM 114. These drafts are staged in provisional tables and transmitted to the User Device 102 for faculty review. Faculty may approve, edit, or reject the Q&A pair. Approved pairs are then written into the Approved Knowledge Units database 108 with provenance markers.

The approval process reduces liability and inconsistency risks that arise when different references provide conflicting answers. By ensuring that reviewed Q&A pairs are used in evaluation, the control server 116 minimizes exposure to unverified LLM outputs. For example, in pharmacology, dosage recommendations may vary across sources. Faculty approval locks in the dosage considered correct for exam or institutional purposes, avoiding confusion. In at least one embodiment, question-and-answer pairs generated or linked to a topic are retrieved from the Knowledge Unit Store 108 and associated with the hierarchical structure. The question object includes tags for topic alignment, difficulty level, and reference source. These are filtered based on whether the question is AI-generated, institution-submitted, or imported from a partner bank. Questions are ranked based on alignment confidence with the detected subtopic and may be further scored using historical student performance data if available. This ranking enables prioritized selection during remediation plan creation.

The technical advantage of the architecture includes constraining model calls to pre-approved Q&A pairs and summaries so that the system limits hallucinations, reduces token overhead, and ensures semantic consistency across sessions. The combination of prompt chaining for generation, lightweight payloads for evaluation, and caching for reuse delivers improved compute efficiency and reduced data consumption during large-scale tutoring and remediation operations.

In at least one embodiment, the Adaptive Learning Control Server 116 generates summaries from uploaded lecture slides or other source files through a constrained prompting process. The parsed blocks are transmitted to the LLM 114 with directive templates that require alignment to standard categories, including origin, diagnosis, treatment, risk factors, and monitoring parameters. The constraints embedded in the prompt ensure that concepts present in the uploaded resource are extracted. Generated summaries are transmitted back to the Control Server 116 and written to the Reference Materials DB 110 in dual formats for display and for token-efficient context reuse.

In at least one embodiment, faculty users may edit the automatically generated summaries prior to storage. The Control Server 116 provides an interface through the User Device 102 for inline editing. The modified content is versioned within the Reference Materials DB 110, with deltas stored separately from the base record. This ensures traceability while minimizing unnecessary regeneration of the original summaries. Versioning logic allows institutions to preserve both the system-generated base and the human-edited version, improving accuracy and adaptability to institutional standards.

In at least one embodiment, during initial configuration, the Adaptive Learning Control Server 116 organizes uploaded faculty resources into structured repositories rather than initiating any model retraining. The uploaded lecture slides or equivalent documents are processed into text blocks aligned to defined subtopics. The subtopic entry is stored with metadata fields that include editable summaries, learner-visible text, and associated external links. These records are maintained within the Reference Materials DB 110 and are indexed under a single container object that represents the remediation or tutoring plan for the designated topic.

In at least one embodiment, the plan container defines the top-level scope for execution. A topic such as diabetes is represented as a plan object stored in the Structured Content Repository. The plan object references its subtopics and optional sub-subtopics. Subtopics comprise identifiers linking to summaries, text, and external resource links. The Control Server 116 provides this hierarchy through relational table structures keyed by topic, subtopic, and plan identifiers. This hierarchical indexing reduces lookup time during runtime and improves computational efficiency during concurrent plan retrieval.

In at least one embodiment, the Adaptive Learning Control Server 116 organizes remediation and tutoring processes into hierarchical categories. The hierarchy includes both subject-specific domains and cognitive-level differentiation. Subject-specific domains correspond to technical fields such as dosage calculation, pharmacokinetics, or risk factor identification. Cognitive-level categories align with structured reasoning layers, including recall, application, and analysis. This dual structure enables the control server 116 to assemble plan sequences that operate across multiple abstraction levels within the same topic. In at least one embodiment, the Control Server 116 implements Bloom's taxonomy categories by encoding metadata tags at the Q&A record level in the Approved Knowledge Units DB 108. Basic recall items are flagged for direct equivalence checking, while higher-order application and analysis items include embedded case scenarios with branching logic. These scenarios may require diagnostic reasoning and treatment selection. The Control Server 116 binds the scenario to structured tags that provide consistency across subtopics. This implementation provides a balanced workload to the LLM 114 and reduces repeated calls by reusing scenario objects stored in the staging schema.

In at least one embodiment, the system architecture supports both historical performance-based initiation and diagnostic-test-based initiation. When performance data is available from LMS 112, the Adaptive Learning Control Server 116 filters records based on time thresholds and constructs remediation pathways using aggregated correctness vectors. When an institution elects to initiate a diagnostic assessment, the results are transmitted to the Control Server 116 through the API Server 106. The scores are processed in the same tagging schema as LMS-derived data. The dual support permits either accumulated data or institution-driven testing to seed a remediation or tutoring pathway.

In at least one embodiment, the Control Server 116 applies normalization logic to merge diagnostic assessment results with historical LMS 112 data. Conflicts between diagnostic test outcomes and accumulated performance records are reconciled using weighted averages stored in the performance table. The reconciliation minimizes overrepresentation of outlier diagnostic results and maintains stability in pathway generation. This reduces repeated recalculation during concurrent sessions and improves computational efficiency by leveraging cached performance vectors.

In at least one embodiment, system setup from a zero state begins at the level of a defined clinical or technical topic. A faculty user, or an administrator acting on behalf of an institution, transmits the topic structure to the Adaptive Learning Control Server 116 via the User Device 102. Subtopics and sub-subtopics are encoded as hierarchical identifiers, which are stored in the Structured Content Repository maintained by the Control Server 116. The identifiers form the index for subsequent uploads and for metadata-tagged Q&A retrieval.

In at least one embodiment, the Control Server 116 receives source files aligned to the defined subtopics. Primary resources can include lecture slides in presentation format, PDF files, or structured text documents. The files are uploaded through the API Server 106 and cached for parsing. Parsing modules segment slides by heading markers and positional layout. Extracted sections are stored as normalized blocks in the Reference Materials DB 110. These blocks are indexed with the subtopic identifiers, ensuring that retrieval remains scoped to the designated hierarchy. In at least one embodiment, the Control Server 116 transmits parsed subtopic blocks to the LLM 114 for automated summary generation. A constrained prompting template requests output in the form of structured clinical categories, including origin or pathophysiology, diagnostic features, treatment protocols, risk stratification, and monitoring parameters. The LLM 114 produces distinct summary records for the subtopic, which are returned to the Control Server 116. The summaries are persisted in the Reference Materials DB 110 in both display-optimized HTML and token-efficient plain text formats.

In at least one embodiment, separate summaries are generated for individual subtopics within a broader topic. For example, diagnosis summaries and treatment summaries are maintained as discrete records. The record is associated with its own identifier and version history in the Reference Materials DB 110. By separating summaries, the Control Server 116 is able to construct more precise context payloads for the LLM 114. This selective payload assembly reduces token consumption and improves throughput when concurrent tutoring and remediation sessions are executed.

In at least one embodiment, the separation of hierarchical tagging, diagnostic seeding, and subtopic-level summary generation provides technical advantages. Token usage is reduced by constructing minimal context payloads. Redundant model calls are avoided through caching of summaries and reuse of scenario objects. Database growth is constrained by referencing existing identifiers rather than duplicating records. Together, these implementations improve computing efficiency, reduce network bandwidth consumption, and enable concurrent delivery of tutoring and remediation workflows at lower operational cost.

In at least one embodiment, the Adaptive Learning Control Server 116 uses reference answers tied to the approved question to control runtime interactions. The reference answer is stored in the Approved Knowledge Units DB 108 alongside its associated question record. During tutoring or remediation execution, the Control Server 116 transmits the reference answer with the question to the LLM 114. This constrains inference, ensuring that generated outputs remain consistent with faculty-provided content. The design minimizes hallucinations by bounding evaluation strictly to validated materials. In at least one embodiment, faculty retain the ability to edit or replace both the questions and the associated reference answers. The edits are submitted through the User Device 102 and processed by the API Server 106 for storage updates. The Control Server 116 also permits faculty to attach additional contextual resources to a question record, including video links, external URLs, or embedded files. These resources are stored in the Reference Materials DB 110 with metadata identifying the associated question identifier.

Lesson Plan Composition and Content Integration

In at least one embodiment, the Adaptive Learning Control Server 116 constructs a structured lesson plan by supplying the LLM 114 with a combined context derived from approved summaries, validated Q&A pairs, and linked source materials retrieved from the Reference Materials DB 110. The LLM 114 returns a set of logically ordered learning steps rather than a disconnected list of items. Among the generated outputs are high-level instructional summaries derived from source inputs, which are stored in the Reference Materials DB 110 and may serve both as display content and as constrained context for subsequent tutoring prompts. In at least one embodiment, the lesson plan further incorporates free-format Q&A pairs with corresponding approved answers, links back to original resources such as lecture slides, documents, or videos, and an ordered sequence of steps. The sequence is managed by the Adaptive Learning Control Server 116, which encodes the flow into a structured metadata object specifying the progression across summaries, Q&A evaluations, and external references.

In at least one embodiment, the Adaptive Learning Control Server 116 associates remediation plan steps with page-level references extracted from the source materials. Page numbers or timestamp metadata are included as attributes on the step record and presented on the User Device 102 interface to guide users to the relevant sections of source content. This reference alignment is maintained across summary, video, and question types. Summaries used as LLM input are also tagged with these references, enabling token-efficient prompt construction and improved content traceability. In at least one embodiment, the Adaptive Learning Control Server 116 retrieves a pre-configured default remediation plan from internal configuration storage upon detection of a referral event or upon request by an administrator. The default plan is assembled from preloaded instructional assets residing in the Reference Materials database 110 and Approved Knowledge Units database 108. The plan comprises structured content steps aligned to a standardized topic taxonomy. The step is indexed by topic and subtopic identifier and linked to a specific content type, including system-generated summaries, instructional hyperlinks, and multimedia assets. The default plan is optionally designated as institution-specific or system-level, allowing reuse across deployments. In at least one embodiment, the Control Server 116 exposes an administrative configuration interface through the User Device 102 that enables modification of the default plan. Administrators from institutional clients may elect to use the system-provided plan as-is, modify specific components, or construct a custom plan from zero state. Plan customization options include replacing system-generated summaries with faculty-authored versions, inserting additional reference links, or expanding the question pool for a given topic using institution-approved Q&A records. Plan overrides are recorded in a configuration delta layer separate from the base plan, allowing version control and rollback.

In at least one embodiment, the Control Server 116 compiles the full lesson plan as a sequence of instructional steps. The step includes a content identifier, step type (e.g., summary, video, quiz), navigation metadata, and completion tracking flags. The compiled plan object is stored in the Content Plan database and is associated with a user cohort or course identifier. The Control Server 116 returns a unique plan token that is used by the Tutoring Engine 118 to retrieve and deliver the plan during session runtime.

In at least one embodiment, linked resources such as external videos or LMS 112-hosted files are indexed by the Control Server 116 using URL normalization and tagged to topic identifiers. During lesson plan generation, these links may be inserted into the plan as optional or required steps. The metadata for the link includes format type, estimated duration, and access permissions. The system uses these parameters to render playback or file preview components conditionally on the User Device 102. In at least one embodiment, lesson plans generated through this method may include composite question formats. For example, for clinical training modules, the LLM 114 may return case-based questions where a single patient scenario triggers multiple follow-up questions across diagnosis, pathophysiology, and treatment subtopics. These composite question blocks are stored with internal branching metadata, allowing the Control Server 116 to sequence them adaptively during execution by the Tutoring Engine 118.

In at least one embodiment, the lesson plan output is validated for alignment with standardized exam structures. The Control Server 116 compares the plan components against a standards map derived from national licensing test blueprints stored in the internal taxonomy service. The instructional item is checked for compliance with topic coverage requirements and content format rules. If a mismatch is detected, the Control Server 116 generates a validation report for faculty review. This report is rendered via the UI Server and allows manual override or content substitution.

In at least one embodiment, the system 100 maintains agnosticism regarding the origin of approved content. Whether question items or summaries originated from faculty upload, prior LLM sessions, or third-party vendors, the Control Server 116 applies the same indexing and tagging protocol. This allows unified access during plan generation and ensures that plan output remains consistent regardless of content source. The indexing logic improves lookup efficiency, and the composite prompt strategy reduces token consumption during generation by avoiding redundant context expansion.

In at least one embodiment, system-generated summaries are constructed by the Adaptive Learning Control Server 116 through automated processing of uploaded reference texts or chapter documents. Upon upload via User Device 102, documents are parsed and segmented using layout markers. The Control Server 116 performs subtopic detection based on keyword clustering and metadata extraction, and then submits the segment to the LLM 114 for summary generation using a constrained prompt template. The summary output is encoded using HTML and MathML, MathJax or Latex for rendering on front-end interfaces and persisted in the Reference Materials database 110. In at least one embodiment, system-generated summaries are stored in editable format allowing for immediate modification by faculty. Upon generation, summaries are presented in a structured interface on the User Device 102 with inline edit functionality. Edits are captured through the API Server 106 and versioned within a delta overlay linked to the summary identifier. This allows faculty to validate summary accuracy, revise tone or terminology, and ensure that auto-generated content aligns with institutional requirements. Human edits override the system-generated base without requiring reprocessing of the source material.

In at least one embodiment, the Control Server 116 compiles the structured data into a lesson plan format, which includes sequential instructional elements. A lesson plan object may contain: (i) subtopic summary, (ii) external resource link, (iii) embedded instructional video, (iv) static display material, and (v) pre-approved question set. The of these elements is time-stamped and associated with metadata indicating access control, completion requirement, and conditional navigation logic. The assembled plan is cached and delivered through the Tutoring Engine 118 when invoked.

In at least one embodiment, the LLM 114 may be instructed to create interactive scenarios or clinical use cases, especially in domains such as pharmacy and nursing. For example, within a cardiology subtopic such as angina, the LLM may generate a patient case that involves diagnosis, treatment selection, and monitoring interpretation. These cases are tied to multiple sub-subtopic tags and support branched learning flows. The Control Server 116 links these outputs to the relevant remediation plans and stores the branching metadata to enable adaptive step progression.

In at least one embodiment, summaries produced by the LLM 114 are formatted in HTML or Markdown and stored both as plain text for display and as token-trimmed versions for inclusion in LLM prompts. Math-based summaries, such as pharmacokinetics equations, are rendered using MathML or MathJax or Latex. The Control Server 116 flags these entries for client-side rendering using compatible libraries, reducing bandwidth consumption by avoiding pre-rendered image transfers. Summaries may also be cached at multiple resolution levels to support preview versus full-text rendering.

In at least one embodiment, faculty users interacting through the UI served by the API Server 106 may review the generated topic hierarchies and summaries via a topic editing interface. This interface allows manual overrides, drag-and-drop reordering, and substitution of generated content. All changes are versioned and stored as delta records within the structured data repository. This mechanism allows faculty to align the automated plan with institutional standards while preserving an audit trail of modifications.

In at least one embodiment, the Adaptive Learning Control Server 116 integrates arbitrary resource links into the remediation plan. Links are ingested through a configuration interface and assigned to steps using topic-aligned tags. Supported link types include internal LMS 112 resources, externally hosted files, video platforms, or interactive web content. Metadata such as content type, access permissions, and estimated duration are associated with the link and stored in the Reference Materials database 110. Links are presented in read-only display mode to end users and rendered with conditional logic depending on user role and access level. In at least one embodiment, all content components, including summaries, links, and multimedia files, are assembled by the Control Server 116 into a linear or branching step sequence. A step includes metadata such as display order, preconditions, and optional completion gating. Adaptive steps following the instructional content are selected from the Approved Knowledge Units database 108 using topic-level tag filters and are validated against the plan's designated scope. The resulting remediation plan is serialized and stored as a plan object indexed by institution, topic, and plan type, enabling efficient retrieval and reuse. The constrained topic normalization reduces prompt drift during generation, efficient reuse of normalized summaries across plans, structured relational storage enabling low-latency access, and separation of display versus context formats for reduced token count in LLM calls.

In at least one embodiment, institutions with smaller operational capacity deploy the default system plan without modification, allowing remediation support using a baseline instructional dataset. In contrast, larger institutions configure custom variants to reflect internal curricula, proprietary content, or assessment alignment. This dual-mode provisioning model enables operational scalability while preserving flexibility. Pre-generated summaries and embedded MathML allow for content compactness and browser-native rendering, reducing token consumption during inference and minimizing external bandwidth usage during content delivery.

Remediation Plan Triggering and Referral Logic

In at least one embodiment, the Adaptive Learning Control Server 116 triggers remediation plan generation or activation based on student performance data ingested from the LMS 112 or collected during in-system activity. Performance metrics include quiz results, assessment timestamps, and tagged correctness vectors. The data is filtered by time range such as 30, 60, or 90 days, and analyzed against predefined thresholds. Referral rules are executed based on hierarchical tag prefixes that may span multiple tiers, such as Tier-1, Tier-2, Tier-3, or further levels as configured. For example, Tier-1 may represent a domain, Tier-2 a subdomain, and Tier-3 an objective. The rules apply corresponding average score thresholds at the designated tier to determine whether referral conditions are met. When a rule is matched, the Control Server 116 schedules plan activation and logs the trigger event for auditing.

In at least one embodiment, the referral event logic is configured as a ruleset within the Adaptive Learning Control Server 116. Rule objects comprise tag constraints, evaluation windows, minimum score thresholds, and triggering conditions. The rules are activated based on input data transmitted via the API Server 106 and may originate from the LMS 112 or internal logs. The matched rule generates a remediation assignment record indexed by user, tag, and plan identifier. Assignments are persisted in internal tables and retrieved during plan rendering on the User Device 102.

In at least one embodiment, referral triggers can be activated manually or by direct faculty interaction. The Adaptive Learning Control Server 116 supports input APIs for faculty-initiated overrides submitted via the User Device 102. Manual referrals are recorded with override metadata indicating the referral type and authoring user. Similarly, self-referral entries initiated by students are processed through a configurable interface option and stored with a corresponding flag.

Adaptive Execution Using Question-and-Answer Pairs

In at least one embodiment, the Adaptive Learning Control Server 116 constructs remediation flows around Q&A pairs aligned to identified weaknesses. Weakness detection is performed at subtopic resolution using C2_ tags stored in the Approved Knowledge Units database 108. For example, when a student fails questions associated with a given C2_tag, the Control Server 116 assembles a plan that includes steps associated with that sub-concern. Steps related to demonstrated strengths are omitted based on performance analytics. This reduces plan length and token usage during LLM evaluation, contributing to computational efficiency and reduced operational cost.

Fallback Mechanisms and Failure Handling

In at least one embodiment, when a student is unable to achieve mastery within the assigned plan, the Adaptive Learning Control Server 116 logs repeated failures and presents corresponding analytics to faculty through the dashboard rendered on User Device 102. The dashboard aggregates attempt counts, correctness vectors, and tag-specific outcomes. If configured, the Control Server 116 enables manual construction of a secondary plan, which may exclude AI-driven steps and include faculty-authored content. This fallback mechanism is triggered upon detection of persistent failure patterns and supports continuity of instruction while maintaining audit records. In at least one embodiment, the Adaptive Learning Control Server 116 aggregates and indexes student response records using hierarchical tagging to support future referral decisions and analytics queries on configurable types, domains of graded content subject to inclusion and inclusion criteria. For a question attempt, the response is associated with hierarchical tags that may include multiple tiers such as Tier-1, Tier-2, Tier-3, or additional levels defined by institutional configuration. For example, Tier-1 may correspond to a domain, Tier-2 to a subdomain, and Tier-3 to a specific objective. This enables the Control Server 116 to identify performance trends and generate filtered retrievals of weakness vectors. The tagging structure also enables more granular caching and reuse of LLM context prompts, reducing repeated token processing and optimizing inference performance across student sessions. Technical advantages include improved computational efficiency through selective summary and Q&A retrieval, reduced token consumption via context reuse and caching, and improved performance targeting through subtopic tagging. The configuration provides for scalable, multi-role support with fine-grained control of tutoring and remediation plan construction across institution-specific requirements.

In at least one embodiment, once summaries are approved and stored, they function as dual-purpose content. First, the summaries are presented through the Web Server 104 to the User Device 102 as learner-facing instructional content. Second, they are assembled by the Adaptive Learning Control Server 116 into constrained context payloads for the LLM 114 during question generation or tutoring evaluation. This dual role reduces redundant storage by reducing the need for separate context files and display files.

In at least one embodiment, the use of summaries as validated context boundaries improves computational efficiency. Faculty-approved Q&A pairs retrieved from the Approved Knowledge Units DB 108 provide one layer of constraint. Summaries stored in the Reference Materials DB 110 provide an additional validated boundary. During runtime, the Control Server 116 appends both layers to the LLM 114 prompt payloads. This ensures that the generated questions or tutoring interactions remain within the scope of approved material. The implementation minimizes the model from introducing external content, reducing hallucinations, and lowering inference cost by keeping the token context compact and consistent.

In at least one embodiment, the inclusion of summaries in a prompt incurs a computational overhead. Summaries stored in the Reference Materials DB 110 are appended by the Adaptive Learning Control Server 116 to the LLM 114 context payload. Since the model operates under token-metered billing, long summaries inflate operating costs. In at least one embodiment, a mitigation strategy is implemented through context caching. Static portions of a prompt, including summaries that remain constant for a given topic, are cached with the model provider when supported by the LLM interface. The Control Server 116 transmits a cache identifier rather than the full summary text for subsequent calls. This reduces redundant token consumption and lowers aggregate inference cost. The approach also improves throughput by reducing repeated payload assembly for unchanged context.

In at least one embodiment, by the conclusion of the setup phase, the Adaptive Learning Control Server 116 maintains a structured repository of topics, subtopics, and approved summaries. An entry is indexed in a content repository with identifiers for display content and token-efficient context content. These records are accessible both for student-facing rendering through the Web Server 104 and for prompt construction in subsequent tutoring or remediation flows. In at least one embodiment, the repository forms provides for downstream operations, including generation of question-and-answer pairs and assembly of adaptive pathways. By maintaining topic and subtopic granularity, the Control Server 116 ensures that subsequent Q&A generation remains scoped to validated subtopic content. This hierarchical structuring reduces redundant processing during runtime and establishes an efficient baseline for tutoring and remediation plan execution.

In at least one embodiment, the Adaptive Learning Control Server 116 generates a faculty-facing dashboard interface rendered on the User Device 102. The dashboard retrieves student performance records from the LMS 112 and the internal plan completion logs managed by the Control Server 116. Data is grouped by hierarchical tags such as Tier-1, Tier-2, and Tier-3 levels, which may also be expressed as Domain, Subdomain, and Objective identifiers, or alternatively as Topic, Subtopic, and Concept markers. For example, a Tier-1 tag may correspond to a cardiovascular domain, a Tier-2 tag to angina as a subdomain, and a Tier-3 tag to diagnosis as a specific objective. The grouped data is displayed in structured matrices showing recent and historical performance across these hierarchical levels. Metrics include percentage correctness, attempt counts, and completion indicators. All interactions are filtered based on faculty-specified cohorts, course identifiers, graded item type, and inclusion/exclusion criteria (e.g. "include midterm, ignore practice tests" or "include specific tests, exclude specific tests") and timeframes to allow scalable monitoring across diverse instructional deployments.

In at least one embodiment, the Control Server 116 exposes faculty referral functionality directly through the dashboard interface. Upon viewing a student's topic-level performance, a faculty user may activate a referral via input controls embedded within the dashboard. The referral is recorded in the remediation assignment table with metadata identifying the referral type as faculty-initiated and time-stamped with the event trigger. Plan generation is initiated using the same step assembly engine used for automatic referrals, allowing consistent plan construction regardless of referral modality.

In at least one embodiment, the Adaptive Learning Control Server 116 compiles post-remediation analytics that are displayed via the faculty dashboard. After students complete remediation plans, including summary reviews and Q&A steps, the Control Server 116 records a binary completion status and generates a post-plan summative grade. Completion tracking uses step-level completion flags, while summative scores are calculated from designated assessment questions tagged to the same topic taxonomy. This information is surfaced to the instructor in tabular form to provide rapid visibility into the effectiveness of assigned plans.

In at least one embodiment, the Adaptive Learning Control Server 116 executes two modes of student performance analysis. The first implementation mode is counter-based, where answer correctness is tallied per tag, and threshold comparisons are used to identify proficiency or deficiency. The second mode passes answer vectors and associated tags to the LLM 114, which is prompted to detect conceptual patterns or misconceptions. The LLM output includes topic-specific insights, which are rendered in the dashboard alongside the raw numerical metrics. This dual-path analysis enables fallback to lightweight operations when compute capacity is constrained, improving system flexibility.

In at least one embodiment, the Adaptive Learning Control Server 116 coordinates visualization for both faculty and student dashboards. While the faculty dashboard displays aggregated views across users and tags, the student dashboard presents topic-level remediation status. Tags associated with unresolved deficiencies are flagged and rendered with elevated priority in the user interface. This parallel visibility ensures instructional alignment while reducing redundant communications. System automation of detection, referral, plan execution, and reporting improves data transfer efficiency between analysis, instruction, and tracking modules.

Student-Facing Execution and Interface Rendering

In at least one embodiment, when a referral event is triggered, the Adaptive Learning Control Server 116 generates an assignment record and transmits it to the User Device 102 for student access. The record includes a plan identifier, a topic scope, and the associated remediation steps. The Web Server 104 renders the assignment in the student interface, providing that the student is directed to the plan that has been provisioned by the referral logic.

In at least one embodiment, once the assignment is opened, the student interface displays the remediation or tutoring steps in the order configured by the Control Server 116. The step is transmitted as a metadata object including step type, resource links, and navigation parameters. The Web Server 104 presents these steps sequentially on the User Device 102. This implementation ensures consistent ordering between what is stored in the step-sequencing table and what is rendered for the student during runtime.

In at least one embodiment, the student interface also includes a navigation panel that lists the primary topics associated with the plan. Topics such as pathophysiology, diagnosis, or treatment are displayed as identifiers in a side panel. The panel updates dynamically as steps are completed, providing visibility into upcoming content. The panel entries are indexed to the same subtopic identifiers stored in the Structured Content Repository, ensuring alignment between faculty configuration and student view.

In at least one embodiment, when free navigation mode is enabled, the Control Server 116 transmits a complete map of steps to the User Device 102 without providing prerequisite sequencing. The student may select any step from the navigation panel or from the list of steps in the main display area. The Web Server 104 retrieves the requested content by querying the step-sequencing table and renders it directly. The free navigation mode may not result in a completion status until all steps in the plan have been executed. The Control Server 116 withholds completion flags and does not transmit an aggregate grade outcome to the LMS 112 until the student completes the entire set of steps. This ensures that free navigation provides flexibility during the remediation process while maintaining strict conditions for completion tracking and outcome reporting.

In at least one embodiment, the Adaptive Learning Control Server 116 processes remediation assignments at the sub-subtopic level using tag-based performance data. Records tagged with identifiers such as C2_angina_diagnosis are retrieved from the LMS 112 or from internal logs maintained by the Control Server 116. When faculty enable selective completion rules, the Control Server 116 evaluates historical grades against configurable thresholds. If average grades for a sub-subtopic meet or exceed the threshold, the corresponding remediation step may be skipped. If performance falls below the threshold, the Control Server 116 activates the associated step for inclusion in the runtime plan.

In at least one embodiment, the Control Server 116 supports optional completion logic. Faculty may configure whether a sub-subtopic is mandatory, optional, or conditionally activated. These rules are transmitted from the User Device 102 and stored in control tables indexed by subtopic and tag schema. During runtime assembly, the Control Server 116 applies the rules by comparing them with performance data vectors. The outcome determines whether the student is to complete the step, allowed to skip it, or selectively prompted based on deficiencies. This process reduces unnecessary execution of steps for strong performers while preserving coverage for weaker domains.

In at least one embodiment, the Control Server 116 applies time-based filters to performance data when evaluating selective activation. Filters such as 30 days, 60 days, or all-time windows are applied to correctness records retrieved from LMS 112 or internal evaluation logs. Records outside the specified time window are excluded from the analysis. By limiting processing to recent records, the Control Server 116 reduces query overhead and avoids unnecessary retrieval of long-term historical data. This implementation improves computational efficiency by focusing on relevant performance intervals and minimizing database load during concurrent session evaluations. The Adaptive Learning Control Server 116 applies pre-specified rule sets to determine which elements of a plan are presented to the student. Rule sets are defined by faculty through the User Device 102 and stored in rule tables indexed by plan identifier. The rules specify conditions such as prerequisite completion, topic-specific triggers, or score thresholds. During runtime, the Control Server 116 evaluates the rules in sequence and assembles a filtered set of steps for transmission to the User Device 102. The filtering reduces the number of steps rendered, conserving bandwidth and reducing processing cost.

In at least one embodiment, rules may also incorporate metadata from external assessments. For example, results from mock exams, faculty-authored quizzes, or self-generated practice sets are stored in the Approved Knowledge Units DB 108 with associated tags. The Control Server 116 retrieves these records through the API Server 106 and incorporates them into the rule evaluation. This enables cross-source consistency, ensuring that plan elements align with both institutional evaluations and historical performance data. When a step includes a chat interaction element, the Adaptive Learning Control Server 116 triggers the chat flow sequence. The step object includes a chat flag, which is transmitted to the User Device 102 during runtime. Upon activation, the Control Server 116 initializes a chat session object and associates it with the current plan identifier and subtopic tag. The chat session is routed through the Tutoring Engine 118, which constructs the prompt payload for the LLM 114 using the relevant summary and reference answer context.

In at least one embodiment, the chat flow is executed as a real-time interaction. Student responses are transmitted through the Web Server 104 and evaluated against the approved reference answer retrieved from the Approved Knowledge Units DB 108. The Control Server 116 logs the exchange and applies feedback rules stored in the step object. This structure provides that the chat remains bounded by validated content while enabling dynamic interaction. The use of preloaded summaries and reference answers reduces prompt size and minimizes inference latency, improving efficiency during live tutoring or remediation sessions.

In at least one embodiment, the Adaptive Learning Control Server 116 provisions flashcard sets as structured objects stored in the Reference Materials DB 110. Flashcards may be created directly by students through the User Device 102 or assigned by faculty through the same interface. When created by students, flashcard content is transmitted to the Control Server 116 via the API Server 106, parsed into discrete records, and tagged with subtopic identifiers. When assigned by faculty, flashcards are linked to approved content and stored with additional metadata fields such as difficulty level, Bloom's taxonomy alignment, and faculty identifier. The flashcard records are indexed under course and plan identifiers in the Structured Content Repository. This indexing enables retrieval of sets either by topic hierarchy or by specific assignment. A flashcard record comprises front-facing prompt text, a reference answer, and optional multimedia links. The Control Server 116 provides schema separation between display-only components and context-eligible components, ensuring that flashcards are efficiently reused across remediation and tutoring workflows without duplication.

In at least one embodiment, the Control Server 116 supports review of flashcards under a spaced-repetition algorithm. A flashcard record is associated with an interval schedule computed from prior student interactions. When the student selects a review session, the Control Server 116 queries the interaction logs and assembles a queue of flashcards due for review. The queue is serialized into a runtime object and transmitted to the Web Server 104 for delivery to the User Device 102. This reduces redundant processing by avoiding regeneration of flashcards at the session. The interval schedules are updated in real time based on student responses. Correct answers result in exponential spacing of the review interval, while incorrect answers reset the interval to a shorter cycle. The Control Server 116 maintains these schedules in internal timing tables, which are updated without requiring full plan reconstruction. The implementation improves computing efficiency by maintaining lightweight state updates rather than recalculating entire remediation plans.

In at least one embodiment, flashcards are accessible both within the remediation flow and as independent sessions. When accessed within the remediation flow, flashcard steps are linked to subtopics in the Structured Content Repository and appear in sequence alongside summaries and Q&A steps. When accessed independently, the Control Server 116 retrieves flashcard records based on student or faculty selection and delivers them through the Web Server 104 as a standalone session.

In at least one embodiment, the Control Server 116 maintains caching of flashcard payloads for standalone sessions. When a set of flashcards is repeatedly accessed, the Control Server 116 reuses cached objects rather than reassembling the set from the Structured Content Repository. The Adaptive Learning Control Server 116 applies topical constraints on flashcard interactions. During runtime, student prompts entered into the flashcard session are filtered against the assigned topic identifiers. If a student enters a query outside the scope of the remediation or tutoring topic, the Control Server 116 applies a refusal directive to the LLM 114. This directive instructs the model to reject the query and minimizes generation of off-topic responses.

In at least one embodiment, refusal directives are implemented using control flags embedded in the prompt payload. The Control Server 116 appends these flags to the LLM 114 context whenever the flashcard session is executed. This ensures that irrelevant queries, such as conversational requests unrelated to the assigned domain, do not result in unnecessary inference cycles. The implementation reduces token consumption, avoids bandwidth usage on irrelevant responses, and ensures that computational resources remain dedicated to validated instructional flows.

In at least one embodiment, the Adaptive Learning Control Server 116 defines remediation completion through structured question-and-answer records stored in the Approved Knowledge Units database 108. Remediation status is established when a student demonstrates proficiency across designated question sets, rather than by reviewing topic lists or descriptive text. For example, in the case of intubation, the control server 116 determines mastery not by confirming that a student recalls definitions or risk factors, but by evaluating correctness across multiple validated questions. These include what intubation is, when it is indicated, when it is contraindicated, and what risks are associated. The control server 116 retrieves approved reference answers, submits evaluation prompts to the LLM 114, and records equivalence results in structured metadata tables. This architecture provides a question-driven determination of remediation status, which improves computing efficiency by reducing reliance on broad semantic analysis and limiting evaluation to compact approved payloads.

In at least one embodiment, correctness determination is processed by packaging the student submission alongside the reference answer into lightweight evaluation prompts. The prompts are scoped by topic identifiers and transmitted to the LLM 114. Semantic equivalence evaluation is returned in a compact structured format and stored within evaluation logs managed by the control server 116. This design reduces token consumption and network load, since payloads are constructed from approved questions and associated answers. The use of controlled, structured Q&A items improves computational throughput by minimizing unbounded free-text comparisons while ensuring deeper mastery of subject matter.

The tagging structure extends hierarchical classification of instructional content. Tags at the system level (S_), such as cardiovascular, are supplemented by concern-level tags (C_), such as angina. The control server 116 introduces sub-concern tags (C2_), which represent finer levels of granularity, such as types of angina within the cardiovascular system. This hierarchical tagging enables precise classification of content units and targeted alignment of Q&A records. By linking evaluation steps to C2 tags, the control server 116 reduces redundant processing across unrelated subtopics and ensures that relevant records are retrieved during remediation. Although a 3 level hierarchy is shown in the example, other levels of hierarchy are possible.

In at least one embodiment, the tagging structure is implemented through relational database schemas within the Approved Knowledge Units database 108. The Q&A record is indexed by hierarchical identifiers such as Tier-1, Tier-2, and Tier-3 levels. For example, a Tier-1 identifier may represent a subject domain such as cardiology, a Tier-2 identifier may represent a subdomain such as angina, and a Tier-3 identifier may represent a specific objective such as diagnosis. These hierarchical indices enable structured retrieval and alignment of Q&A records with corresponding instructional content. Alias tables and synonym modules are applied to normalize varying nomenclature across institutional datasets. During execution, the control server 116 queries the database using these compound keys to retrieve those Q&A pairs directly associated with the detected deficiency. This approach reduces data consumption by excluding unrelated material, improves latency by minimizing query spans, and enhances precision in triggering remediation plans. Although a 3 level hierarchy is shown in the example, other levels of hierarchy are possible.

The system 100 provides a student-facing tutoring engine that interacts using approved instructional resources. The Adaptive Learning Control Server 116 transmits pre-approved Q&A records to the Web Server 104, which renders them on the User Device 102. During the session, the student receives targeted questions, and responses are evaluated in real time using compact evaluation prompts sent to the LLM 114. When incorrect answers are detected, the control server 116 applies tag-matching logic to select associated summaries or derivation steps stored in the Reference Materials database 110. These are transmitted as context-aware hints, ensuring that guidance is anchored to uploaded instructional content rather than uncontrolled external data.

In at least one embodiment, instructors configure the AI tutor workflow through input interfaces served by the API Server 106. Instructors may authorize the LLM 114 to generate draft reference answers directly from parsed instructional materials or may author and upload their own answers. The control server 116 supports editing of generated drafts before approval, enabling modification of terminology, scope, or answer length. Additional configuration parameters include maximum response time per question, tolerance thresholds for semantic similarity scoring, and incremental hint release policies.

In at least one embodiment, when a student engages with a configured plan, the Adaptive Learning Control Server 116 retrieves designated Q&A pairs from the Approved Knowledge Units database 108 and transmits them to the User Device 102 through the Web Server 104. During execution, the control server 116 provides faculty-defined operational rules, including limits on the maximum number of permitted attempts per question. These rules are stored in sequencing tables and applied during runtime evaluation. The student response is compared against a faculty-approved reference answer, and the outcome is recorded as structured evaluation data. This design avoids rigid character-level matching by applying semantic equivalence logic, enabling acceptance of alternate phrasings that preserve the intended concept.

The faculty users configure alternate evaluation modes. The control server 116 can operate with keyword-matching modules for simpler validation, or with semantic equivalence evaluation for broader tolerance. Keyword matching is implemented by parsing the student's input, extracting tokens, and performing direct comparison against stored keyword fields associated with the reference answer. Semantic equivalence is implemented by packaging the student submission into compact evaluation prompts processed by the LLM 114. These options provide flexibility across institutional settings while ensuring efficient computation by limiting evaluation to targeted answer fields rather than performing unbounded free-text comparisons.

The semantic evaluation is performed by constructing a lightweight query to the LLM 114. The control server 116 assembles a prompt containing the student's submission, the approved reference answer, and optionally a related summary retrieved from the Reference Materials database 110. The LLM 114 returns an evaluation vector indicating whether the student's response is equivalent within configured tolerances. For calculation problems, numerical tolerance thresholds are embedded in the evaluation prompt. This enables detection of acceptable rounding or alternate formats. The structured result is parsed by the control server 116 and logged into performance tables for downstream analytics. The architecture improves consistency with institutional content while reducing computational cost. By restricting model inputs to validated answers and optional summaries, the control server 116 avoids reliance on uncontrolled external knowledge. Compact payload construction reduces token consumption, and caching of common reference answers reduces repeated data transmission. The system thereby achieves higher throughput across concurrent evaluations while preserving alignment with approved material.

In at least one embodiment, the prompt constructed by the control server 116 for semantic evaluation contains three ordered elements. The first is the faculty-approved reference answer retrieved from the Approved Knowledge Units database 108. The second is the student's answer transmitted from the User Device 102. The third is an optional summary segment retrieved from the Reference Materials database 110 that anchors the evaluation within approved instructional context. The control server 116 serializes these elements into a JSON object, encodes directive flags, and submits the prompt through the API Server 106 for inference by the LLM 114.

The directive flags are embedded into the evaluation prompt to constrain model behavior. The control server 116 specifies that the LLM 114 evaluate semantic equivalence and provide corrective feedback without disclosing the correct answer directly. Feedback is generated in the form of incremental hints, guidance statements, or reminders of relevant conceptual frameworks. By providing this control, the architecture minimizes direct answer substitution, ensures that remediation remains an interactive process, and improves efficiency by transmitting compact structured prompts rather than verbose instructional material. This reduces bandwidth usage, lowers inference costs, and supports high concurrency across tutoring and remediation sessions.

Dual-Prompt Construction and Execution

In at least one embodiment, the Adaptive Learning Control Server 116 operates a dual prompt architecture that separates computationally intensive generation tasks from lightweight evaluation tasks. The first prompt is constructed during the lesson plan generation stage. At this stage, the control server 116 retrieves faculty-uploaded instructional resources from the Reference Materials database 110, along with approved Q&A items from the Approved Knowledge Units database 108. The content is normalized, segmented, and combined with metadata tags. The control server 116 transmits this aggregated package to the LLM 114 for plan generation. The size of this payload is substantial, as it can include slide decks, flashcards, and hierarchical outlines.

The lesson plan prompt is processed using the API Server 106 to establish a secure communication channel to the LLM 114. The LLM processes the prompt and returns structured outputs that include summaries, Q&A pairs, topic hierarchies, and ordered step sequences. The control server 116 parses the returned content and writes it to internal step-sequencing tables. The data is serialized into JSON objects for reuse across tutoring and remediation flows. The computational expense of this phase is managed by caching outputs in memory and in staging schemas to avoid reprocessing identical instructional materials. The second prompt is constructed at runtime during evaluation of student responses. This evaluation prompt is smaller and more targeted. The control server 116 retrieves the approved reference answer from the Approved Knowledge Units database 108 and packages it together with the student's submission and, optionally, a summary segment from the Reference Materials database 110. This compact prompt is transmitted through the API Server 106 to the LLM 114, which returns an equivalence evaluation and feedback record.

The dual prompt design separates functions into generation and evaluation flows. The generation prompt is resource-intensive but is executed less frequently, typically at plan setup or faculty configuration stages. The evaluation prompt is executed at higher frequency during live student interactions, but its lightweight design reduces token consumption and inference costs. This separation improves system scalability by reserving compute-intensive resources for plan construction while enabling cost-efficient real-time evaluation during tutoring sessions.

The control server 116 provides efficiency by routing the second prompt to alternative inference engines. For example, while the generation prompt is executed on a general-purpose foundational model hosted externally, the evaluation prompt may be executed on a locally deployed fine-tuned LLM instance. The lightweight payload structure reduces memory footprint and makes local execution feasible, improving response latency and reducing bandwidth consumption. This configuration also enables institutions with limited resources to operate evaluation flows without relying on external compute services.

The directive flags are embedded differently across the two prompt types. The generation prompt includes instructions for topic ordering, Q&A creation, and summary alignment. These instructions require broader context and higher token counts. In contrast, the evaluation prompt includes directives limited to semantic equivalence evaluation and incremental feedback. The control server 116 parses both classes of outputs into structured schema fields and provides strict separation, ensuring that evaluation results are not stored as instructional content and that instructional content is not reprocessed as evaluation input.

In at least one embodiment, the control server 116 employs caching strategies to optimize both prompt types. For the generation prompt, the outputs are cached at the plan level, indexed by institution and course identifiers. This minimizes repeated plan construction for identical course materials. For the evaluation prompt, commonly used reference answers and summaries are cached at the subtopic level. The control server 116 retrieves cached entries to construct evaluation payloads without requiring repeated database queries, reducing latency and network overhead.

The system architecture improves reliability by constraining both prompts to faculty-approved material. The generation prompt ensures that the content created for instructional use is derived from validated resources. The evaluation prompt ensures that student responses are judged against approved answers. This separation mitigates the risk of uncontrolled outputs, including hallucinations, off-topic responses, or low-quality question generation. The control server 116 provides this constraint by mapping all prompt elements to identifiers stored in the Reference Materials database 110 or Approved Knowledge Units database 108 prior to submission. Further, the dual prompt architecture supports scalability across concurrent users. The generation prompt is resource-heavy but occurs at low frequency, often at setup or configuration intervals. The evaluation prompt is resource-light and occurs at high frequency during live sessions. By isolating heavy computation into one phase and lightweight evaluation into another, the control server 116 balances workloads efficiently. This reduces overall compute costs, lowers average inference time, and supports higher concurrency rates across diverse institutional deployments.

In at least one embodiment, the control server 116 applies monitoring logic to both prompt flows. For generation prompts, monitoring includes tracking of token counts, inference duration, and output completeness. For evaluation prompts, monitoring includes logging of response latency, semantic equivalence accuracy, and feedback quality. The metrics are written to audit tables and surfaced through administrative dashboards for analysis. This feedback loop supports continuous refinement of prompt construction strategies and resource allocation. The dual prompt design therefore provides not separation of function but also a measurable improvement in computing efficiency and reduced data consumption across instructional and evaluation workflows.

In at least one embodiment, the Adaptive Learning Control Server 116 coordinates execution of the Q&A stage as the adaptive mechanism of remediation. The control server 116 retrieves pre-approved Q&A pairs from the Approved Knowledge Units database 108 and transmits them to the User Device 102 through the Web Server 104. Students provide open-ended responses that are recorded and returned to the control server 116 for evaluation. Unlike multiple-choice assessments, the input is free-text and requires semantic evaluation against approved reference answers. The control server 116 constructs evaluation prompts containing the student's submission, the approved answer, and optional summaries retrieved from the Reference Materials database 110. These compact prompts are transmitted to the LLM 114 through the API Server 106.

The control server 116 provides limits on the number of attempts a student may make for the Q&A pair. These limits are defined by faculty configuration and stored in step-sequencing tables managed by the control server 116. When limits are reached, the control server 116 records a remediation failure outcome in performance logs. These outcomes are used to signal unmet remediation goals and trigger referral rules that may generate secondary plans. This architecture improves efficiency by constraining repeated evaluation calls and reducing unnecessary compute cycles, while still allowing iterative guidance within a defined boundary.

When an instructor uploads PDFs or equivalent resources alongside validated Q&A pairs, the control server 116 establishes content boundaries for runtime inference. Uploaded resources are parsed into normalized segments and stored in the Reference Materials database 110. The approved Q&A pairs are stored in the Approved Knowledge Units database 108 with associated tags. During execution, the control server 116 constructs evaluation prompts limited exclusively to these stored elements. The LLM 114 is not permitted to use external model knowledge beyond the approved context, thereby ensuring that all outputs remain within institutional content boundaries. The design reduces free-form generation of responses that could introduce hallucinated or inconsistent material. The control server 116 embeds directive flags in the evaluation prompt that explicitly prohibit disclosure of final answers. Instead, the LLM 114 is instructed to generate hints or incremental guidance derived from the approved answers. For example, when the student requests a hint, the control server 116 routes the request through the API Server 106, retrieves the corresponding approved answer, and constructs a modified prompt instructing the LLM 114 to generate partial direction. This minimizes premature solution disclosure while still providing adaptive scaffolding. The control server 116 resolves conflicts that may arise from broad pretraining of the LLM 114 on heterogeneous corpora. Regardless of the model's pre-existing knowledge base, the control server 116 constrains outputs by injecting faculty-provided context into the evaluation prompt. The LLM 114 therefore produces outputs exclusively aligned with the uploaded resources and approved Q&A pairs. This is implemented by a filtering stage in which the control server 116 strips any extraneous tokens generated by the model that fall outside the validated scope.

In at least one embodiment, when conflicts exist across external authoritative sources, the system provides faculty-provided context as the sole standard of correctness. The control server 116 aligns all evaluation flows to the instructional materials stored in the Reference Materials database 110 and the approved Q&A pairs in the Approved Knowledge Units database 108. The resulting outputs are written back to performance logs with explicit provenance markers identifying the approved source. This provides evaluation consistency is maintained across diverse cohorts and deployments. The dual-source constraint reduces contradictions that would otherwise arise if the LLM 114 synthesized from its pretraining data. For example, where national guidelines may diverge from institutional standards, the control server 116 ensures that remediation outputs remain anchored to the course-specific expectations defined by faculty. This is achieved through tag-based context assembly, where content with verified identifiers is included in the prompt payload. The evaluation outputs are therefore guaranteed to align with institutional teaching requirements. Further, the architecture addresses a recurring challenge in professional domains where multiple textbooks and guidelines provide inconsistent recommendations. By limiting outputs strictly to validated institutional material, the control server 116 reduces the risk of students receiving contradictory information. The approved Q&A pairs and reference summaries function as a single authoritative baseline that constrains inference. This avoids variability in instruction and reduces confusion for learners in high-stakes domains such as medical licensing.

The faculty approval establishes a canonical "source of truth" for all remediation interactions. When an instructor validates a Q&A pair or edits a generated summary, the control server 116 stores the approved version in the relevant database with a version identifier. During runtime, the approved version is retrieved and transmitted as part of the evaluation prompt. By excluding non-approved records, the system reduces data consumption and avoids extraneous model calls. The result is a more efficient and controlled remediation pipeline.

The design improves computational efficiency by maintaining separation between model pretraining knowledge and runtime instructional context. The control server 116 avoids sending large volumes of external context to the LLM 114, relying instead on compact, validated content segments. This reduces token counts per prompt and lowers inference costs. At the same time, it preserves alignment with institutional material, ensuring that all remediation remains consistent, reliable, and efficient in its use of computing resources.

Moreover, the Adaptive Learning Control Server 116 compiles analytics from student responses recorded during remediation sessions. The control server 116 aggregates correctness vectors, attempt counts, and hint usage into structured performance tables indexed by S_, C_, and C2_tags. These analytics are processed to identify strengths, weaknesses, and emerging patterns of improvement. While analytics modules are common in digital systems, their integration with the constrained Q&A framework ensures that feedback remains adaptive while remaining bounded to faculty-approved material. The architecture reduces redundant computation by limiting analysis to compact, tagged records rather than unbounded free-text data, improving throughput and lowering storage overhead.

The remediation process is anchored exclusively to content approved and curated by faculty. Instructional summaries stored in the Reference Materials database 110 and Q&A pairs stored in the Approved Knowledge Units database 108 are reviewed and validated prior to deployment. The control server 116 provides retrieval from these sources during plan execution. By excluding all non-approved material, the system ensures that student interactions are constrained to the definitive reference set provided by the institution. This guarantees alignment with both institutional standards and external exam frameworks.

The system maintains fidelity to faculty-provided knowledge. The control server 116 provides schema-level constraints that minimize the LLM 114 from accessing or generating outputs beyond approved data boundaries. By binding remediation to this controlled corpus, the system ensures accuracy, consistency, and insulation from variability present in general-purpose training data. The architecture thereby improves computational efficiency by reducing token load, lowers data consumption by excluding unnecessary context, and delivers a trusted remediation process that is fully aligned with institutional intent.

Example Chat Interaction Flow

In at least one embodiment, the Adaptive Learning Control Server 116 initiates remediation by presenting the student with a structured summary retrieved from the Reference Materials database 110. The summary is a faculty-approved condensation of uploaded resources such as lecture slides or medical guidelines. The control server 116 ensures that the summary is transmitted in display-only format to the User Device 102 without being embedded into the evaluation context. For example, in a cardiology unit, the student may first receive a concise overview of angina, including its clinical definition and risk factors. This summary anchors the student before interactive questioning begins.

After delivery of the summary, the control server 116 sequences subsequent steps defined in the plan object. These steps are serialized metadata records stored in the step-sequencing table. A step contains a type identifier, ordering index, and dependency rules. In a pharmacology example, after viewing a summary of anticoagulant therapy, the next step may link to a faculty-approved video hosted in the LMS 112. The control server 116 transmits the link to the User Device 102 and tracks completion using session state variables.

The control server 116 then presents an open-ended question step. The question is drawn from the Approved Knowledge Units database 108 and displayed to the student without revealing the associated answer. This design provides an active recall process rather than recognition-based assessment. For instance, the student may be asked, "What are the contraindications for intubation in an emergency setting?" The system withholds the approved reference answer while monitoring student input.

The student response is transmitted from the User Device 102 to the Web Server 104 and then directed to the control server 116. The control server 116 packages the response into a lightweight evaluation prompt that includes the student's answer, the approved faculty-provided answer, and optionally a contextual summary from the Reference Materials database 110. This compact payload is transmitted through the API Server 106 to the LLM 114 for semantic evaluation. For example, when a student types "intubation is putting a tube in the throat," the prompt ensures that the reference answer specifies "trachea," thereby anchoring evaluation.

If the LLM 114 detects that the student's submission does not address the question, the control server 116 issues a directive to return the student to the same question. The student is prompted to try again with an answer relevant to the query. For example, if asked about diagnostic criteria for diabetes and the student responds with a description of hypertension, the control server 116 identifies this as off-topic and redirects the student. When the student's answer is incorrect but related, the control server 116 retrieves hints derived from the faculty-approved answer and transmits them incrementally. The hints are constructed as partial guidance statements rather than full solutions. In a case where the approved answer indicates that diabetes diagnosis requires fasting plasma glucose ≥126 mg/dL, the student might first be reminded of "standardized glucose thresholds used in clinical practice." This incremental release avoids disclosing the final answer while guiding correction.

The control server 116 also analyzes the student's past N responses to detect patterns of misunderstanding. This is implemented by storing recent responses in short-term logs indexed by question identifiers. The control server 116 applies tag-matching and semantic clustering to identify recurring misconceptions. If the student repeatedly confuses trachea with throat in intubation-related questions, the system generates corrective context. A hint may explicitly clarify that intubation involves the trachea, not the throat, thereby dispelling the persistent error. The student may terminate the session at any point. The control server 116 records progress by saving the current step index, completion status, and chat transcript into the session state tables. This allows seamless resumption in future interactions. For example, if the student exits after a question about angina treatment, the control server 116 stores the incomplete attempt and the transcript of hints provided. When the student resumes the session, the control server 116 retrieves the saved step index and reconstructs the prior context. The chat transcript associated with that step is also retrieved and re-injected into the evaluation prompt for continuity. This ensures that the LLM 114 receives consistent context and does not repeat prior guidance unnecessarily. In the diabetes example, if the student previously failed to recall diagnostic thresholds, the system reloads the transcript of prior hints before resuming evaluation.

Upon completion of all steps, the control server 116 triggers a post-session analysis. The control server 116 transmits the transcript and correctness logs to the LLM 114 with a directive to detect thematic patterns of weakness. The LLM returns a structured report identifying areas such as frequent errors in pharmacokinetics calculations or incomplete understanding of risk factor stratification. These outputs are serialized and stored in the analytics tables.

In at least one embodiment, the identified weaknesses are transmitted back to the User Device 102 for student review. The control server 116 formats the results as a summary of strengths and deficiencies at the tag level. For example, the student may see that they performed well on diagnosis of angina but struggled with treatment guidelines. This personalized feedback is derived entirely from approved Q&A pairs and summaries, maintaining fidelity to institutional standards. The weakness analysis is also surfaced to the faculty-facing dashboard. The control server 116 aggregates student-level analytics and renders cohort-wide trends through the Web Server 104. Faculty can view that multiple students in a course are struggling with intubation contraindications, which may trigger supplementary instruction. By aligning analytics to approved tags, the system avoids noise from unapproved or irrelevant data.

The architecture provides technical advantages by reducing uncontrolled model outputs and anchoring all remediation to faculty-approved content. The system reduces hallucinations by supplying the LLM 114 with the correct answer during evaluation, while minimizing disclosure of that answer to students. It also reduces computational overhead by limiting prompts to compact approved inputs. The result is a controlled tutoring system that improves computing efficiency, reduces data consumption, and maintains strict fidelity to institutional standards in domains such as medical education where conflicting sources are prevalent. In at least one embodiment, the unpredictability problem associated with LLMs is addressed by using pre-generated question-and-answer (Q&A) pairs as the canonical instructional units for AI-assisted tutoring. The Q&A pairs may be generated from curriculum resources or manually authored. The Q&A pairs are stored in structured repositories where they can be faculty-edited, validated, and approved before runtime. Once approved, the Q&A pairs function as deterministic content specifications, providing that tutoring sessions consistently reference institutionally aligned material. The design provides controlled, repeatable outputs from the tutoring system while maintaining alignment with course standards, institutional pedagogy, or standardized exam requirements. The Adaptive Learning Control Server 116 can implement schema-based differentiation between display-only instructional text and context-eligible summary elements. This distinction is provided at the database schema level within the Reference Materials DB 110. The content flagged as display-only can be excluded from prompt construction while context-eligible summaries are retained for model interaction. The use of schema markers provides that non-relevant material is not transmitted into LLM payloads, thereby reducing token consumption per request. The feature reduces processing overhead on the inference engine and optimizes memory utilization during concurrent tutoring and remediation sessions. The improvement is technical in nature, as it directly addresses computational resource usage through structured data management rather than educational content logic. The system 100 further incorporates constrained prompt-chaining mechanisms that append pre-approved summaries and topic-specific metadata to the LLM input stream. The process bounds the model inference domain to validated instructional material, minimizing the risk of hallucinations and preventing unverified knowledge injection. The prompt chaining with controlled metadata improves throughput by avoiding repeated re-computation of base context. The cached summaries and pre-approved Q&A pairs reduce redundant data transmission between the Control Server 116 and the LLM 114, resulting in lower bandwidth usage and faster inference cycles. The Control Server 116 may employ a dual-prompt architecture that separates resource-intensive generation prompts from lightweight evaluation prompts. Generation prompts, used during lesson plan construction, process full instructional resources and metadata. Evaluation prompts, executed during live student interactions, transmit compact payloads comprising a reference answer and a student submission. The architectural separation reduces average token counts per prompt by allowing high-frequency evaluation tasks to be performed with reduced compute load and improved response latency. The implementation enables institutions to support large cohorts of simultaneous users without linear increases in inference cost. The caching strategies are integrated at both plan and subtopic levels. Outputs from generation prompts are cached in staging schemas and reused for identical instructional inputs. The evaluation prompts reuse pre-approved reference answers stored in memory caches. The architecture reduces redundant database queries and lowers network transmission overhead. The technical advantage derives from reduced latency in retrieval operations and minimized re-computation cycles during runtime. By structuring instructional workflows around schema-tagged data, constrained prompt assemblies, dual-prompt separation, and cache-based reuse, the system improves computing efficiency at the infrastructure layer.

Figure 2A:
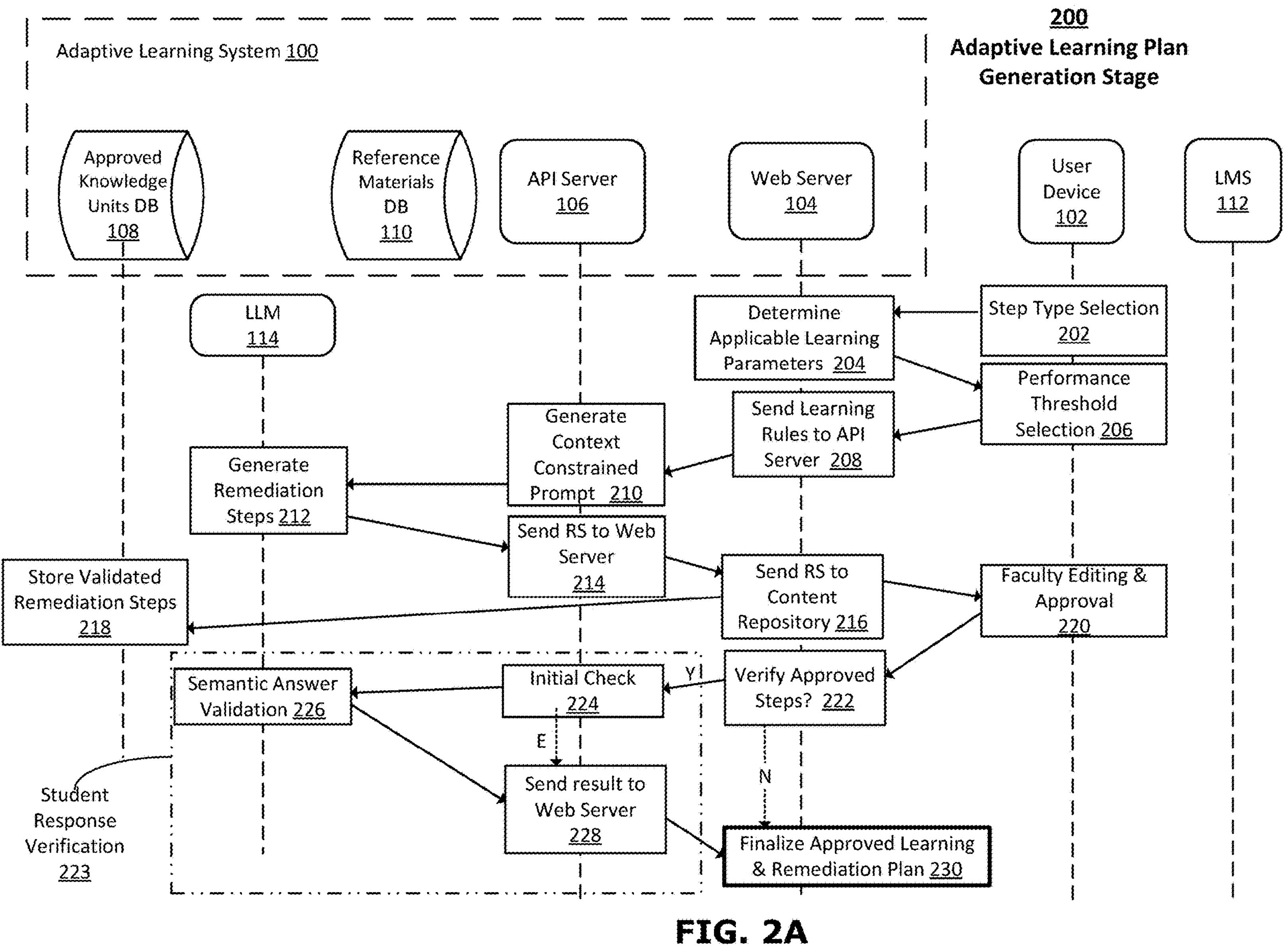
FIG. 2A illustrates an embodiment of an adaptive plan generation stage 200 implemented within the system architecture described in connection with FIG. 1.

FIG. 2A illustrates an embodiment of an adaptive plan generation stage 200 implemented within the system architecture described in connection with FIG. 1. The stage defines the flow of constructing structured plans by coordinating selections received from User Device 102, retrieving performance data from LMS 112, executing prompt construction through API Server 106, generating candidate steps using LLM 114, and persisting approved outputs into Content Repository 216 and Approved Knowledge Units DB 108. The flow supports creation of both tutoring sequences and remediation pathways while ensuring technical validation of student responses and faculty approvals.

The process begins at Step Type Selection 202. User Device 102 transmits configuration input indicating the type of instructional or evaluative step to be constructed. Input can include specification of summaries, interactive question-answer steps, or multimedia resource references. The input is received through Web Server 104 and forwarded for parameter processing.

Determine Applicable Learning Parameters 204 processes the configuration inputs and any faculty-selected data domains. Adaptive Learning Control Server 116 may retrieve metadata associated with courses, cohorts, groups, or institutions as chosen by the faculty. The system may also accept user-specified selections of data sources such as computer adaptive tests, self-generated quizzes, or pre-generated institutional quizzes. In certain implementations, the faculty may explicitly include or exclude assessment instances, for example electing to reference a high-stakes final exam while omitting a midterm exam. The parameters and selections are stored in temporary tables within the control server to define the operational scope. Since the parameter collection is not tied to the timing of remediation plan generation, the process can be executed prior to or after remediation plan creation, thereby decoupling the referral logic from the plan construction.

Performance Threshold Selection 206 can be executed using analytics data retrieved in accordance with the faculty-selected domains and data sources. The system may present projected impact indicators, such as estimating the number of students referred when a specified grade threshold is applied. For example, if a threshold of less than 70% is set, the system may identify the expected number of students affected. These indicators enable faculty to adjust thresholds before or after creation of the remediation plan. The selected thresholds are stored as numeric values associated with topic and subtopic identifiers, permitting later use in referral workflows independent of the timing of plan generation.

Send Learning Rules to API Server 208 transmits the finalized parameters and thresholds to API Server 106. The server serializes the rule set into structured objects and writes them to control tables of Adaptive Learning Control Server 116. Rules may include prerequisite pointers, skip conditions, or branching logic tied to selected performance outcomes. In alternative implementations, rules can be executed at referral time rather than plan creation time, allowing complete independence between plan generation and referral application. This separation enables reuse of a single generated plan across multiple referral conditions while maintaining consistency of the underlying plan objects.

Generate Context Constrained Prompt 210 constructs the input payload to LLM 114. Adaptive Learning Control Server 116 retrieves summaries and metadata tags from Reference Materials DB 110 and Approved Knowledge Units DB 108. The prompt is assembled with schema-based constraints, including topic identifiers, synonym normalization, and context boundaries. In one implementation, token-optimized text formats of summaries are appended to reduce bandwidth and inference cost.

Generate Remediation Steps 212 executes the prompt with LLM 114. Candidate instructional steps and question-answer items are produced under constrained context. The outputs include hierarchical tags, confidence indicators, and metadata for sequencing. The server parses these outputs into structured step objects.

Send RS to Web Server 214 transmits the candidate steps to User Device 102 for preliminary rendering. Faculty are able to view draft steps before approval. In parallel, Send RS to Content Repository 216 writes the structured steps into a staging schema in the internal repository for versioning and persistence.

Store Validated Remediation Steps 218 associates approved or system-validated steps with referral rules and persists them into Approved Knowledge Units DB 108. Each referral rule may link to one or more remediation plans, allowing separate plans to be constructed for different cohorts, groups, or other target segments even when the topic is common. The persistence process records the rule associations along with the instructional steps. Deduplication routines apply hashing to prevent redundant storage of identical steps across multiple plans. Metadata recorded with each entry includes provenance markers, difficulty level, Bloom's taxonomy categorization, and identifiers for the referral conditions under which the steps are activated.

Faculty Editing and Approval 220 is performed on User Device 102. Through the rendered interface, faculty may edit step content, adjust terminology, or re-sequence items. Approval actions are logged and trigger migration of provisional records into active repositories.

Verify Approved Steps 222 determines whether the steps meet validation and approval criteria. If approved, the process advances to plan finalization. If not, further editing or regeneration may be triggered.

Student Response Verification 223 operates during runtime execution. Responses from User Device 102 are transmitted back for validation. Initial Check 224 compares responses against stored correct answers in Approved Knowledge Units DB 108. Semantic Answer Validation 226 applies equivalence analysis using LLM 114 if the question types requires an open-ended response to be compared to a reference response; but for constrained response questions (e.g. multiple choice, select-all-that-apply, drag-and-drop, etc.) the correct answer is compared to the chosen answer from a pre-defined set of possible answer responses to determine correctness. The analysis incorporates approved reference answers and student submissions into structured prompts. The evaluation is bounded by validated content, reducing uncontrolled inference.

Send Result to Web Server 228 transmits validation results back to User Device 102. Responses can include correctness flags, incremental hints, or partial solution steps. Results are also logged into analytics tables for cohort-level reporting.

Finalize Approved Learning and Remediation Plan 230 compiles the validated and faculty-approved steps into a complete plan object. The plan is serialized in JSON format and stored in Content Repository 216. A unique identifier is generated for session retrieval by Tutoring Engine 118 during runtime.

In alternative implementations, context constrained prompts at 210 may incorporate caching identifiers to reduce repeated token expansion. Remediation steps at 212 may include case-based scenarios for tutoring, or stepwise derivations for mathematical topics. Verification routines at 222 may be automated through rule-based acceptance when confidence scores exceed thresholds.

The architecture improves computational efficiency by reducing redundant LLM interactions through caching, minimizing bandwidth by transmitting lightweight payloads, and ensuring consistent use of approved content. The integration of thresholds, faculty approval, and semantic validation constrains plan generation and execution within validated boundaries, lowering inference cost and reducing database growth through reference-based storage.

Figure 2B:
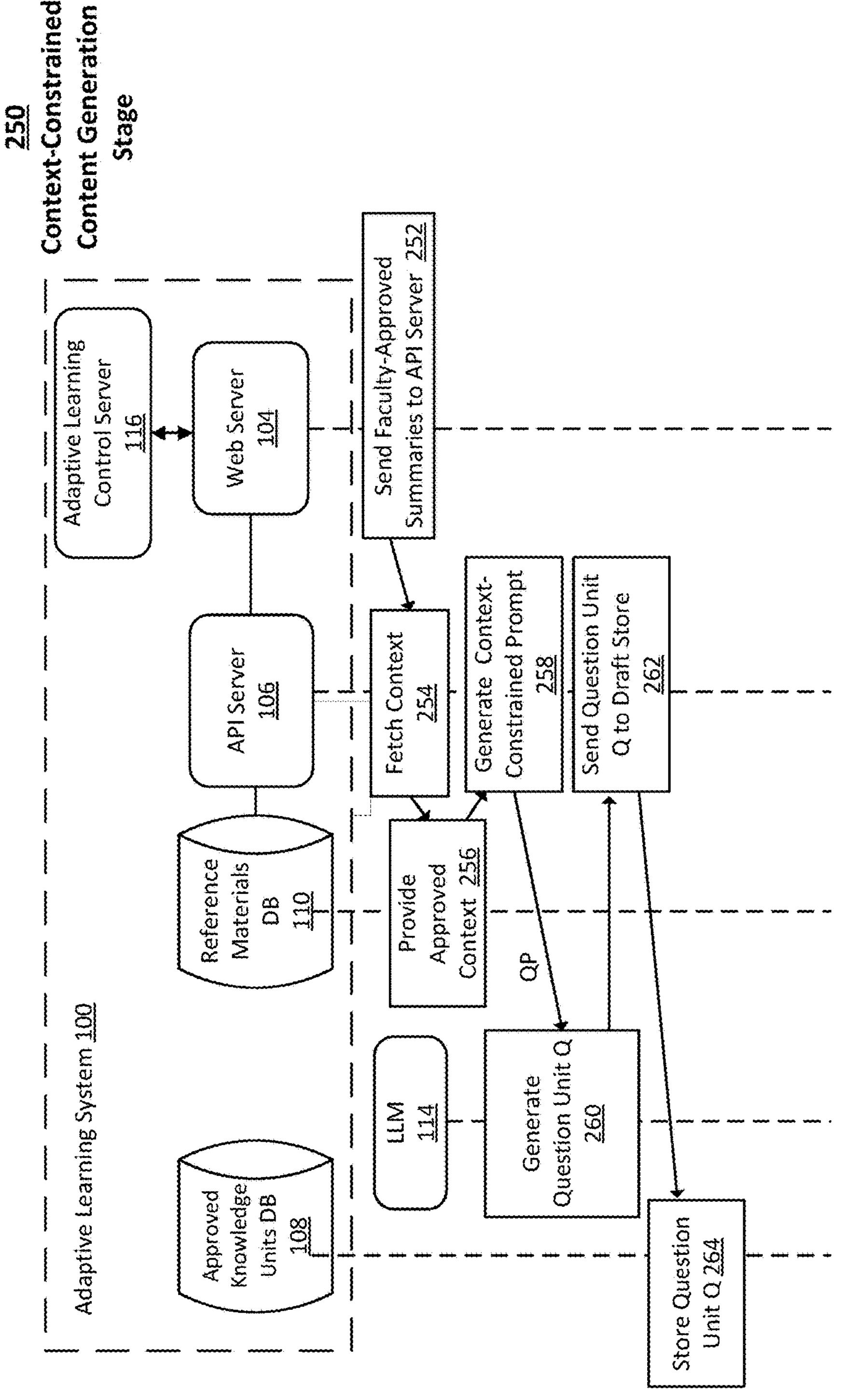
FIG. 2B illustrates an embodiment of a context-constrained content generation stage 250 within the Adaptive Learning System 100.

FIG. 2B illustrates an embodiment of a context-constrained content generation stage 250 within the Adaptive Learning System 100. This stage details the technical process by which approved context materials are integrated into controlled prompts, enabling generation of validated question units while minimizing uncontrolled model inference. The stage coordinates data retrieval, prompt construction, draft storage, and final persistence of question units into Approved Knowledge Units DB 108.

The process begins at Send Faculty-Approved Summaries to API Server 252. Faculty-approved summaries stored in Reference Materials DB 110 are transmitted through Web Server 104 to API Server 106. The summaries are tagged with identifiers referencing course, topic, and subtopic granularity. The API Server 106 serializes these summaries into structured payloads for downstream prompt construction.

Fetch Context 254 is executed by Adaptive Learning Control Server 116. The server queries Reference Materials DB 110 and Approved Knowledge Units DB 108 to assemble the contextual data associated with the designated topic. Retrieved context can include approved summaries, validated Q&A pairs, and metadata tags. In one implementation, context objects are normalized into token-optimized text segments to reduce bandwidth consumption and improve prompt efficiency.

Provide Approved Context 256 represents delivery of the retrieved and normalized context to LLM 114. The approved context forms the bounded knowledge space from which generation occurs. Data is transmitted via secure API calls with content integrity verified by hash functions. This step prevents uncontrolled injection of non-approved material into the generation pipeline.

Generate Context-Constrained Prompt 258 is performed by Adaptive Learning Control Server 116. The server integrates the approved context into a structured prompt template. The template includes positional markers for summaries, reference answers, and metadata tags. Schema markers identify which segments are eligible for inclusion as model input and which are designated as display-only. Variants of this implementation may incorporate cache identifiers that reduce repeated tokenization of static context, further improving compute efficiency.

Generate Question Unit Q 260 is executed by LLM 114. Using the constrained prompt, LLM 114 generates a candidate question-answer pair or equivalent instructional unit. Outputs include a question body, a reference answer, confidence scores, and metadata alignment to topic identifiers. The generation process is bounded by the approved context, thereby reducing hallucination risk and maintaining alignment with institutional content.

Send Question Unit Q to Draft Store 262 persists the candidate output into a provisional storage schema managed by Adaptive Learning Control Server 116. Draft storage allows faculty to review, edit, or reject generated items before they are migrated into the active repository. A draft is indexed by hash values, version identifiers, and context references for traceability.

Store Question Unit Q 264 finalizes the process by writing faculty-approved or system-validated question units into Approved Knowledge Units DB 108. The records are stored with hierarchical tagging across topic, subtopic, and subsubtopic levels. Metadata fields include Bloom's taxonomy categorization, difficulty rating, and provenance markers. Deduplication logic compares new entries against existing records to avoid redundant growth of the database.

The context retrieval at 254 may incorporate weighted selection of context blocks based on relevance scores. Prompt generation at 258 may embed directive flags instructing LLM 114 to return multi-step derivations or case-based scenarios. Draft storage at 262 may implement expiration timers that automatically purge unreviewed drafts, maintaining repository efficiency.

Figure 2C:
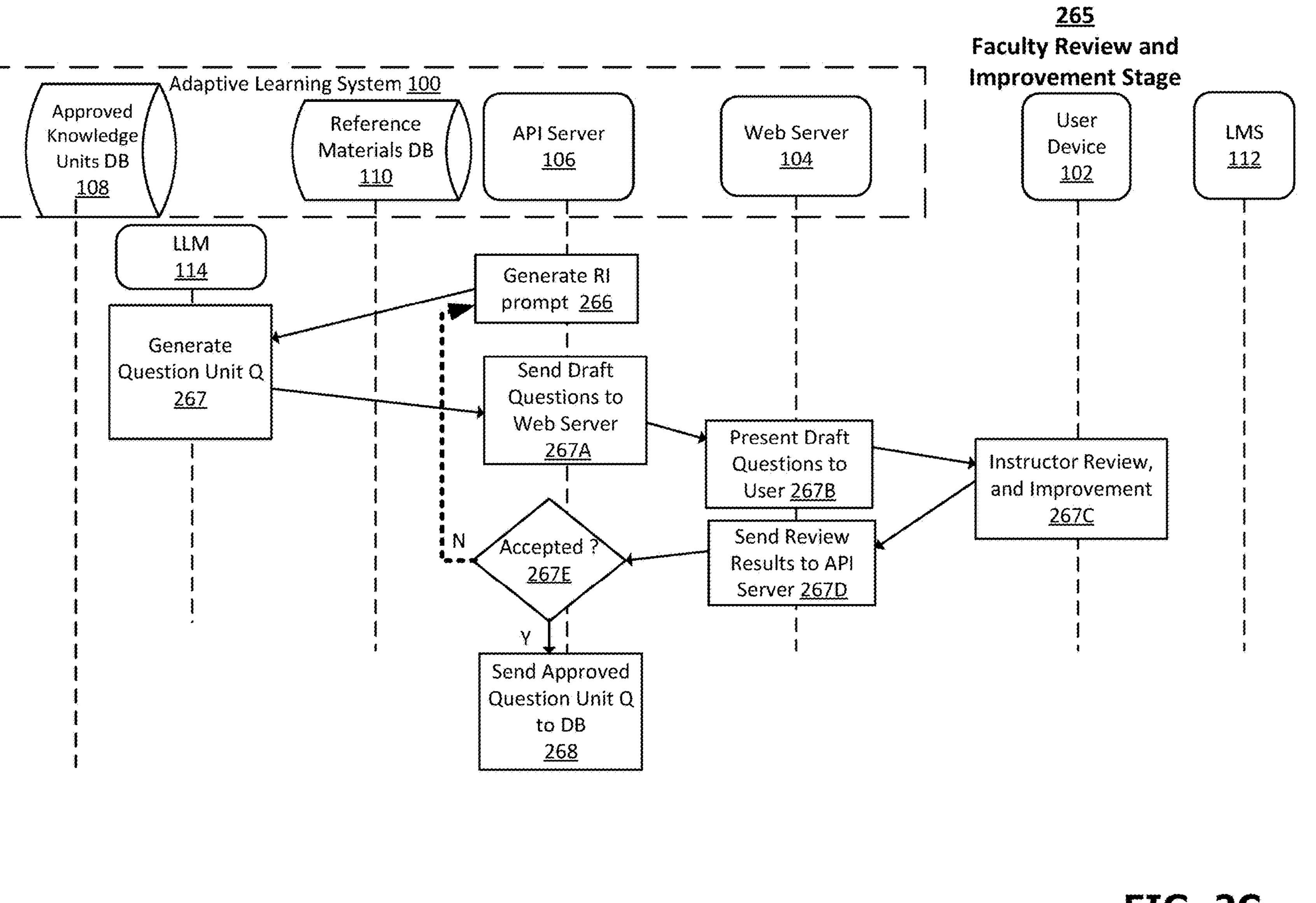
FIG. 2C illustrates an embodiment of a faculty review and improvement stage 265 within the Adaptive Learning System 100.

FIG. 2C illustrates an embodiment of a faculty review and improvement stage 265 within Adaptive Learning System 100. This stage describes the controlled process by which draft question units generated by LLM 114 are reviewed, refined, and either approved for storage or returned for regeneration. The workflow ensures institutional oversight, content validation, and alignment with pre-approved instructional materials.

The process begins at Generate Review and Improvement (RI) Prompt 266. Adaptive Learning Control Server 116 constructs a refinement and improvement prompt using context retrieved from Reference Materials DB 110 and metadata from Approved Knowledge Units DB 108. The RI prompt may include faculty-approved summaries, prior validated answers, and tagging information to constrain generation. The RI prompt is transmitted through API Server 106 to LLM 114 when regeneration is required.

Generate Question Unit Q 267 is executed by LLM 114. The model generates a candidate question-answer unit using either the original constrained context or an RI prompt. The unit includes question text, reference answer, difficulty level indicators, and topic tags. Generated units are serialized with integrity hashes for later deduplication and traceability.

Send Draft Questions to Web Server 267A is performed by Adaptive Learning Control Server 116. Draft units are transmitted to Web Server 104 and prepared for presentation. Metadata such as source identifiers, faculty tags, and question type indicators are included in the payload.

Present Draft Questions to User 267B occurs on User Device 102. Draft questions are displayed within a structured interface that supports editing, tagging, and annotation. In one embodiment, the interface is rendered as a dashboard with side-by-side comparison between generated content and reference summaries. In alternative implementations, interactive controls allow direct modification of text, answers, or tagging.

Instructor Review and Improvement 267C represents the faculty validation process. The instructor may edit terminology, adjust difficulty classification, or modify the structure of the question. Edits are applied locally on User Device 102 and captured as delta changes. The modifications are transmitted to Adaptive Learning Control Server 116 through API Server 106.

Send Review Results to API Server 267D persists instructor actions. Approved, edited, or rejected records are logged with timestamped metadata and author identifiers. The Control Server 116 records review outcomes in provisional tables, enabling auditability and rollback. For rejected drafts, a regeneration request is transmitted to Generate RI Prompt 266 to trigger refinement.

Accepted? 267E represents a decision state. If a draft is approved by faculty, the flow proceeds to Send Approved Question Unit Q to DB 268. If rejected, the draft is discarded, and the RI prompt regeneration path is activated. This loop ensures that only institutionally validated material is promoted to active storage.

Send Approved Question Unit Q to DB 268 finalizes the workflow. The approved unit is written into Approved Knowledge Units DB 108 with hierarchical tagging at topic, subtopic, and sub-subtopic levels. Associated metadata includes Bloom's taxonomy category, provenance markers, and version identifiers. Deduplication logic checks against existing database entries to avoid redundant storage.

Alternative implementations may integrate LMS 112 directly into the approval stage. For example, validated question units can be synchronized to LMS item banks for direct use in assessments. In another variation, rejected drafts may be stored in a sandbox repository for later re-evaluation rather than discarded immediately, providing a pool of candidates for iterative improvement.

Figure 2D:
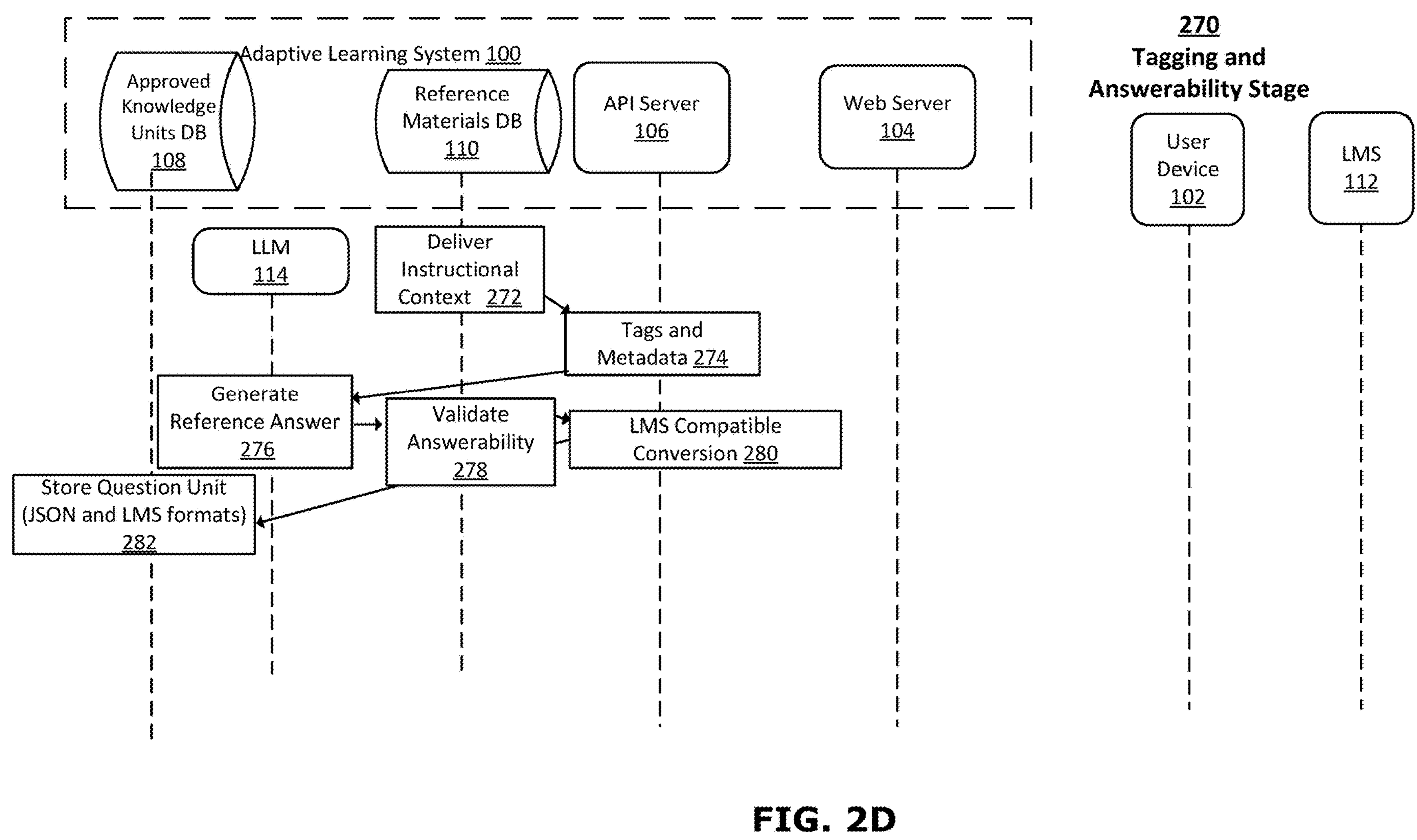
FIG. 2D illustrates an embodiment of a tagging and answerability stage 270 within the Adaptive Learning System 100.

FIG. 2D illustrates an embodiment of a tagging and answerability stage 270 within Adaptive Learning System 100. This stage details how generated question units are enriched with metadata, validated for answerability, converted into interoperable formats, and stored in both JSON and LMS-compatible schemas. The flow ensures that only technically valid and institutionally aligned content progresses into persistent repositories.

The process begins at Deliver Instructional Context 272. Adaptive Learning Control Server 116 retrieves context data from Reference Materials DB 110 and Approved Knowledge Units DB 108. The instructional context includes faculty-approved summaries, topic identifiers, and metadata tags. The context is serialized into payloads and transmitted through API Server 106 to downstream modules.

Tags and Metadata 274 are assigned to the instructional context and candidate question units. Tagging operations include assignment of identifiers for course, topic, subtopic, difficulty, and Bloom's taxonomy classification. Metadata also includes provenance markers, version identifiers, and usage constraints. In one implementation, tagging is applied using schema-driven rule sets maintained within Adaptive Learning Control Server 116.

Generate Reference Answer 276 is executed by LLM 114. The model generates an expected answer aligned to the instructional context. The answer is bounded by faculty-approved materials and is returned in structured text formats for consistency. Reference answers are hashed to ensure integrity and linked to corresponding question identifiers.

Validate Answerability 278 determines whether the generated question unit has a valid and sufficient reference answer. Adaptive Learning Control Server 116 executes validation routines that compare the generated reference answer against metadata tags and instructional context. In one implementation, equivalence algorithms are applied to ensure semantic consistency between question and answer. Non-answerable or ambiguous items are flagged and returned for regeneration.

LMS Compatible Conversion 280 converts the validated question unit into interoperable formats required by LMS 112. Conversion routines generate representations in both JSON schema and LMS-specific formats such as QTI or SCORM. This enables seamless deployment of question units into varied LMS platforms without requiring post-processing by faculty.

Store Question Unit 282 persists the validated and converted question units into Approved Knowledge Units DB 108. Storage includes both JSON and LMS formats, ensuring dual compatibility. Indexing mechanisms associate each stored item with tags, metadata, and reference answers for rapid retrieval. Deduplication checks compare stored units against existing entries to prevent redundancy.

Automated tagging may be provided by machine learning classifiers trained on historical metadata, providing greater scalability. Validation at 278 may also incorporate confidence scoring from LLM 114 outputs, allowing partial acceptance workflows. Conversion at 280 can support custom institutional schemas beyond LMS defaults, enabling tighter integration with proprietary systems.

Figure 2E:
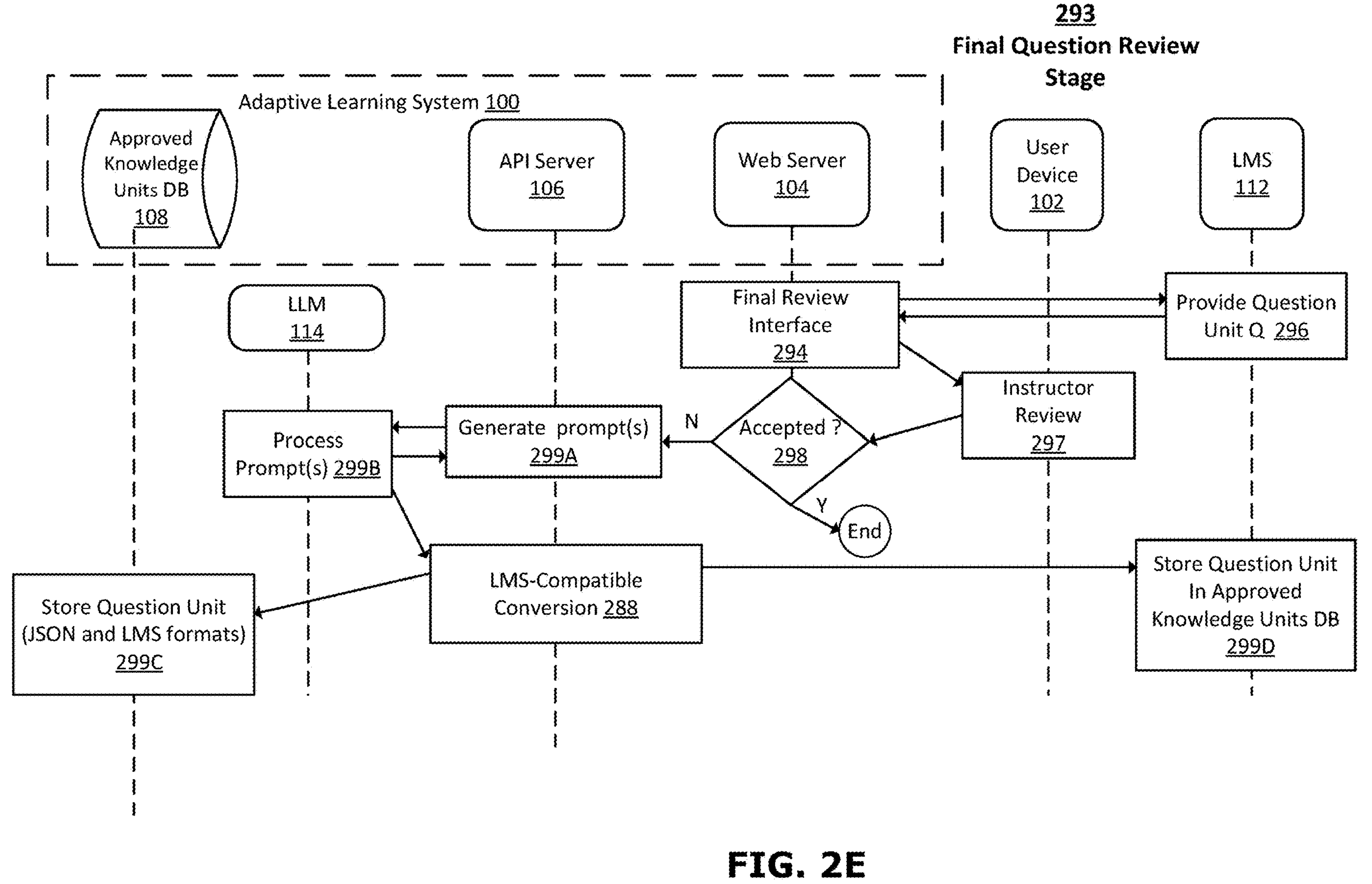
FIG. 2E illustrates an embodiment of a final question review stage 293 within the Adaptive Learning System 100.

FIG. 2E illustrates an embodiment of a final question review stage 293 within the adaptive learning system 100. The figure shows the interaction of system components that manage the generation, review, conversion, and storage of question units before their delivery to a learning management system (LMS 112) or storage in an approved knowledge units database (108). The process flow ensures that question units undergo automated processing, human review, format conversion, and validation prior to final deployment.

The process begins with the generation of prompt(s) 299A. The prompts are created by the system based on knowledge units and instructional requirements. These prompts are processed by a large language model (LLM 114) at step 299B. The LLM 114 produces candidate question units by applying its trained language model capabilities to the generated prompts. In alternative embodiments, the LLM 114 may be replaced or supplemented by other machine learning engines or rule-based generation systems to produce question content.

Once processed, the candidate question units are routed to an LMS-compatible conversion module 288. The LMS-compatible conversion 288 performs format transformation of the candidate content into data structures recognized by downstream systems. This may include transformation into interoperable formats such as JSON and platform-specific LMS formats. The conversion ensures that the question unit can be consumed both by storage subsystems and the LMS 112 without further modification.

The converted question unit is then provided to a final review interface 294. The final review interface 294 is accessible through a user device 102 via a web server 104 and API server 106. The final review interface 294 presents the generated question unit to an instructor or reviewer for evaluation. The reviewer performs instructor review 297 to validate the accuracy, relevance, and clarity of the question unit. In some embodiments, the final review interface 294 may also display multiple variations of the same unit for selection or ranking.

Following instructor review 297, the system checks acceptance at decision block 298. If the question unit is accepted, the process flow terminates successfully. If the question unit is not accepted, the process returns to the generate prompt(s) 299A stage where new prompts may be generated, re-processed by the LLM 114, and reconverted until an acceptable unit is produced. This loop ensures iterative refinement of the question content.

When the question unit passes acceptance, it is provided as output at step 296. The provide question unit Q 296 module ensures transmission of the accepted unit to the LMS 112 for deployment. In parallel, the system executes a store question unit module 299C which archives the unit in JSON and LMS formats for consistency and traceability. This storage capability allows downstream analytics, auditing, and re-use in future review cycles.

In addition, the accepted question unit is stored in the approved knowledge units database 108 through store question unit module 299D. The approved knowledge units database 108 thus functions as a centralized repository of validated content that can be accessed by the adaptive learning system 100 for further tutoring or remediation workflows. This ensures that only reviewed and approved material is reused in subsequent operations.

The process flow is supported by the integration of LMS 112, web server 104, API server 106, and user device 102. The LMS 112 receives question units in interoperable formats for deployment in instructional environments. The web server 104 delivers the review interface, while the API server 106 manages communications between the adaptive learning system 100 and external platforms. The user device 102 provides the interface point for instructors and reviewers.

Exemplary Prompt Structures

The following are examples of prompt formulations that may be used to implement the described methods. These may be embodied in a Python script or other suitable programming environment.

Question Generation Prompt def generate_question_instructor_prompt(topic: str, subtopic: Optional[str], number of questions: int, comment: Optional[str], existing_questions: Optional[List[str]])->str:

Return a prompt to generate a list of 'number of questions' questions on a 'topic' and 'subtopic'. 'comment' from instructor is used as reference. context_str=" "

if subtopic: context_str=f"the subtopic of \"{subtopic}\" within the broader topic of \"{topic}\""

else: context_str=f"the topic of \"{topic}""

Objective: Generate exactly {number_of_questions} questions of distinct and highly relevant short-answer questions focused on {context_str}.

Student Performance Analysis Prompt def analyze_result_prompt(topic: str, history: list[AnalysisQuestionData], materials: list[PDFContent])->str:

Feedback Generation Prompt def feedback_prompt(question: str, reference_answer: str, attempt: str, history: any, attempts_remaining: int, type of match: str=" ", question_type: str=" ")->str:

Return a prompt to a language model to provide the feedback on student attempts of a question.

Remediation Plan Generation Prompt def_generate plan_steps(topic: str, subtopic: str, options: PlanGenerationOptions):

Generates the prompt for the remediation plan Q&A part.

Figure 3:
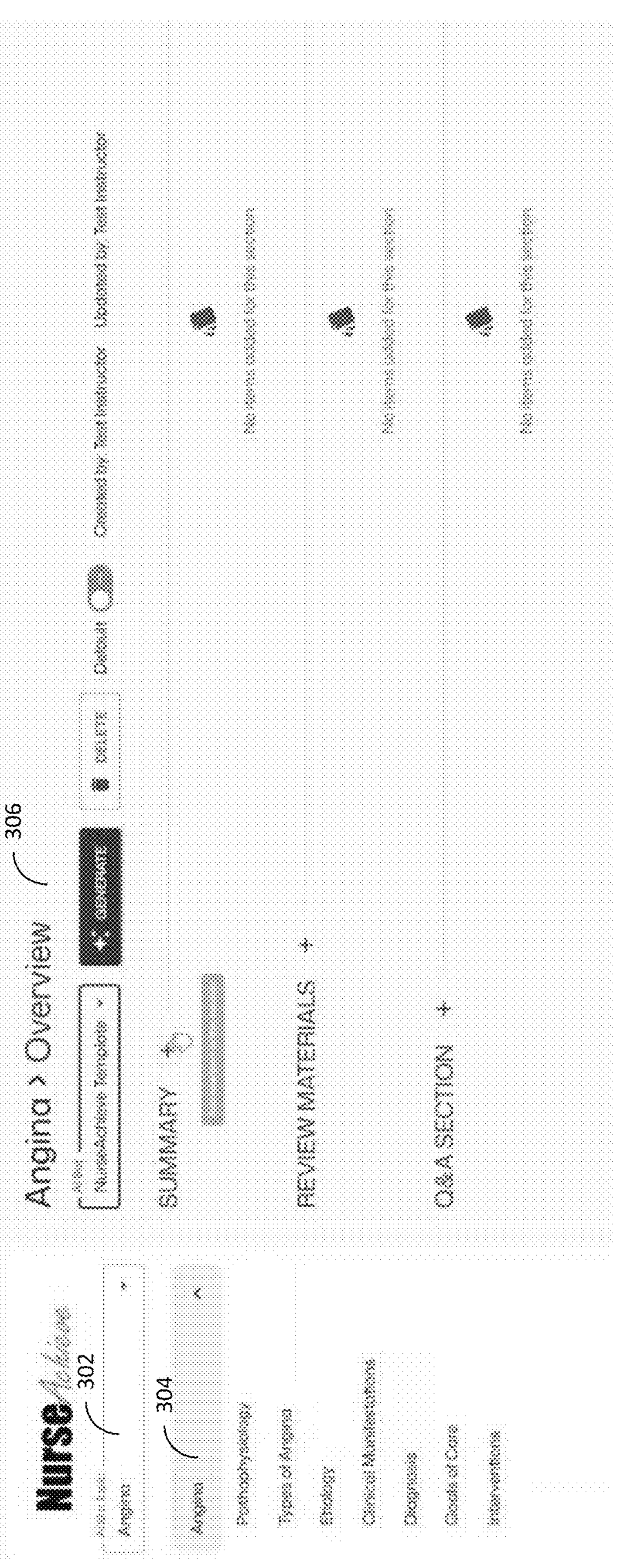
FIG. 3 illustrates an embodiment of a user interface for plan creation and management.

FIG. 3 illustrates an embodiment of a user interface for plan creation and management. The interface is configured to allow instructors or system operators to generate, edit, and organize structured content elements related to a selected topic. The display includes multiple labeled components and functional controls to facilitate automated or manual plan generation.

A topic selector 302 is positioned at the upper left portion of the display. The topic selector 302 provides a drop-down menu or input field enabling the user to add a topic of interest, such as "Angina." Once selected, the topic propagates throughout the content organization area of the interface.

A navigation panel 304 is displayed adjacent to the topic selector 302. The navigation panel 304 provides a structured list of subtopics associated with the selected topic. In the illustrated example, the subtopics include Pathophysiology, Types of Angina, Etiology, Clinical Manifestations, Diagnosis, Goals of Care, and Interventions. Each entry in the navigation panel 304 may be selected to access, generate, or edit content specifically associated with the respective subtopic.

A template and generation control section 306 is located near the top right of the interface. The section 306 provides a drop-down selector to choose an AI Bot template, here shown as "NurseAchieve Template." A "Generate" button is provided adjacent to the template selector. Actuation of the generate button triggers automated plan creation for the chosen topic or subtopic using the designated template. A "Delete" button is also present to remove generated or manually added content. A toggle switch is displayed for marking the plan as default, and metadata indicators specify the user responsible for creation and updates, here shown as "Created by: Test Instructor" and "Updated by: Test Instructor."

The interface is further divided into three expandable sections: Summary, Review Materials, and Q&A Section. A section includes a plus icon that enables insertion of new content items. In the displayed state, no items have been added to any of the sections, and placeholders indicate the absence of entries. The Summary section is configured for overview content, the Review Materials section for supporting documents or reference materials, and the Q&A Section for question and answer items relevant to the selected topic.

In some embodiments, additional templates may be loaded via the template selector of section 306, and generated content may be exported in formats compatible with downstream systems such as LMS integrations. Alternative implementations may allow synchronization of content stored in the sections with a centralized knowledge base for reuse across topics.

Figure 4A:
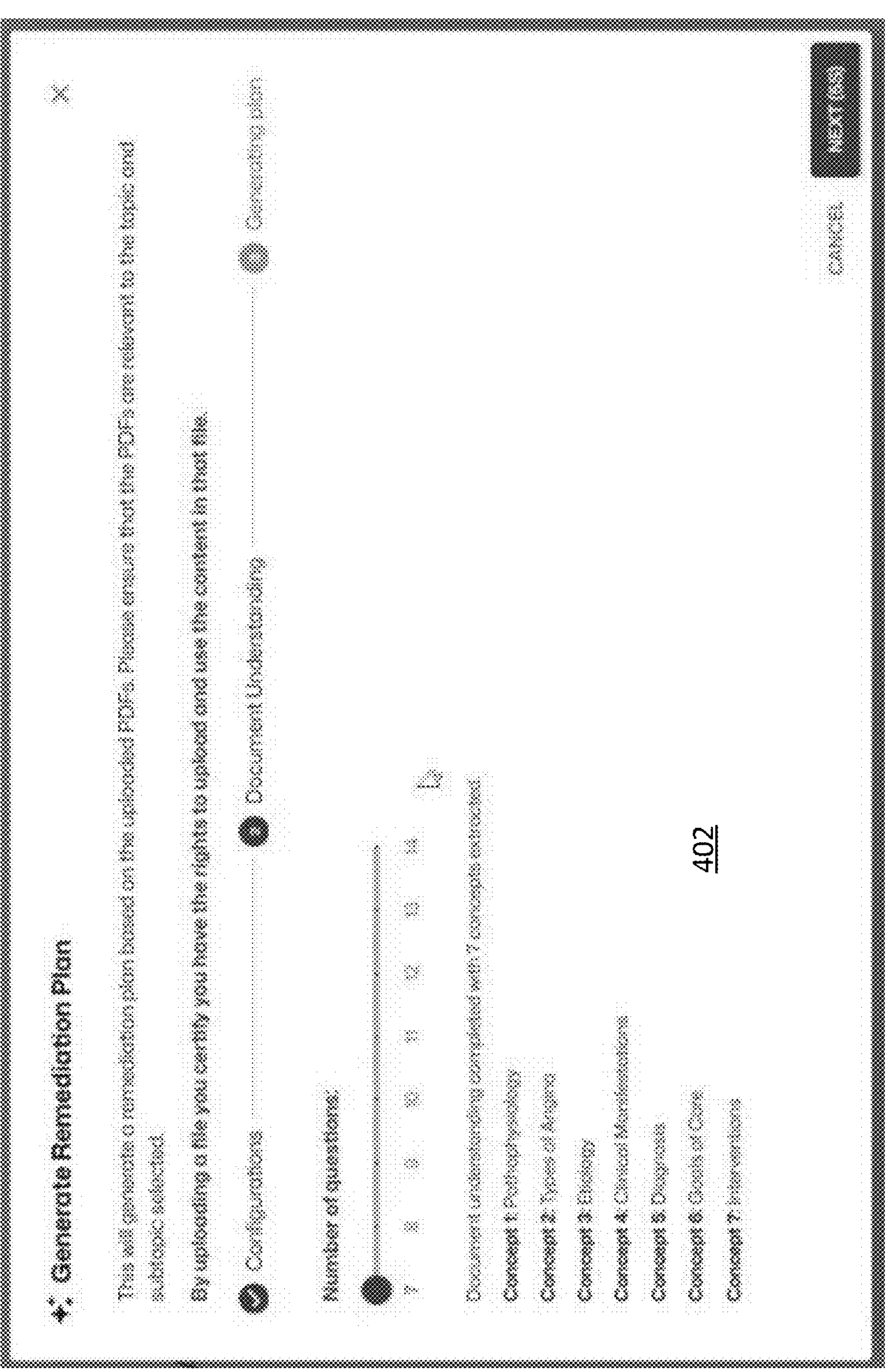
FIG. 4A illustrates an embodiment of a user interface for generating a remediation plan from uploaded source documents.

FIG. 4A illustrates an embodiment of a user interface for generating a remediation plan from uploaded source documents. The interface guides the user through sequential steps for plan creation, beginning with configuration, followed by document understanding, and concluding with plan generation. The illustrated display corresponds to the document understanding stage, where extracted concepts are presented to the user for review.

The interface includes a progress indicator 402 displayed at the top. The indicator shows three stages: Configurations, Document Understanding, and Generating Plan. The second stage, Document Understanding, is highlighted, signifying the current step.

A question selector is provided below the progress indicator, enabling adjustment of the number of questions to be generated. A slider control allows the user to choose from a range, here illustrated as 7 to 14 questions. This input determines the scope of question generation in relation to the extracted concepts, thereby tailoring the remediation plan to a desired level of granularity.

The document understanding output lists the extracted concepts. In the illustrated embodiment, seven concepts are shown: Pathophysiology, Types of Angina, Etiology, Clinical Manifestations, Diagnosis, Goals of Care, and Interventions. These concepts are derived from the uploaded documents using automated content parsing and understanding techniques. Each extracted concept corresponds to a content domain that may be used to generate question items or instructional material.

Figure 4B:
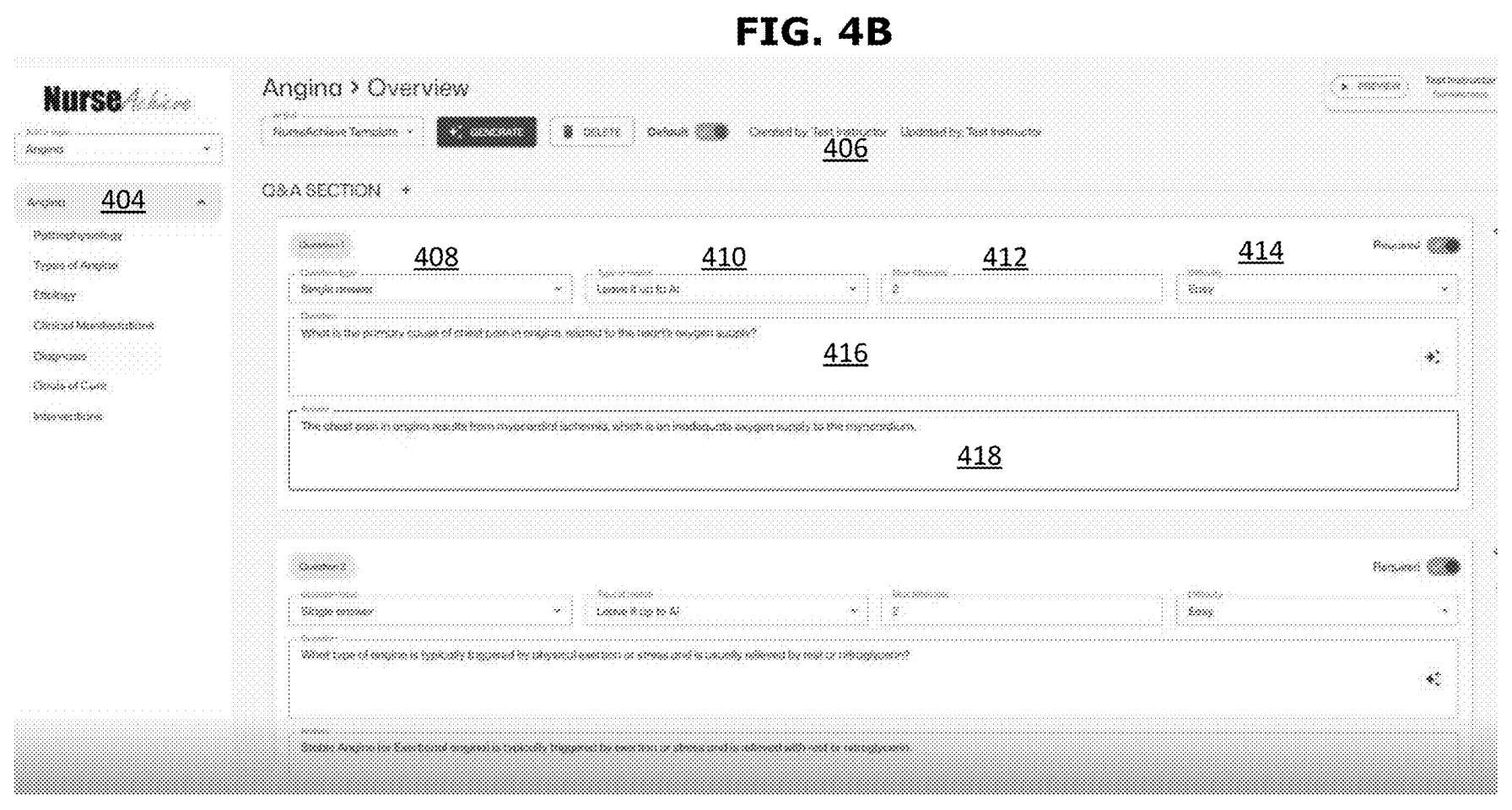

FIG. 4B illustrates an embodiment of a user interface for creation and management of question-and-answer pairs as part of a plan. The interface is presented in the context of a selected topic and subtopics, where structured Q&A items can be configured, generated, and edited by an instructor or system operator.

A navigation panel 404 is shown on the left-hand side. The panel lists the selected topic "Angina" along with its associated subtopics, including Pathophysiology, Types of Angina, Etiology, Clinical Manifestations, Diagnosis, Goals of Care, and Interventions. This panel allows the user to organize Q&A creation within specific subtopic domains.

At the top of the interface, a metadata display 406 is provided. The metadata display shows the creation and update history of the Q&A items, including identifiers such as "Created by: Test Instructor" and "Updated by: Test Instructor." This metadata enables tracking of authorship and revisions within the Q&A workflow.

The interface provides configurable fields for each Q&A entry. A dropdown menu 408 allows selection of question type, for example single answer. A separate dropdown 410 allows designation of the type of match, which may be system-driven or manually defined. Input fields 412 and 414 define the maximum number of attempts permitted and the difficulty level of the question. These controls give the instructor flexibility in tailoring assessment parameters for each Q&A item.

A Q&A entry includes a text field 416 for the question itself and a corresponding answer field 418. In the illustrated example, the first question asks about the cause of chest pain in angina, and the answer specifies myocardial ischemia as the underlying cause. A second Q&A entry is also shown, illustrating multiple item creation within the same section. This structured configuration supports consistent generation of domain-specific Q&A content with controlled difficulty, attempt limits, and answer expectations.

Figure 5:
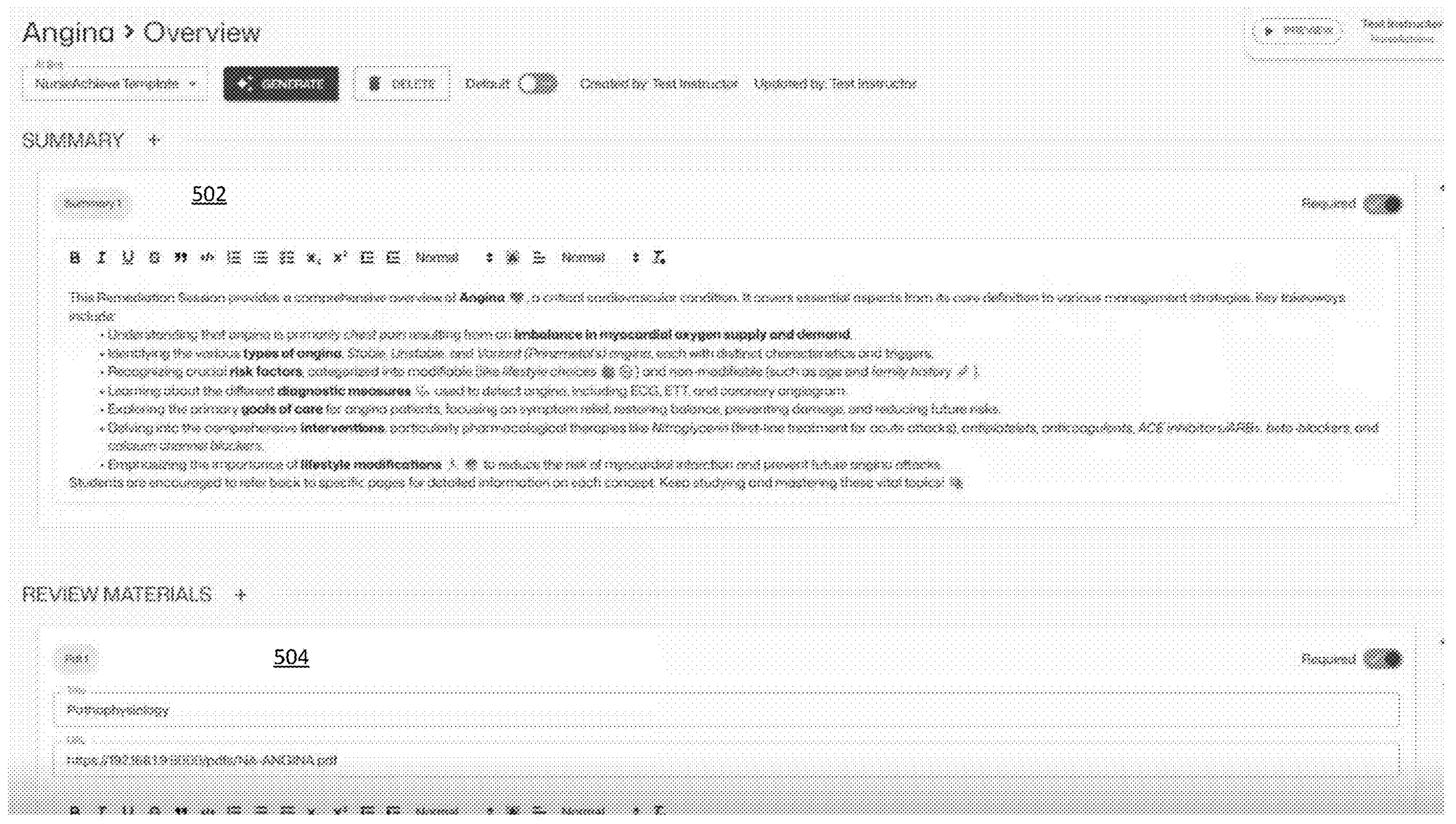
FIG. 5 illustrates an embodiment of a plan presentation interface configured for instructor approval.

FIG. 5 illustrates an embodiment of a plan presentation interface configured for instructor approval. The interface consolidates generated instructional content into structured sections including summaries, review materials, and associated Q&A items. The presentation allows the instructor to review and approve or modify the content before finalization for deployment.

A summary section 502 is displayed prominently. The summary section contains a text editor supporting formatting controls such as bold, italics, bullet points, and embedded symbols. Within the illustrated example, the summary provides a structured explanation of the topic "Angina," highlighting concepts such as imbalance in myocardial oxygen supply, types of angina, risk factors, diagnostic measures, goals of care, interventions, and lifestyle modifications. The editor allows both automated and manual input, enabling instructors to refine the generated narrative to ensure accuracy and clarity.

Beneath the summary section, a review materials section 504 is provided. This section contains entries for supplemental resources such as PDFs or external links. In the illustrated example, a review material item labeled "Pathophysiology" is displayed with a URL linking to a PDF file. This integration allows instructors to attach reference documents and background materials that support the main content of the plan.

The interface also retains metadata for content tracking, including indicators of creation and update actions by an identified instructor. Required toggles are provided within each section to mark whether specific items must be included in the final approved plan. These controls ensure that instructors can enforce mandatory inclusion of critical information.

Figure 6:
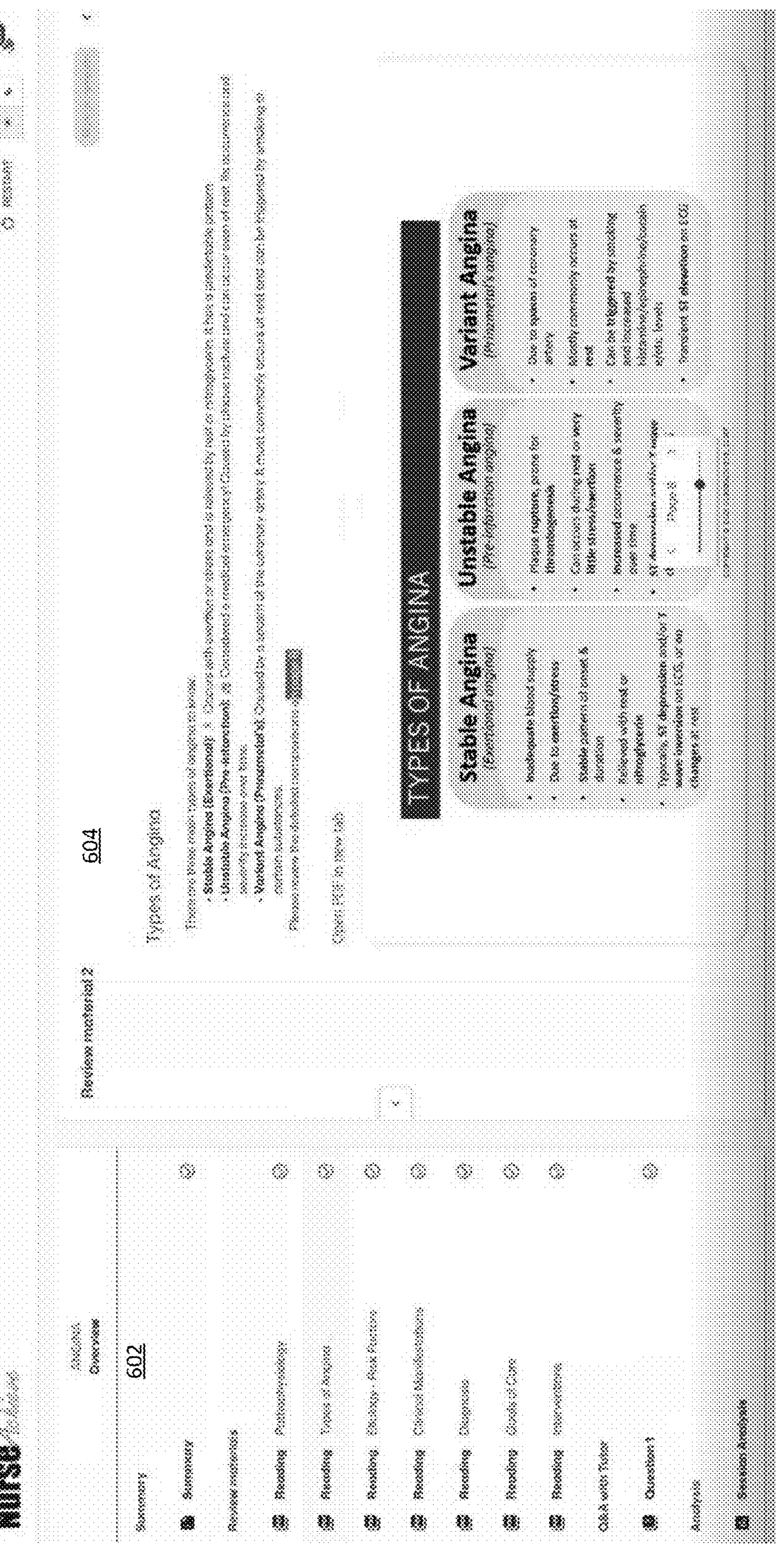
FIG. 6 illustrates an embodiment of a student-facing interface for reviewing instructional content within a generated plan.

FIG. 6 illustrates an embodiment of a student-facing interface for reviewing instructional content within a generated plan. The interface organizes material into structured sections and provides interactive access to reading materials, Q&A exercises, and analysis modules. The display is configured to allow students to sequentially navigate and complete assigned learning tasks.

A navigation panel 602 is displayed on the left side of the interface. The panel lists structured sections of the plan including Summary, Review Materials, Q&A with Tutor, and Analysis. Within Review Materials, multiple readings are provided such as Pathophysiology, Types of Angina, Etiology—Risk Factors, Clinical Manifestations, Diagnosis, Goals of Care, and Interventions. Each entry is accompanied by an indicator showing completion status, enabling the student to track progress.

The main display area 604 presents the selected review material. In the illustrated example, the content corresponds to "Types of Angina." The top portion includes structured text explaining stable angina, unstable angina, and variant angina, with supporting notes such as triggers, clinical relevance, and severity. A hyperlink is provided for navigation to a specific page within a source document, and a PDF access option is available for extended reference.

Beneath the text, a graphical panel presents a comparative view of the three angina types. Each column contains key diagnostic and clinical points, including causative factors, common triggers, and electrocardiographic indicators. This visual presentation supplements the textual explanation, providing the student with a consolidated view of distinctions among angina subtypes.

The student interface also includes interactive navigation controls such as restart options and marking sections as complete. This configuration enables flexible learning progression while ensuring that content is comprehensively reviewed. The technical advantage of the embodiment in FIG. 6 is the integration of structured textual content, supporting visual diagrams, and navigation tracking within a single student-facing interface, thereby enhancing accessibility and reinforcement of key concepts.

Figure 7:
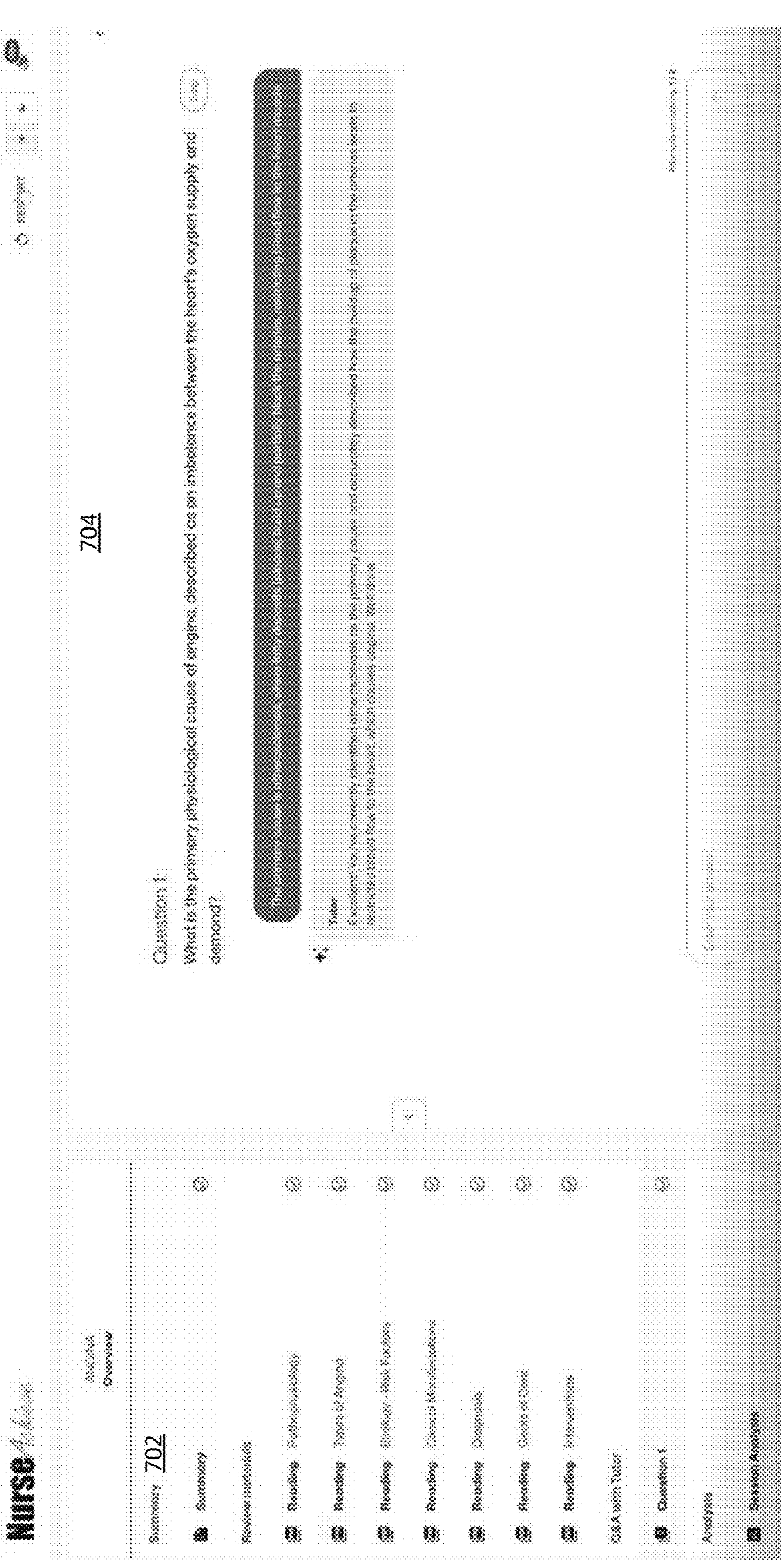
FIG. 7 illustrates an embodiment of a student interaction interface configured for responding to questions within a structured plan.

FIG. 7 illustrates an embodiment of a student interaction interface configured for responding to questions within a structured plan. The interface provides the student with a navigation panel for tracking progress across content sections, and a response area where answers are entered, submitted, and evaluated in real time.

A navigation panel 702 is displayed on the left side of the interface. The panel lists the overall structure of the plan, including Summary, Review Materials, Q&A with Tutor, and Analysis. Completion indicators are shown adjacent to each section, with checks marking finished items. Within Q&A with Tutor, the student is engaged in responding to Question 1, demonstrating active progression through the assessment portion of the plan.

The main response display 704 presents the question along with the student's answer and tutor feedback. The illustrated question asks for the primary physiological cause of angina. The student's submitted response is displayed in a highlighted box, identifying atherosclerosis as the cause. Below the student's answer, the tutor feedback field provides immediate confirmation, elaborating on the correctness of the response and reinforcing the underlying physiological explanation.

Additional interactive features include difficulty labeling, shown as "Easy," to help students contextualize question level. A remaining attempts indicator is positioned near the response field, allowing the student to track how many attempts are left for the given question. A text input area is provided at the bottom of the interface for the student to enter new responses or engage in further attempts as permitted.

Figure 8:
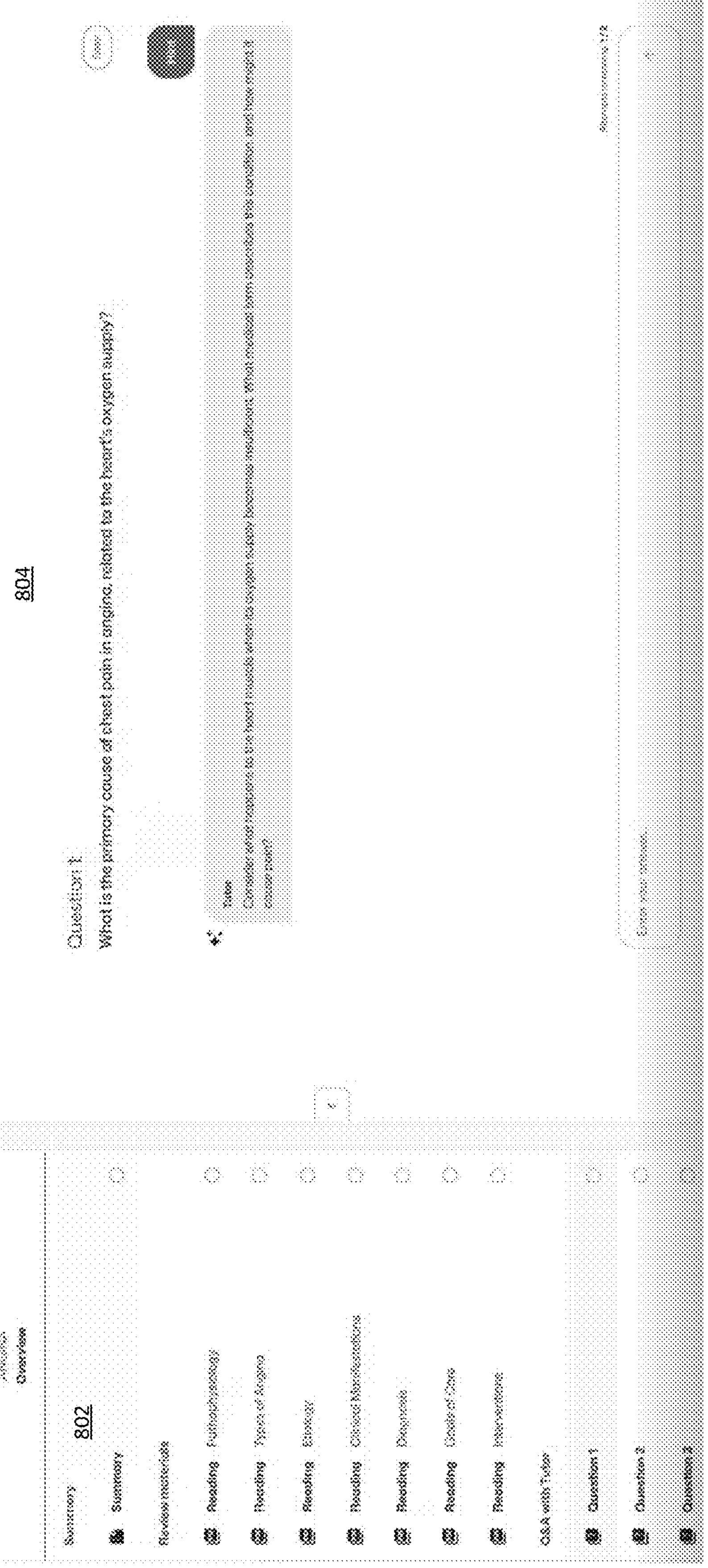
FIG. 8 illustrates an embodiment of a student interface configured to provide hints during question response.

FIG. 8 illustrates an embodiment of a student interface configured to provide hints during question response. The interface integrates structured navigation for content access, a response display for active questions, and contextual hints generated to assist the student in arriving at the correct answer.

A navigation panel 802 is displayed on the left side of the interface. The panel organizes the plan into sections including Summary, Review Materials, Q&A with Tutor, and multiple questions. Each item is listed with selectable markers that track student progression and indicate pending or completed tasks. This structure ensures that the student can easily navigate between reading materials and interactive question components.

The main response display 804 shows the active question being attempted. In the illustrated example, the question asks for the primary cause of chest pain in angina, related to oxygen supply. A tutor-generated hint is displayed beneath the question. The hint prompts the student to consider physiological consequences of insufficient oxygen supply to the heart muscle, directing attention toward relevant terminology and mechanisms.

An interactive "Hint" natural language response is entered in the tutor feedback area. Activation of this button provides contextual assistance without disclosing the final answer, thereby encouraging guided problem-solving. Difficulty level labeling, shown as "Easy," is also present, helping students frame expectations for the type of response required.

At the bottom of the interface, a text input field allows the student to enter an answer, with an indicator of remaining attempts shown alongside. This embodiment provides technical advantages by combining structured navigation 802 with responsive assistance 804, enabling adaptive support for students who require guidance while maintaining assessment integrity.

Figure 9:
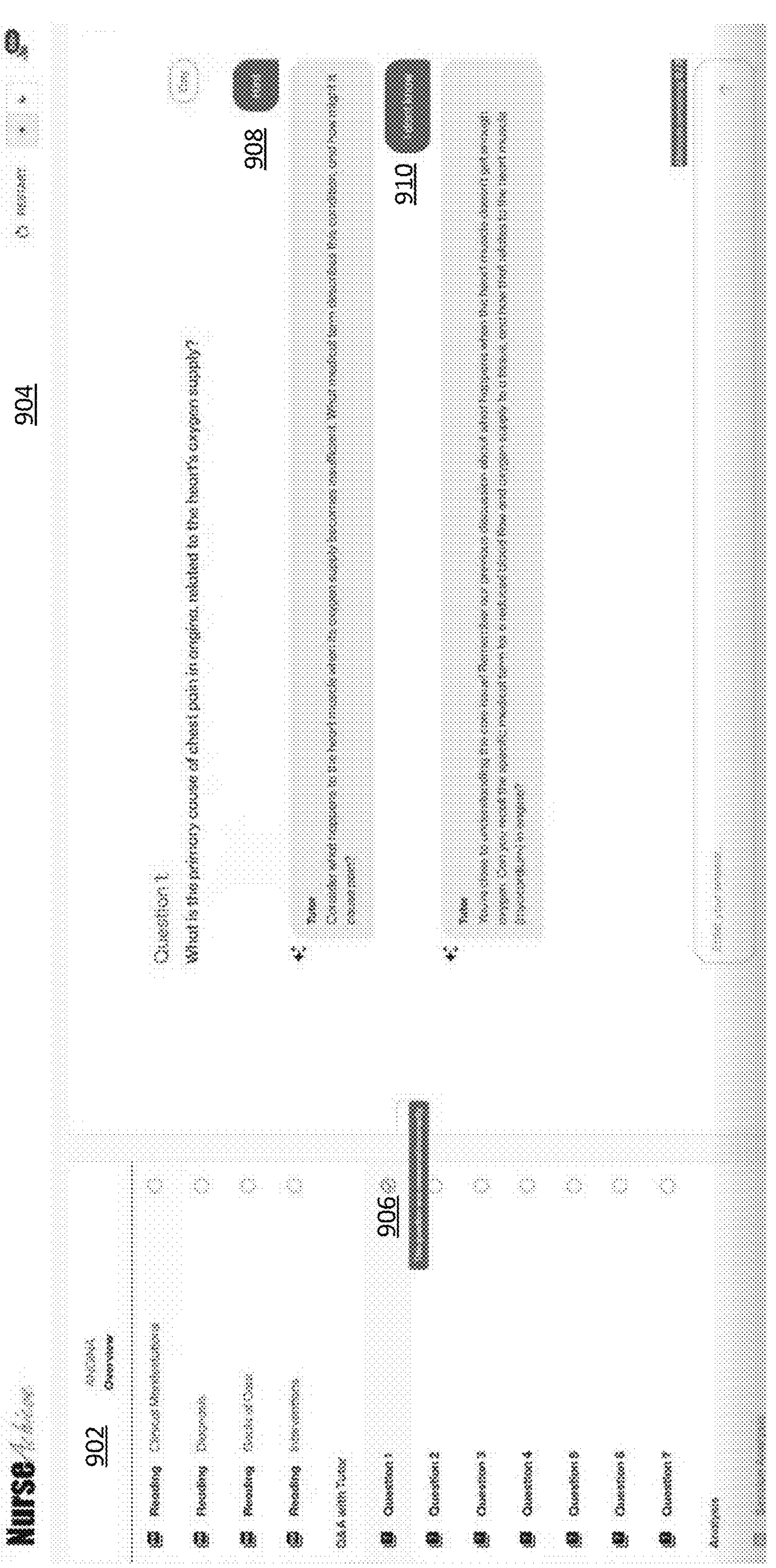
FIG. 9 illustrates an embodiment of a student-facing interface configured to handle incorrect responses and provide guided feedback.

FIG. 9 illustrates an embodiment of a student-facing interface configured to handle incorrect responses and provide guided feedback. The interface integrates navigation tracking, hint assistance, and progressive tutor prompts to encourage the student toward the correct concept.

A navigation panel 902 is displayed on the left side of the interface. The panel organizes plan elements including Review Materials, Q&A with Tutor, and Analysis. Under Q&A with Tutor, Question 1 is highlighted with an incorrect response indicator 906. This indicator provides immediate visual feedback that the student's prior attempt was not correct.

The main display area 904 presents the active question along with tutor interaction. The system continues to display the original question and shows a sequence of tutor messages. A first tutor message reiterates the hint, while a second tutor message provides additional scaffolding, reminding the student of related prior discussions and directing focus toward the correct medical terminology.

Interactive controls enhance the feedback process. A "Hint" text entry 908 allows retrieval of supportive prompts, while an "I don't know" natural language response 910 permits the student to signal difficulty in producing a response. Selection of the "I don't know" natural language response can trigger additional guided feedback or simplified explanations from the tutor system.

The interface also displays the remaining attempts counter, shown here as "0/2," indicating that the student has exhausted their allowed attempts. This embodiment provides a technical configuration that combines incorrect answer tracking, adaptive hints, and escalation prompts to reinforce key concepts. The integration of navigation status 902, incorrect answer indication 906, and adaptive controls 908 and 910 provides structured remediation while maintaining engagement.

Figure 10:
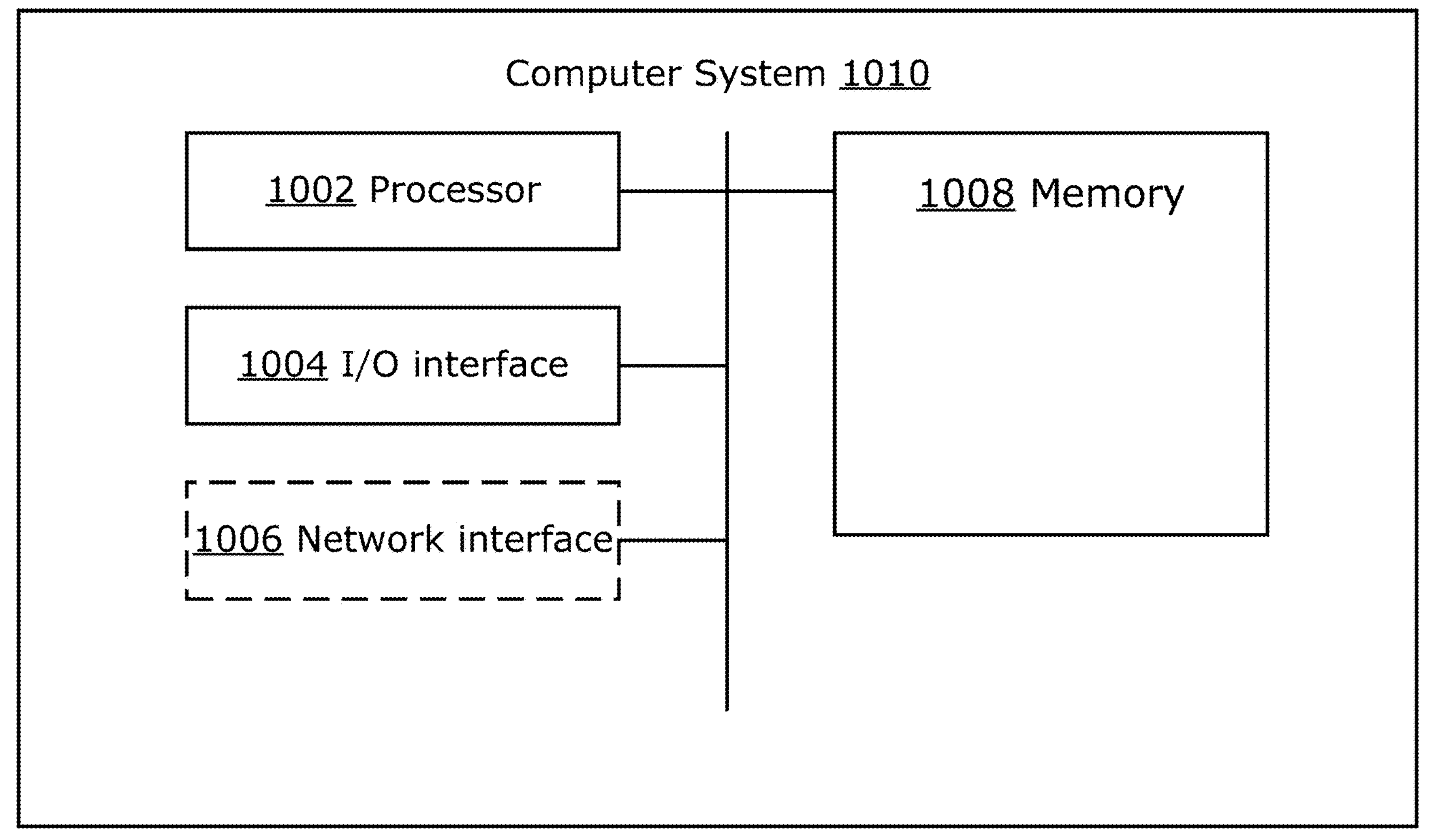
FIG. 10 illustrates an example of a computer system 1010 that can be used to implement one or more of the computer-implemented components of the present disclosure.

FIG. 10 illustrates an example of a computer system 1010 that can be used to implement the one or more of the computer implemented components of the present disclosure. Computer system 1010 includes one or more processors 1002, such as a central processing unit, a general processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 1002 may collectively be referred to as a "processor device". The computer system 1010 also includes one or more input/output (I/O) interfaces 1004, which interfaces with input devices (e.g., microphone) and output devices (e.g., speaker, display).

The computer system 1010 can include one or more network interfaces 606 that may, for example, enable the computer system 1010 to communicate with one or more further devices through a communications network such as a local area wireless network.

The computer system 1010 includes one or more memories 1008, which may include a volatile or non-volatile memory (e.g., a flash memory, a random access memory (RAM), and/or a read-only memory (ROM)). The non-transitory memory(ies) 1008 may store instructions for execution by the processor(s) 1002, such as to carry out examples described in the present disclosure. The memory(ies) 1008 may include other software instructions, such as for implementing an operating system and other applications/functions. In the illustrated example, the memory 1008 includes specialized software instructions for implementing one or more of the functions described above.

In some examples, the computer system 1010 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the computer system 610) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the computer system 610 may communicate with each other via a bus, for example.

The invention claimed is:

1. A computer-implemented method for generation of instructional sequences, comprising:

receiving instructional source materials;

parsing the instructional source materials to extract content segments;

constructing constrained prompts comprising pre-approved summaries and topic-specific metadata based on the content segments and applying tag constraints, wherein the constrained prompts are constructed by populating a prompt template that restricts free-form instructions and admits tag-based approved summaries;

obtaining, responsive to the constrained prompts, remediation outputs comprising at least summaries and candidate question-and-answer (Q&A) records generated under the tag constraints by transmitting the summaries and the candidate Q&A records to a user interface for edit and approval before migration from a staging schema into an approved repository;

presenting the summaries and candidate Q&A records for approval;

generating, upon approval and based on the tag constraints that bind a question step to a nearest preceding summary, a remediation plan having step metadata referencing the approved Q&A records; and transmitting the remediation plan and associated content to a user device.

2. The method of claim 1, further comprising storing the summaries with display-only text elements using schema markers.

3. The method of claim 1, wherein parsing comprises applying optical character recognition to images or scanned documents and, for video materials, generating a transcription and keyframe screenshots, and associating the content segment with metadata including source type and at least one of a page number, section marker, timestamp, or anchor tag.

4. The method of claim 1, wherein presenting the candidate Q&A records for approval comprises hashing the candidate Q&A records for deduplication and staging the hashed records, and in response to an approval action, migrating a staged candidate Q&A record from the staging schema to an active schema and assigning a version token that is incremented upon subsequent faculty edits.

5. The method of claim 1, wherein the tag constraints comprise a plurality of hierarchical tiers including at least a first tier, a second tier, and a third tier, the tiers defining progressively granular identifiers for associating instructional content and performance data, wherein executing the remediation plan further comprises applying a tier-specific rule object comprising a time window and a score threshold to performance data tagged to the plurality of hierarchical tiers, and conditionally including one or more steps responsive to whether the score threshold is satisfied within the time window.

6. The method of claim 1, wherein execution of the remediation plan includes generating, for a question step, a compact evaluation prompt comprising an approved reference answer associated with an approved Q&A record, wherein the method further includes limiting permitted attempts and, in response to an incorrect attempt, appending progressively specific hint directives such that feedback is generated from the approved reference answer and an optional approved summary without disclosing the approved reference answer.

7. The method of claim 1, wherein constructing the constrained prompts further comprises caching static summary portions and reusing a cache identifier in subsequent prompts to reduce token transmission, and determining a token count for an assembled prompt prior to inference and, in response to the token count exceeding a budget threshold, selecting a reduced set of approved summaries and the candidate Q&A records for inclusion in the assembled prompt.

8. The method of claim 1, wherein the summaries are stored in dual formats including display-optimized markup and token-optimized text.

9. A computer system comprising one or more processors and one or more memories storing machine-executable instructions thereon which, when executed by the one or more processors, cause the computer system to perform a set of processing operations to generate one or more examination questions, the processing operations including:

receiving instructional source materials;

parsing the instructional source materials to extract content segments;

constructing constrained prompts comprising pre-approved summaries and topic-specific metadata based on the content segments and applying tag constraints, wherein the constrained prompts are constructed by populating a prompt template that restricts free-form instructions and admits tag-based approved summaries;

obtaining, responsive to the constrained prompts, remediation outputs comprising at least summaries and candidate question-and-answer (Q&A) records generated under the tag constraints;

presenting the summaries and candidate Q&A records for approval by transmitting the summaries and the candidate Q&A records to a user interface for edit and approval before migration from a staging schema into an approved repository;

generating, upon approval and based on the tag constraints that bind a question step to a nearest preceding summary, a remediation plan having step metadata referencing the approved Q&A records; and transmitting the remediation plan and associated content to a user device.

10. The system of claim 9, further comprising storing the summaries with display-only text elements using schema markers.

11. The system of claim 9, wherein parsing comprises applying optical character recognition to images or scanned documents and, for video materials, generating a transcription and keyframe screenshots, and associating the content segment with metadata including source type and at least one of a page number, section marker, timestamp, or anchor tag.

12. The system of claim 9, wherein presenting the candidate Q&A records for approval comprises hashing the candidate Q&A records for deduplication and staging the hashed records, and in response to an approval action, migrating a staged candidate Q&A record from the staging schema to an active schema and assigning a version token that is incremented upon subsequent faculty edits.

13. The system of claim 9, wherein the tag constraints comprise a plurality of hierarchical tiers including at least a first tier, a second tier, and a third tier, the tiers defining progressively granular identifiers for associating instructional content and performance data, wherein executing the remediation plan further comprises applying a tier-specific rule object comprising a time window and a score threshold to performance data tagged to the plurality of hierarchical tiers, and conditionally including one or more steps responsive to whether the score threshold is satisfied within the time window.

14. The system of claim 9, wherein execution of the remediation plan includes generating, for a question step, a compact evaluation prompt comprising an approved reference answer associated with an approved Q&A record, wherein the method further includes limiting permitted attempts and, in response to an incorrect attempt, appending progressively specific hint directives such that feedback is generated from the approved reference answer and an optional approved summary without disclosing the approved reference answer.

15. The system of claim 9, wherein constructing the constrained prompts further comprises caching static summary portions and reusing a cache identifier in subsequent prompts to reduce token transmission; and determining a token count for an assembled prompt prior to inference and, in response to the token count exceeding a budget threshold, selecting a reduced set of approved summaries and the candidate Q&A records for inclusion in the assembled prompt.

16. The system of claim 9, wherein the summaries are stored in dual formats including display-optimized markup and token-optimized text.

* * * * *